(12) United States Patent
Lee

(10) Patent No.: US 9,944,317 B2
(45) Date of Patent: Apr. 17, 2018

(54) DRIVER ASSISTANCE APPARATUS AND CONTROL METHOD FOR THE SAME

(71) Applicant: LG ELECTRONICS INC., Seoul (KR)

(72) Inventor: Jinkyo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 15/098,652

(22) Filed: Apr. 14, 2016

(65) Prior Publication Data

US 2016/0339959 A1 Nov. 24, 2016

(30) Foreign Application Priority Data

May 21, 2015 (KR) .......................... 10-2015-0071191

(51) Int. Cl.
*A01B 69/00* (2006.01)
*B62D 15/02* (2006.01)
*G06K 9/00* (2006.01)
*G06T 7/20* (2017.01)
(Continued)

(52) U.S. Cl.
CPC ......... *B62D 15/0265* (2013.01); *B60W 30/09* (2013.01); *B60W 30/12* (2013.01); *G06K 9/00798* (2013.01); *G06K 9/00805* (2013.01); *G06T 7/20* (2013.01); *B60W 2420/42* (2013.01); *B60W 2550/10* (2013.01); *B60W 2550/12* (2013.01); *B60W 2550/147* (2013.01); *G06T 2207/30241* (2013.01); *G06T 2207/30261* (2013.01)

(58) Field of Classification Search
CPC ........... B62D 15/0265; G06K 9/00805; G06K 9/00798; G06T 7/20; G06T 2207/30261; G06T 2207/30241; B60W 30/09; B60W 30/12; B60W 2420/42; B60W 2550/10; B60W 2550/12; B60W 2550/147
USPC .......................................................... 701/41
See application file for complete search history.

(56) References Cited

U.S. PATENT DOCUMENTS

| | | | | |
|---|---|---|---|---|
| 2002/0042668 A1* | 4/2002 | Shirato | .............. | G06K 9/00798 701/1 |
| 2002/0131620 A1* | 9/2002 | Shirato | .............. | G06K 9/00798 382/104 |
| 2007/0272884 A1 | 11/2007 | Utida et al. | | |

(Continued)

FOREIGN PATENT DOCUMENTS

| | | |
|---|---|---|
| DE | 102009055190 | 6/2011 |
| DE | 102010045162 | 3/2012 |

(Continued)

OTHER PUBLICATIONS

European Search Report issued in European Application No. 16170609.8 dated Feb. 28, 2017, 17 pages.

(Continued)

*Primary Examiner* — Hussein Elchanti
(74) *Attorney, Agent, or Firm* — Fish & Richardson P.C.

(57) ABSTRACT

A driver assistance apparatus includes at least one camera configured to generate images of a view in front of a vehicle, and a processor. The processor is configured to detect an object present in a traveling lane of the vehicle based on the generated images, and to provide a steering apparatus of the vehicle with a control signal to adjust a direction of travel of the vehicle within the traveling lane based on information regarding the object.

3 Claims, 47 Drawing Sheets

<SIDE VIEW>

(51) Int. Cl.
*B60W 30/09* (2012.01)
*B60W 30/12* (2006.01)

(56) References Cited

U.S. PATENT DOCUMENTS

| | | | |
|---|---|---|---|
| 2010/0231718 A1* | 9/2010 | Nakamori | G06K 9/00798 348/148 |
| 2010/0235035 A1* | 9/2010 | Nishira | B60T 7/22 701/31.4 |
| 2011/0187515 A1* | 8/2011 | Saito | B60T 7/22 340/425.5 |
| 2011/0273582 A1 | 11/2011 | Gayko et al. | |
| 2011/0313665 A1* | 12/2011 | Lueke | G01S 13/931 701/301 |
| 2013/0314503 A1* | 11/2013 | Nix | G06K 9/00805 348/46 |
| 2015/0012165 A1 | 1/2015 | Israelsson | |
| 2015/0015384 A1 | 1/2015 | Shima et al. | |
| 2015/0166062 A1* | 6/2015 | Johnson | B60W 30/12 701/41 |
| 2016/0321924 A1* | 11/2016 | Lewis | G08G 1/096791 |

FOREIGN PATENT DOCUMENTS

| DE | 102011080932 | 2/2013 |
|---|---|---|
| DE | 102013214804 | 1/2015 |
| DE | 102014014249 | 3/2015 |

OTHER PUBLICATIONS

Partial European Search Report issued in European Application No. 16170609.8 dated Oct. 18, 2016, 8 pages.

\* cited by examiner

<TOP VIEW>

<SIDE VIEW>

<SIDE VIEW>

<TOP VIEW>

<FRONT VIEW>

<TOP VIEW>

<TOP VIEW>

<FRONT VIEW>

<TOP VIEW>

<TOP VIEW>

<FRONT VIEW>

<TOP VIEW>

<TOP VIEW>

<TOP VIEW>

<TOP VIEW>

<SIDE VIEW>

<TOP VIEW>

<TOP VIEW>

<SIDE VIEW>

<TOP VIEW>

<TOP VIEW>

<SIDE VIEW>

<TOP VIEW>

<TOP VIEW>

<TOP VIEW>

<TOP VIEW>

<SIDE VIEW>

<TOP VIEW>

<TOP VIEW>

<TOP VIEW>

DRIVER ASSISTANCE APPARATUS AND CONTROL METHOD FOR THE SAME

CROSS-REFERENCE TO RELATED APPLICATION

This application claims the priority benefit of Korean Patent Application No. 10-2015-0071191, filed on May 21, 2015 in the Korean Intellectual Property Office, the disclosure of which is incorporated herein by reference.

FIELD

The present disclosure relates to a driver assistance apparatus and a control method for the same and, more particularly, to a driver assistance apparatus, which can adjust the direction of travel of a vehicle based on information regarding an object present in the traveling lane of the vehicle, and a control method for the same.

BACKGROUND

A vehicle is an apparatus that transports, for example, people or cargo from one place to another place via driving of wheels. Examples of vehicles include two-wheeled cars such as motorcycles, four-wheeled cars such as sedans, and trains.

In recent years, in order to increase the safety and convenience of a user who uses the vehicle, technology to equip vehicles with, for example, a variety of sensors and electronic devices is being aggressively developed. In particular, for example, various devices for user driving convenience are being developed.

In addition, as interest in a vehicle having an autonomous driving function, that is, an autonomous driving vehicle is continuously increasing, sensors to be mounted to the autonomous driving vehicles have actively been studied. When the autonomous driving function is executed, the vehicle can travel in a prescribed zone while recognizing the surrounding environment for itself by receiving only minimum user input or without receiving any user input. To implement the autonomous driving function, the vehicle may need to be equipped with at least one sensor which senses and thus acquires information regarding the environment around the vehicle. For example, the autonomous driving vehicle may travel while autonomously performing, for example, acceleration, speed reduction, braking, and direction change based on sensing information acquired by a camera, radar, lidar, ultrasonic sensor, gyroscope, position sensor, and the like.

In some cases, when the vehicle travels a specific zone such as, for example, an expressway, various objects such as, for example, potholes and obstacles may be present in the traveling route of the vehicle. In this case, the vehicle may change the traveling state of the vehicle based on images generated by cameras or sensing signals related to the objects output by at least one sensor. For example, Autonomous Emergency Braking (AEB) may give a driver a warning alarm about an obstacle ahead, and may autonomously operate the brake when the driver does not react to the warning alarm, thereby preventing a collision with the obstacle or minimizing damage due to the collision. In another example, Autonomous Emergency Steering (AES) may change the traveling lane of a vehicle using Electronic Power Steering (EPS), thereby assisting the vehicle in avoiding an obstacle ahead.

However, in the case where any object that may cause an accident is present in the traveling lane of a vehicle, the related art may be limited to controlling the vehicle to simply reduce the speed or to move to another lane. Therefore, technology to control a vehicle such that the vehicle avoids an object present in a current traveling lane while continuing to travel in the same traveling lane may be required.

SUMMARY

Accordingly, one object of the present disclosure is to provide a driver assistance apparatus that can adjust the direction of travel of a vehicle based on information regarding objects present around the vehicle such that the vehicle avoids an object present in a traveling lane thereof while continuing to travel in the corresponding traveling lane, and a control method for the same.

According to one aspect, a driver assistance apparatus includes at least one camera configured to generate images of a view in front of a vehicle, and a processor. The processor is configured to detect an object present in a traveling lane of the vehicle based on the generated images, and to provide a steering apparatus of the vehicle with a control signal to adjust a direction of travel of the vehicle within the traveling lane based on information regarding the object.

Implementations according to this aspect may include one or more of the following features. For example, the processor may be configured to recognize a left traffic lane marker and a right traffic lane marker based on the generated images, and to determine the traveling lane by judging a region between the left traffic lane marker and the right traffic lane marker. The processor may be configured to judge whether the object is a pothole or an obstacle based on the information regarding the object. The information regarding the object may include distance information regarding the object, and the processor may be configured to judge whether the object is indented in or raised from the traveling lane based on the distance information regarding the object, based on judging that the object is indented in the traveling lane, judge that the object is the pothole, and based on judging that the object is raised from the traveling lane, judge that the object is the obstacle.

In some implementations, the processor may be configured to calculate a position and size of the object based on judging that the object is any one of the pothole or the obstacle. The processor may be configured to, based on judging that the object is the pothole, that a position of the pothole is within a prescribed range of a center of the traveling lane, and that a width of the pothole is smaller than a distance between a left tire and a right tire of the vehicle, generate a guide route that causes the vehicle to pass over the pothole between the left tire and the right tire of the vehicle, and provide the steering apparatus of the vehicle with a control signal to adjust steering of the vehicle along the guide route. Additionally, the processor may be configured to, based on judging that the object is the obstacle that a position of the obstacle is within a prescribed range of a center of the traveling lane, that a width of the obstacle is smaller than a distance between a left tire and a right tire of the vehicle, and that a height of the obstacle is smaller than a minimum ground clearance of the vehicle, generate a guide route that causes the vehicle to pass over the obstacle between the left tire and the right tire of the vehicle, and provide the steering apparatus of the vehicle with a control signal to adjust steering of the vehicle along the guide route.

In some cases, the processor may be configured to, based on judging that a position of the object is outside a prescribed range of a center of the traveling lane and that a region spaced apart from the object by a full width of the vehicle or more being present in the traveling lane, generate a guide route that causes the vehicle to pass through the region, and provide the steering apparatus of the vehicle with a control signal to adjust steering of the vehicle along the guide route. Additionally, the processor may be configured to, based on judging that the object is a pothole and no region spaced apart from the pothole by a full width of the vehicle or more is present in the traveling lane, generate a guide route that causes one of a left tire or a right tire of the vehicle that is positioned closer to the pothole to pass over a center of the pothole, and provide the steering apparatus of the vehicle with a control signal to adjust steering of the vehicle along the guide route.

Additionally, the processor may be configured to, based on judging that the object is an obstacle, generate tracking information that tracks the obstacle and provide a display unit of the vehicle with a control signal to display the tracking information, and the display unit may include at least one of a Head Up Display (HUD) and a transparent display provided at a windshield of the vehicle. The processor may be configured to judge whether the obstacle is moving based on the tracking information, and to judge whether the obstacle is a falling object based on judging that the obstacle is moving. The processor may be configured to, based on judging that the object is the falling object, calculate a falling speed and a falling path of the falling object, and predict a final position of the falling object based on the falling speed and the falling path. In some cases, the processor may be configured to, based on predicting that a final position of the falling object is within the traveling lane, generate a guide route in the traveling lane based on a size and the predicted final position of the falling object. The processor may be configured to provide the display unit of the vehicle with a control signal to display at least one of the guide route and simulation information with respect to the final position.

In some implementations, the processor may be configured to provide a lamp drive unit of the vehicle with a control signal to emit a laser beam, which has a prescribed color or magnitude, to a region that includes the final position. The processor may be configured to, based on the predicted final position of the falling object being within a prescribed range of a center of the traveling lane, a width of the falling object being smaller than a distance between a left tire and a right tire of the vehicle, and a height of the falling object being smaller than a minimum ground clearance of the vehicle, generate a guide route that causes the vehicle to pass over the falling object between the left tire and the right tire, and provide the steering apparatus of the vehicle with a control signal to adjust steering of the vehicle along the guide route. The processor may be configured to, based on the predicted final position of the falling object being outside a prescribed range of a center of the traveling lane and a region spaced apart from the falling object by a full width of the vehicle or more being present in the traveling lane, generate a guide route that causes the vehicle to pass through the region, and provide the steering apparatus of the vehicle with a control signal to adjust steering of the vehicle along the guide route.

In some cases, the processor may be configured to judge whether the object is splashing water based on the object blocking a windshield of the vehicle by a predetermined region or more. The processor may be configured to, based on the object blocking the predetermined region or more of the windshield of the vehicle, further judge whether the object is splashing water based on rain information provided from a rain sensor of the vehicle. The processor may be configured to, based on judging that the object is splashing water, provide the steering apparatus of the vehicle with a control signal to restrict an operable range of a steering wheel provided at the vehicle to a prescribed range. The processor may be configured to provide the steering apparatus of the vehicle with a control signal to restrict the operable range of the steering wheel to a smaller range than the prescribed range based on judging that an obstacle is present in another lane located at the left side or the right side of the traveling lane.

Moreover, the processor may be configured to provide the steering apparatus of the vehicle with a control signal to release a restriction on the steering wheel based on a predetermined time having passed after judging that the object is splashing water, or based on the windshield of the vehicle being blocked by less than the predetermined region. The processor may be configured to generate a guide route in the traveling lane based on one of the images acquired prior to judging that the object is splashing water. The processor may be configured to calculate curve information of the traveling lane from the image acquired prior to judging that the object is splashing water, and to generate a guide route in the traveling lane based on the curve information. The processor may be configured to provide a wiper drive unit of the vehicle with a control signal to drive a wiper at least once based on judging that the object is splashing water.

In some cases, the processor may be configured to, based on judging that a guide route in the traveling lane cannot be generated, judge whether an object is present in another lane located at the left side or the right side of the traveling lane based on the images, and generate a path connecting the traveling lane to the other lane based on no object being present in the other lane, and provide the steering apparatus of the vehicle with a control signal to adjust steering of the vehicle along the path connecting the traveling lane to the other lane.

In some implementations, the driver assistance apparatus as described above may be included in a vehicle that further comprises a steering apparatus configured to adjust steering of a vehicle based on a control signal provided from the driver assistance apparatus.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
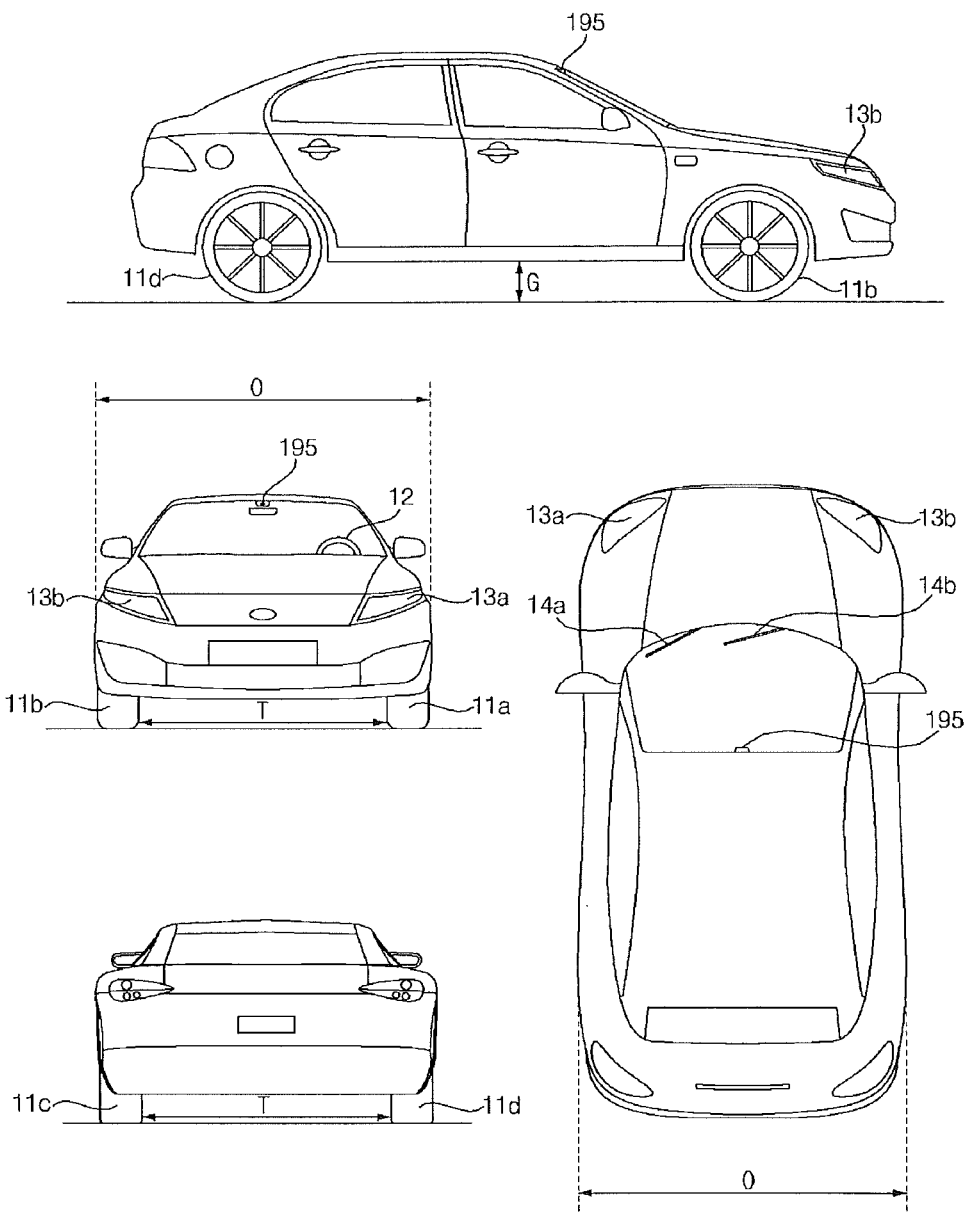
FIG. 1 are views illustrating an outer appearance of a vehicle provided with an example driver assistance apparatus.

Hereinafter, various examples will be described in detail with reference to the accompanying drawings. Same or similar elements are denoted by same reference numerals even though they may be depicted in different drawings and redundant descriptions thereof may not be given.

A vehicle as described in this specification may include any of an internal combustion engine vehicle including an engine as a power source, a hybrid vehicle including both an engine and an electric motor as a power source, or an electric vehicle including an electric motor as a power source.

FIG. 1 shows the outer appearance of a vehicle 1 according to one implementation. As illustrated, the vehicle 1 may be a four-wheeled car.

Referring to FIG. 1, the vehicle 1 may include tires 11a to 11d which can be rotated by a power source, a steering wheel 12 to adjust the direction of travel of the vehicle 1, head lamps 13a and 13b, wipers 14a and 14b, and a driver assistance apparatus 100 that will be described below.

The driver assistance apparatus 100 according to one implementation may serve to generate a surround-view image of the vehicle 1, to detect information from the generated surround-view image, and to output a control signal to adjust, for example, the direction of travel of the vehicle 1. At this time, the control signal may be provided to a controller (770 in FIG. 7), and the controller (770 in FIG. 7) may control, for example, a steering apparatus based on the control signal.

Figure 3A:
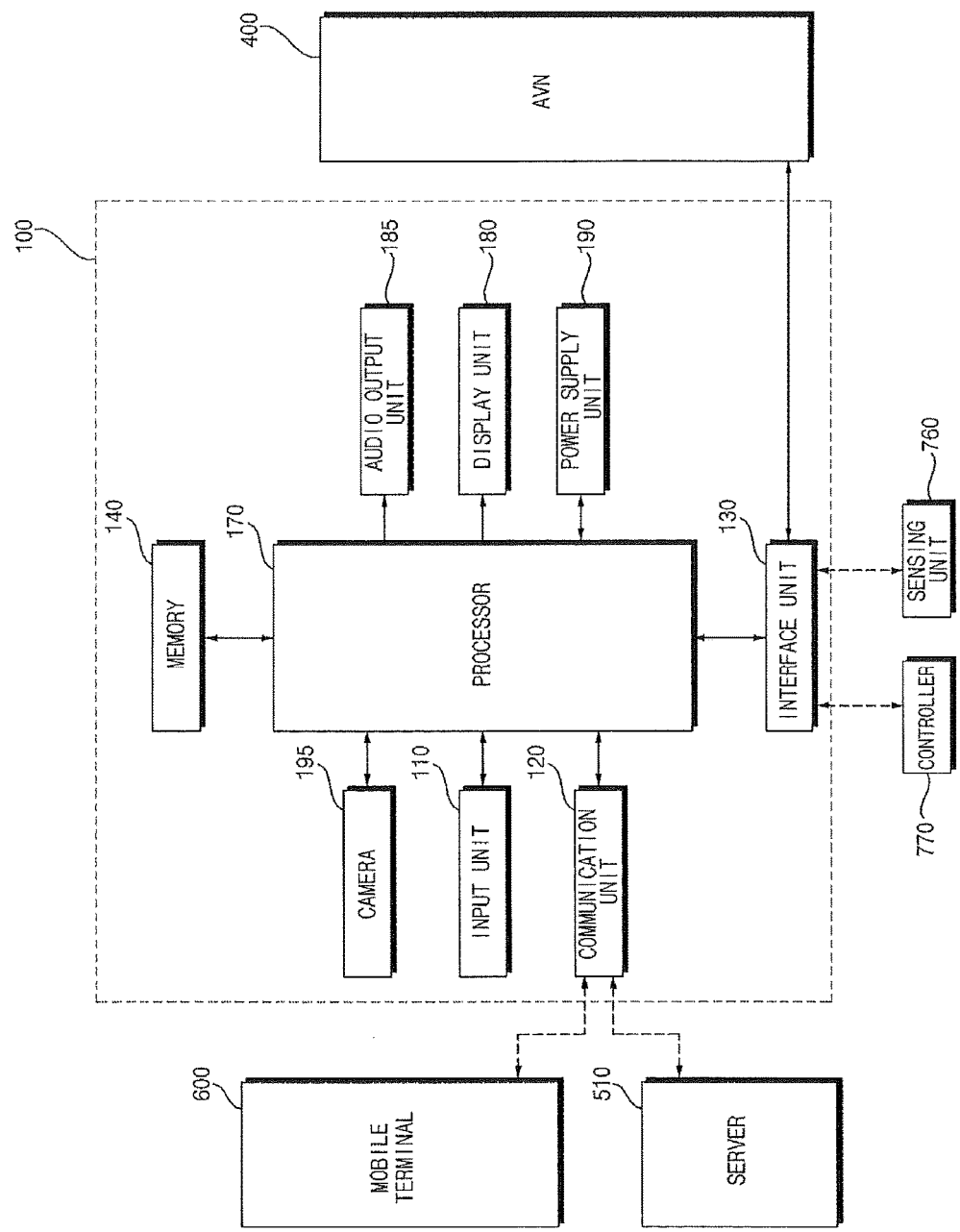
FIGS. 3A to 3C are example internal block diagrams illustrating the driver assistance apparatus.
Figure 3B:
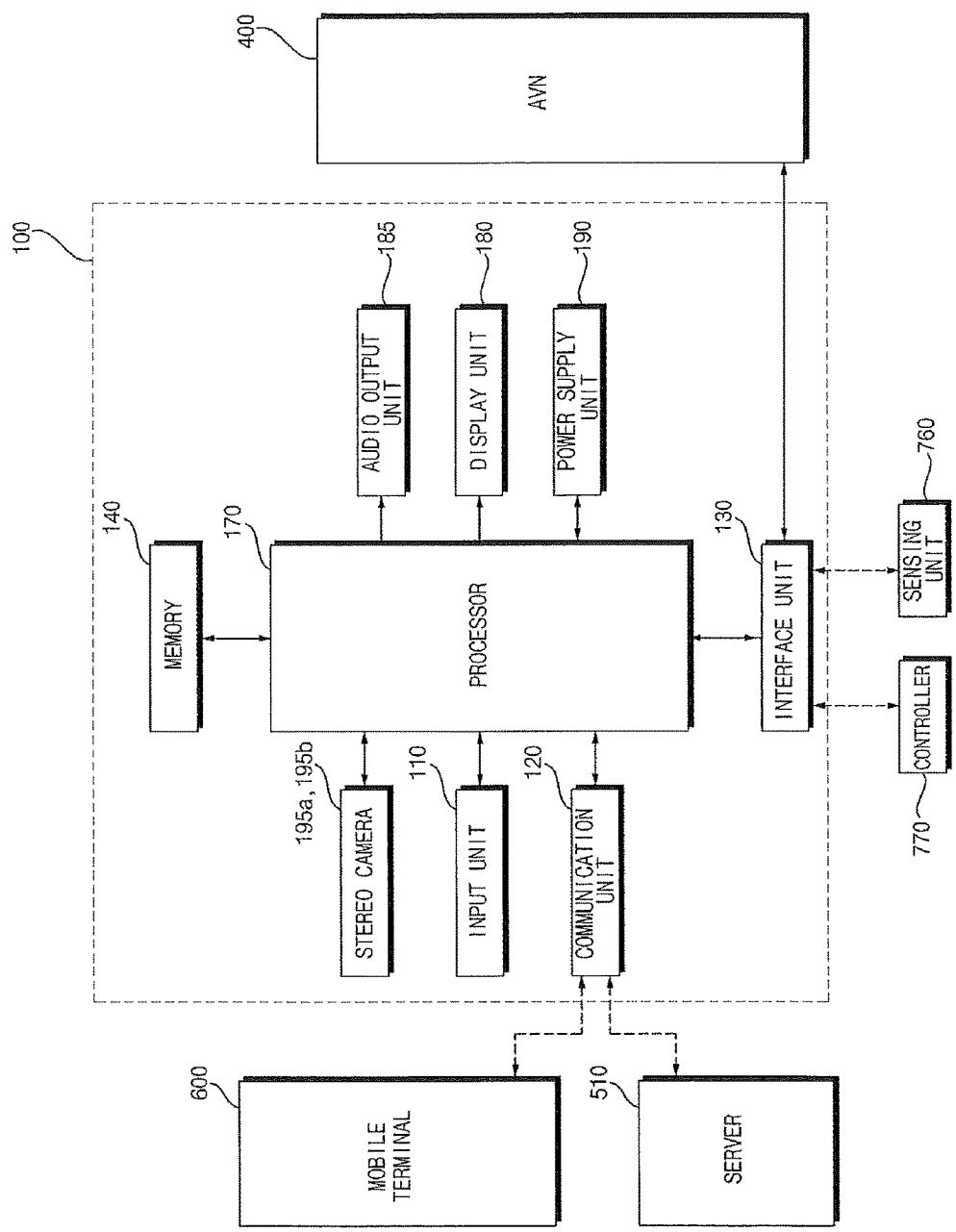

The driver assistance apparatus 100 may include at least one camera, and an image acquired by the camera may be signal-processed in a processor (170 in FIGS. 3A and 3B). For example, as illustrated, a camera 195 may be mounted to the upper end of a windshield of the vehicle 1 to capture an image of the view in front of the vehicle 1.

The lowermost point of the body of the vehicle 1 and the road surface may be spaced apart from each other by a minimum ground clearance G. This may prevent damage to the vehicle body due to any object having a lower height than the minimum ground clearance G.

In addition, the distance between the front left and right tires 11a and 11b and the distance between the rear left and right tires 11c and 11d of the vehicle 1 may be assumed to be equal to each other. Hereinafter, the distance between the inner side of the front-wheel left tire 11a and the inner side of the front-wheel right tire 11b and the distance between the inner side of the rear-wheel left tire 11c and the inner side of the rear-wheel right tire 11d are assumed as having the same value T. However, in some cases, these distances may be different from each other.

As used herein, the full width O of the vehicle 1 is defined as the maximum distance from the leftmost point to the rightmost point of the body of the vehicle 1 excluding side-view mirrors.

The vehicle 1 illustrated in FIG. 1 may include the driver assistance apparatus 100 that will be described below.

Figure 2A:
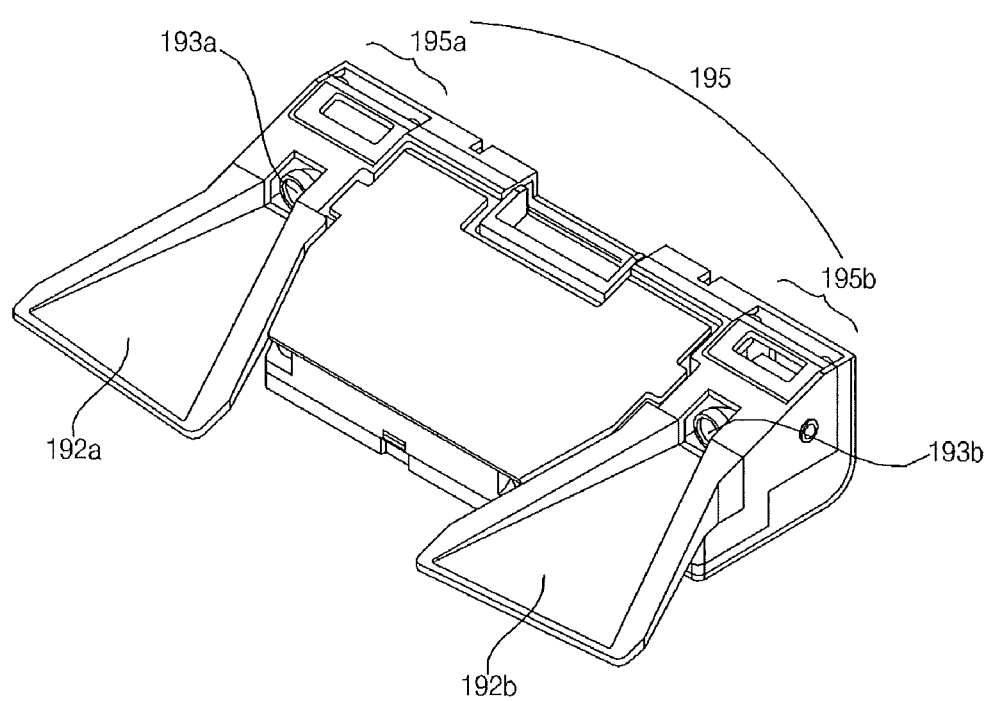
FIGS. 2A to 2C are views showing example cameras attached to the vehicle of FIG. 1.
Figure 2B:
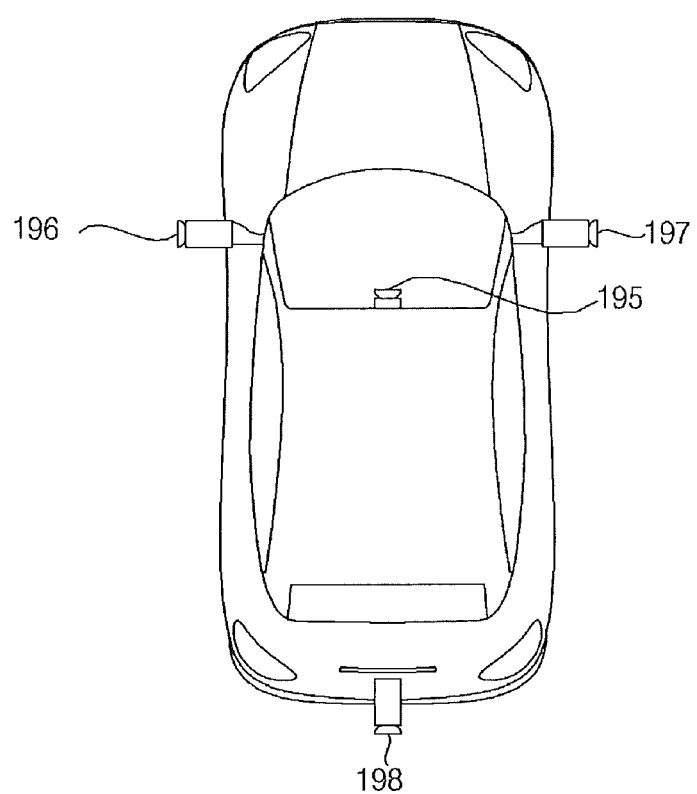
Figure 2C:
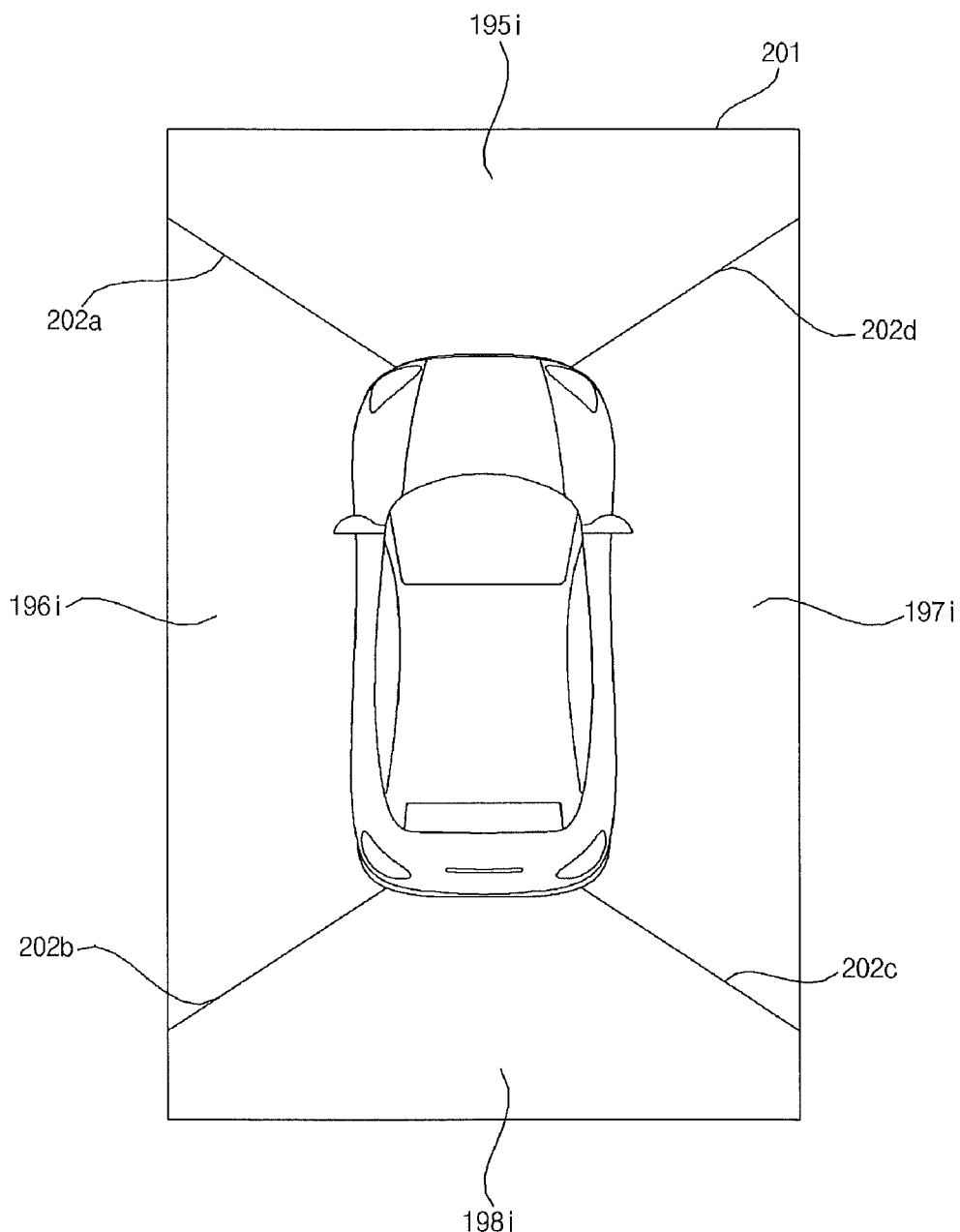

FIGS. 2A to 2C show example cameras attached to the vehicle 1 of FIG. 1.

The driver assistance apparatus 100, which may include cameras 195a and 195b to capture an image of the view in front of the vehicle 1, will be described below with reference to FIG. 2A.

Although FIG. 2A illustrates the driver assistance apparatus 100 as including the two cameras 195a and 195b, different numbers of cameras may be used.

Referring to FIG. 2A, the driver assistance apparatus 100 may include a first camera 195a having a first lens 193a and a second camera 195b having a second lens 193b. In this case, these cameras 195 may be referred to as stereo cameras.

In some cases, the driver assistance apparatus 100 may further include a first light shield 192a and a second light shield 192b, which shield light introduced to the first lens 193a and the second lens 193b respectively.

The driver assistance apparatus 100 of FIG. 2A may have a structure for attachment or detachment to or from the ceiling or windshield of the vehicle 1.

The driver assistance apparatus 100 as described above may acquire stereo images of the view in front of the vehicle 1 from the first and second cameras 195a and 195b. In addition, the driver assistance apparatus 100 may perform binocular disparity detection based on the stereo images and then perform object detection for at least one stereo image based on the binocular disparity information. After the object detection, the driver assistance apparatus 100 may continuously track the movement of an object.

The driver assistance apparatus 100, which may include cameras 195, 196, 197 and 198 to acquire a surround-view image of the vehicle 1, will be described below with reference to FIGS. 2B and 2C.

Although FIGS. 2B and 2C illustrate the driver assistance apparatus 100 as including four cameras, note that the present disclosure is not limited as to the specific number of cameras.

Referring to FIGS. 2B and 2C, the driver assistance apparatus 100 may include the cameras 195, 196, 197 and 198. In this case, these cameras 195, 196, 197 and 198 may be referred to as around-view cameras.

The cameras 195, 196, 197 and 198 may be located respectively on the front side, the left side, the right side, and the rear side of the vehicle 1.

The left camera 196 may be located inside a case enclosing a left side-view mirror. Alternatively, the left camera 196 may be located at the exterior of the case enclosing the left side-view mirror. In yet other cases, the left camera 196 may be located at a region of the exterior of a left front door, a left rear door, or a left fender.

The right camera 197 may be located inside a case enclosing a right side-view mirror. Alternatively, the right camera 197 may be located at the exterior of the case enclosing the right side-view mirror. In yet other cases, the right camera 197 may be located at a region at the exterior of a right front door, a right rear door, or a right fender.

The rear camera 198 may be located near a rear license plate or a trunk switch. The front camera 195 may be located near a windshield, near an emblem, or near a radiator grill.

Respective images captured by the cameras 195 to 198 may be transmitted to the processor 170, and the processor 170 may compose the respective images to generate a surround-view image of the vehicle 1.

FIG. 2C illustrates one example of the surround-view image of the vehicle 1. The surround-view image 201 may include a first image region 196i captured by the left camera 196, a second image region 198i captured by the rear camera 198, a third image region 197i captured by the right camera 197, and a fourth image region 195i captured by the front camera 195.

In some cases, upon generation of the surround-view image (hereinafter also referred to as "around-view image") from the cameras, boundaries may be generated between the respective image regions. These boundaries may be subjected to image blending, for example, to achieve a natural display thereof.

Boundary lines 202a, 202b, 202c and 202d may be displayed at the boundaries between the respective image regions. In addition, the surround-view image 201 may include a vehicle image at the center thereof. Here, the vehicle image may be an image generated by the processor 170. In addition, the surround-view image 201 of the vehicle 1 may be displayed via a display unit 741 of the vehicle 1 or a display unit 180 of the driver assistance apparatus 100.

Figure 3C:
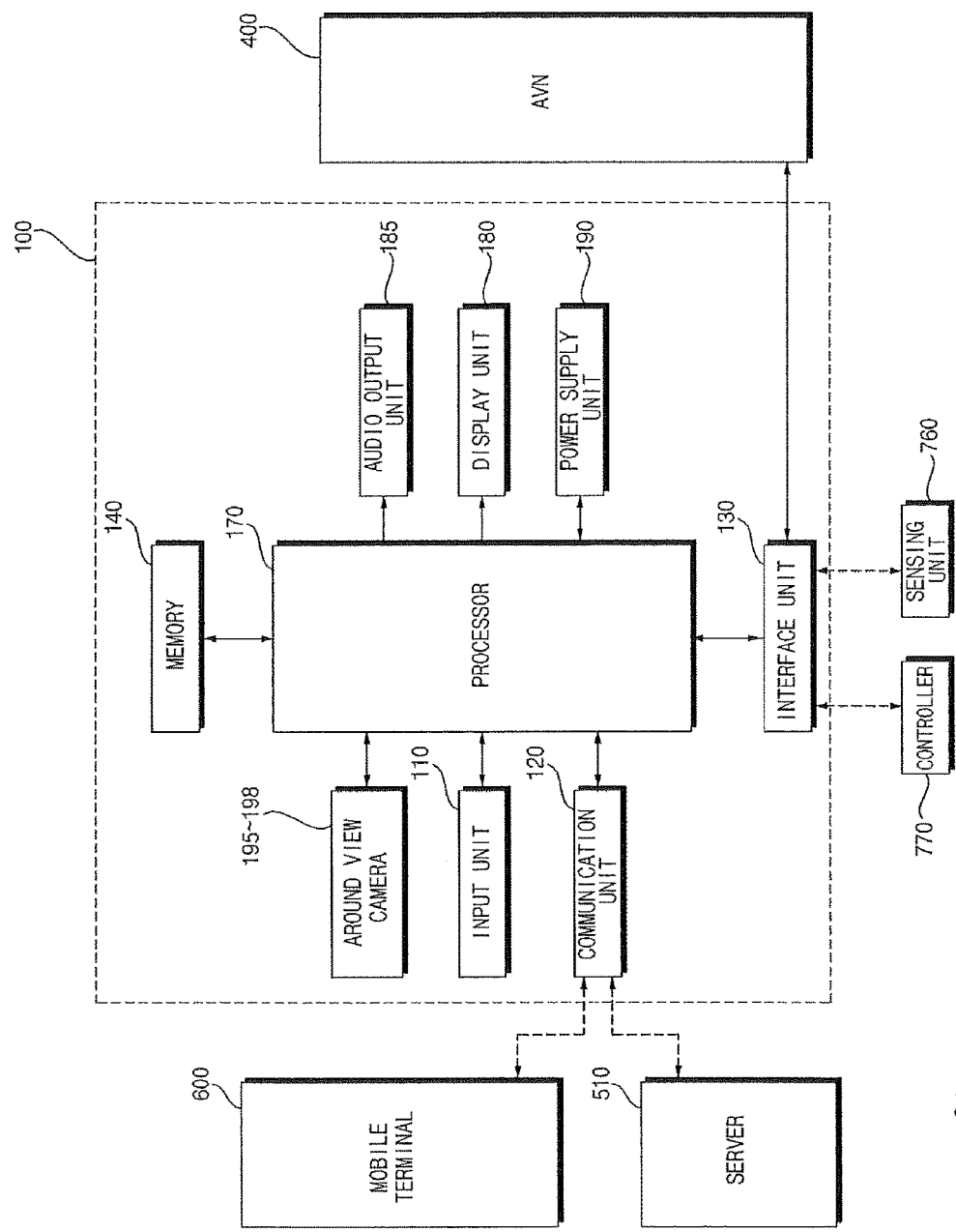

FIGS. 3A to 3C show example internal block diagrams that illustrate the driver assistance apparatus 100.

The driver assistance apparatus 100 of FIGS. 3A and 3B may generate vehicle associated information via computer vision based signal processing of an image received from the camera 195. Here, the vehicle associated information may include vehicle control information for the direct control of a vehicle or vehicle traveling assistance information to guide a vehicle driver during traveling.

The camera 195 may be a monocular camera. Alternatively, the camera 195 may be the stereo cameras 195a and 195b which capture an image of the view in front of the vehicle (hereinafter referred to as a "forward image" of the vehicle). In some cases, the camera 195 may be included in the around-view cameras 195 to 198 which capture a surround-view image of the vehicle.

FIG. 3A is an example internal block diagram of the driver assistance apparatus 100. Referring to FIG. 3A, the driver assistance apparatus 100 may include an input unit 110, a communication unit 120, an interface unit 130, a memory 140, a processor 170, a power supply unit 190, a camera 195, a display unit 180, and an audio output unit 185.

The input unit 110 may include a plurality of buttons or a touchscreen attached to the driver assistance apparatus 100, more particularly, to the camera 195. The driver may turn on the driver assistance apparatus 100 to operate the same using the buttons or the touchscreen. In addition, the input unit 110 may be used for implementation of various other input operations.

The communication unit 120 may exchange data with, for example, a mobile terminal 600, a server 510, or other external appliances of other vehicles in a wireless manner. In particular, the communication unit 120 may exchange data with the mobile terminal 600 of the driver in a wireless manner. Various wireless data communication protocols such as, for example, Bluetooth, Wi-Fi, Wi-Fi direct, APiX, and NFC may be used.

The communication unit 120 may receive weather information and road traffic state information such as, for example, Transport Protocol Expert Group (TPEG) information, from the mobile terminal 600 or the server 500. In some cases, the communication unit 120 may transmit real-time information, acquired by the driver assistance apparatus 100, to the mobile terminal 600 or the server 510.

In some implementations, when a user gets into the vehicle, the mobile terminal 600 of the user may pair with the driver assistance apparatus 100 automatically or as the user executes a pairing application.

The communication unit 120 may receive traffic light change information from the external server 510. Here, the external server 510 may be a server located in a traffic control center.

The interface unit 130 may receive vehicle associated data, or externally transmit signals processed or generated by the processor 170. To this end, the interface unit 130 may perform data communication with, for example, the controller 770 inside the vehicle, an Audio Video Navigation (AVN) apparatus 400, and a sensing unit 760 in a wired or wireless communication manner.

The interface unit 130 may receive navigation information via data communication with the controller 770, the AVN apparatus 400, or a separate navigation apparatus. Here, the navigation information may include set destination information, destination based routing information, map information related to vehicle traveling, and vehicle's current location information. The navigation information may include information regarding a vehicle's location on a road.

In some implementations, the interface unit 130 may receive sensor information from the controller 770 or the sensing unit 760.

Here, the sensor information may include at least one selected from among vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and object information.

The sensor information may be acquired from, for example, a heading sensor, a yaw sensor, a gyro sensor, a position module, a vehicle forward/backward movement sensor, a wheel sensor, a vehicle speed sensor, a vehicle body gradient sensor, a battery sensor, a fuel sensor, a tire sensor, a steering sensor based on the rotation of a steering wheel, a vehicle interior temperature sensor, a vehicle interior humidity sensor, and an object sensor (e.g., a radar, lidar, or ultrasonic sensor). The position module may include a GPS module to receive GPS information.

Among the above-specified sensor information, vehicle travel direction information, vehicle location information, vehicle angle information, vehicle speed information, and vehicle tilt information, for example, which are related to vehicle traveling, may be referred to as vehicle traveling information.

The interface unit 130 may receive turn-signal information. Here, the turn-signal information may be a turn-on signal of a turn signal light for left-turn or right-turn input by the user. When an input to turn on a left or right turn signal light is received via a user input unit (724 in FIG. 7) of the vehicle, the interface unit 130 may receive turn-signal information for left-turn or right-turn.

The interface unit 130 may receive vehicle speed information, steering wheel rotation angle information, or gearshift information. The interface unit 130 may receive vehicle speed information, steering wheel rotation angle information, or gearshift information sensed via the sensing unit 760 of the vehicle. Alternatively, the interface unit 130 may receive vehicle speed information, steering wheel rotation angle information, or gearshift information from the controller 770 of the vehicle. In some cases, gearshift information may be information regarding the current gear position of the vehicle. For example, gearshift information may be information regarding whether the gearshift is in any one of Park (P), Reverse (R), Neutral (N), and Drive (D), or numbered gears.

The interface unit 130 may receive user input via the user input unit 724 of the vehicle 1. The interface unit 130 may receive user input from the input unit 720 of the vehicle 1, or may receive user input by way of the controller 770.

The interface unit 130 may receive information acquired from the external server 510. The external server 510 may be a server located in a traffic control center. For example, when traffic light change information is received from the external server 510 via a communication unit 710 of the vehicle, the interface unit 130 may receive the traffic light change information from the controller (770 of FIG. 7). The memory 140 may store various data for the overall operation of the driver assistance apparatus 100 such as, for example, programs for the processing or control of the processor 170.

The memory 140 may store data for object verification. For example, when a prescribed object is detected from an image captured by the camera 195, the memory 140 may store data to verify, using a prescribed process, what the object corresponds to.

The memory 140 may store data related to traffic information. For example, when prescribed traffic information is detected from an image captured by the camera 195, the memory 140 may store data to verify, using a prescribed process, what the traffic information corresponds to.

In some cases, the memory 140 may be any one of various hardware storage devices such as, for example, a ROM, a RAM, an EPROM, a flash drive, and a hard drive.

The processor 170 may control the overall operation of each unit inside the driver assistance apparatus 100.

The processor 170 may process a forward image or a surround-view image of the vehicle acquired by the camera 195. In particular, the processor 170 implements computer vision based signal processing. As such, the processor 170 may acquire a forward image or a surround-view image of the vehicle from the camera 195 and perform object detection and object tracking based on the image. In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

In some cases, a traffic sign can refer to prescribed information that may be transmitted to the driver of the vehicle 1. The traffic sign may be transmitted to the driver via a traffic light, a traffic sign, or a road surface. For example, the traffic sign may be a go signal or a stop signal for a vehicle or a pedestrian, which is output from a traffic light. As another example, the traffic sign may be various symbols or text marked on a traffic sign. As another example, the traffic sign may be various symbols or text marked on the road surface.

The processor 170 may detect information from a surround-view image of the vehicle acquired by the camera 195.

The information may be vehicle traveling state information. For example, the information may include vehicle traveling road information, traffic rule information, adjacent vehicle information, vehicle or pedestrian traffic light information, roadwork information, traffic state information, parking lot information, and lane information.

The information may be traffic information. The processor 170 may detect traffic information from any one of a traffic light, a traffic sign, and a road surface included in an image captured by the camera 195. For example, the processor 170 may detect a go signal or a stop signal for a vehicle or a pedestrian from a traffic light included in an image. For example, the processor 170 may detect various symbols or text from a traffic sign included in an image. For example, the processor 170 may detect various symbols or text from a road surface included in an image.

The processor 170 may verify information by comparing detected information with information stored in the memory 140.

For example, the processor 170 detects a symbol or text indicating a ramp from an object included in an acquired image. Here, the object may be a traffic sign or a road surface. The processor 170 may verify ramp information by comparing the detected symbol or text with traffic information stored in the memory 140.

For example, the processor 170 detects a symbol or text indicating vehicle or pedestrian stop from an object included in an acquired image. Here, the object may be a traffic sign or a road surface. The processor 170 may verify stop information by comparing the detected symbol or text with traffic information stored in the memory 140. Alternatively, the processor 170 detects a stop line from a road surface included in an acquired image. The processor 170 may verify stop information by comparing the detected stop line with traffic information stored in the memory 140.

For example, the processor 170 may detect whether a traffic lane marker is present from an object included in an acquired image. Here, the object may be a road surface. The processor 170 may check the color of the detected traffic lane marker. The processor 170 may check whether the detected traffic lane marker belongs to a travel lane or a left-turn lane.

For example, the processor 170 may detect vehicle go or stop information from an object included in an acquired image. Here, the object may be a vehicle traffic light. Here, the vehicle go information may be a signal to instruct the vehicle to go straight or to turn to the left or right. The vehicle stop information may be a signal to instruct the vehicle to stop. The vehicle go information may be displayed in green and the vehicle stop information may be displayed in red.

For example, the processor 170 may detect pedestrian go or stop information from an object included in an acquired image. Here, the object may be a pedestrian traffic light. Here, the pedestrian go information may be a signal to instruct a pedestrian to cross the street at a crosswalk. The pedestrian stop information may be a signal to instruct a pedestrian to stop at a crosswalk.

In some implementations, the processor 170 may control the zoom of the camera 195. For example, the processor 170 may control the zoom of the camera 195 based on an object detection result. When a traffic sign is detected, but content written on the traffic sign is not detected, the processor 170 may control the camera 195 to zoom in.

In some cases, the processor 170 may receive weather information and road traffic state information, for example, Transport Protocol Expert Group (TPEG) information via the communication unit 120.

In some cases, the processor 170 may recognize, in real time, traffic state information around the vehicle, which has been recognized, based on stereo images, by the driver assistance apparatus 100.

In some cases, the processor 170 may receive, for example, navigation information from the AVN apparatus 400 or a separate navigation apparatus via the interface unit 130.

In some cases, the processor 170 may receive sensor information from the controller 770 or the sensing unit 760 via the interface unit 130. Here, the sensor information may include at least one selected from among vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation information.

In some cases, the processor 170 may receive navigation information from the controller 770, the AVN apparatus 400 or a separate navigation apparatus via the interface unit 130.

In some cases, the processor 170 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for implementation of other functions.

The processor 170 may be controlled by the controller 770.

The display unit 180 may display various pieces of information processed in the processor 170. The display unit 180 may display an image related to the operation of the driver assistance apparatus 100. To display such an image, the display unit 180 may include a cluster or a Head Up Display (HUD) mounted at the front of the interior of the vehicle. When the display unit 180 is a HUD, the display unit 180 may include a projector module to project an image to the windshield of the vehicle 1.

The audio output unit 185 may externally output sound based on an audio signal processed in the processor 170. To this end, the audio output unit 185 may include at least one speaker.

An audio input unit may receive user voice. To this end, the audio input unit may include a microphone. The received voice may be converted into electrical signals by the audio input unit to thereby be transmitted to the processor 170.

The power supply unit 190 may supply power required to operate the respective components under the control of the processor 170. In particular, the power supply unit 190 may receive power from, for example, a battery inside the vehicle.

The camera 195 acquires a forward image or a surround-view image of the vehicle. The camera 195 may be a monocular camera or the stereo cameras 195a and 195b to capture a forward image of the vehicle. Alternatively, the camera 195 may be included in the around-view cameras 195, 196, 197 and 198 to capture a surround-view image of the vehicle.

The camera 195 may include an image sensor (e.g., a CMOS or a CCD) and an image processing module.

The camera 195 may process a still image or a moving image acquired by the image sensor. The image processing module may process the still image or the moving image acquired by the image sensor. In some implementations, the image processing module may be separate from or integrated with the processor 170.

The camera 195 may acquire an image capturing at least one of a traffic light, a traffic sign, and a road surface.

The camera 195 may be set to zoom in/out under the control of the processor 170. For example, under the control of the processor 170, a zoom barrel included in the camera 195 may be moved to zoom in/out.

The camera 195 may be focused under the control of the processor 170. For example, under the control of the processor 170, a focus barrel included in the camera 195 may be moved to set a focus. The focus may be automatically set based on zoom in/out setting.

In some cases, the processor 170 may automatically control the focus to correspond to the zoom control of the camera 195.

FIG. 3B is an example internal block diagram of the driver assistance apparatus 100 according to another implementation.

Referring to FIG. 3B, the driver assistance apparatus 100 is different in that it includes the stereo cameras 195a and 195*b* as compared to the driver assistance apparatus 100 of FIG. 3A. The following description will focus on this difference.

The driver assistance apparatus 100 may include first and second cameras 195*a* and 195*b*. Here, the first and second cameras 195*a* and 195*b* may be referred to as stereo cameras.

The stereo cameras 195*a* and 195*b* may be configured to be detachably attached to the ceiling or windshield of the vehicle 1. The stereo cameras 195*a* and 195*b* may respectively include the first lens 193*a* and the second lens 193*b*.

In some cases, the stereo cameras 195*a* and 195*b* may respectively include the first light shield 192*a* and the second light shield 192*b*, which shield light to be introduced to the first lens 193*a* and the second lens 193*b*.

The first camera 195*a* may capture a first forward image of the vehicle, and the second camera 195*b* may capture a second forward image of the vehicle. The second camera 195*b* may be spaced apart from the first camera 195*a* by a prescribed distance. Since the first and second cameras 195*a* and 195*b* are spaced apart from each other by a prescribed distance, binocular disparity can be generated, which can enable the detection of the distance to an object based on binocular disparity.

In some implementations, when the driver assistance apparatus 100 includes the stereo cameras 195*a* and 195*b*, the processor 170 may implement computer vision based signal processing. As such, the processor 170 may acquire stereo images of the view in front of the vehicle from the stereo cameras 195*a* and 195*b* and perform binocular disparity calculation for the view in front of the vehicle based on the stereo images. Then, the processor 170 may perform object detection for at least one of the stereo images based on the calculated binocular disparity information and, after the object detection, continuously track the movement of an object. Here, the stereo images are based on the first forward image received from the first camera 195*a* and the second forward image received from the second camera 195*b*.

In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

In addition, the processor 170 may perform, for example, calculation of the distance to a detected adjacent vehicle, calculation of the speed of the detected adjacent vehicle, and calculation of the speed difference with the detected adjacent vehicle.

The processor 170 may control the zoom of the first and second cameras 195*a* and 195*b* individually. The processor 170 may periodically change the zoom magnification of the second camera 195*b* while fixing the zoom of the first camera 195*a*. The processor 170 may periodically change the zoom magnification of the first camera 195*a* while fixing the zoom of the second camera 195*b*.

The processor 170 may control the first or second camera 195*a* or 195*b* to zoom in or zoom out at a prescribed period.

The processor 170 may set the zoom of the first camera 195*a* to a high magnification so as to be advantageous for object detection at a long distance. In addition, the processor 170 may set the zoom of the second camera 195*b* to a low magnification so as to be advantageous for object detection at a short distance. At this time, the processor 170 may control the first camera 195*a* to zoom in and the second camera 195*b* to zoom out.

Conversely, the processor 170 may set the zoom of the first camera 195*a* to a low magnification so as to be advantageous for object detection at a short distance. In addition, the processor 170 may set the zoom of the second camera 195*b* to a high magnification so as to be advantageous for object detection at a long distance. At this time, the processor 170 may control the first camera 195*a* to zoom out and the second camera 195*b* to zoom in.

For example, the processor 170 may control the zoom of the first camera 195*a* or the second camera 195*b* according to an object detection result. For example, when a traffic sign is detected, but content written on the traffic sign is not detected, the processor 170 may control the first camera 195*a* or the second camera 195*b* to zoom in.

In some cases, the processor 170 may automatically control a focus to correspond to the zoom control of the camera 195.

FIG. 3C is an example internal block diagram of the driver assistance apparatus 100 according to yet another implementation.

Referring to FIG. 3C, the driver assistance apparatus 100 is different in that it includes the around-view cameras 195 to 198 as compared to the driver assistance apparatus 100 of FIG. 3A. The following description will focus on this difference.

The driver assistance apparatus 100 may include the around-view cameras 195 to 198.

Each of the around-view cameras 195 to 198 may include a lens and a light shield configured to shield light to be introduced to the lens.

The around-view cameras may include the left camera 195, the rear camera 198, the right camera 197 and the front camera 195.

The front camera 195 captures a forward image of the vehicle. The left camera 196 captures a leftward image of the vehicle. The right camera 197 captures a rightward image of the vehicle. The rear camera 198 captures a rearward image of the vehicle.

The respective images captured by the around-view cameras 195 to 198 are transmitted to the processor 170.

The processor 170 may generate a surround-view image of the vehicle by composing the leftward image, the rearward image, the rightward image and the forward image of the vehicle. At this time, the surround-view image of the vehicle may be a top view image or a bird's eye view image. The processor 170 may receive each of the leftward image, the rearward image, the rightward image and the forward image of the vehicle, compose the received images, and convert the composed image into a top view image, thereby generating a surround-view image of the vehicle.

In some cases, the processor 170 may detect an object based on the surround-view image of the vehicle. In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

In some cases, the processor 170 may control the zoom of the around-view cameras 195 to 198 individually. The zoom control of the processor 170 may be equal to that of the stereo cameras as described above with reference to FIG. 3B.

Some of the components illustrated in FIGS. 3A to 3C may not be necessary in order to implement the driver assistance apparatus 100. Thus, the driver assistance apparatus 100 described in the present specification may include a greater or smaller number of components than those mentioned above. For example, the driver assistance apparatus 100 may include only the processor 170 and the camera 195.

Figure 4A:
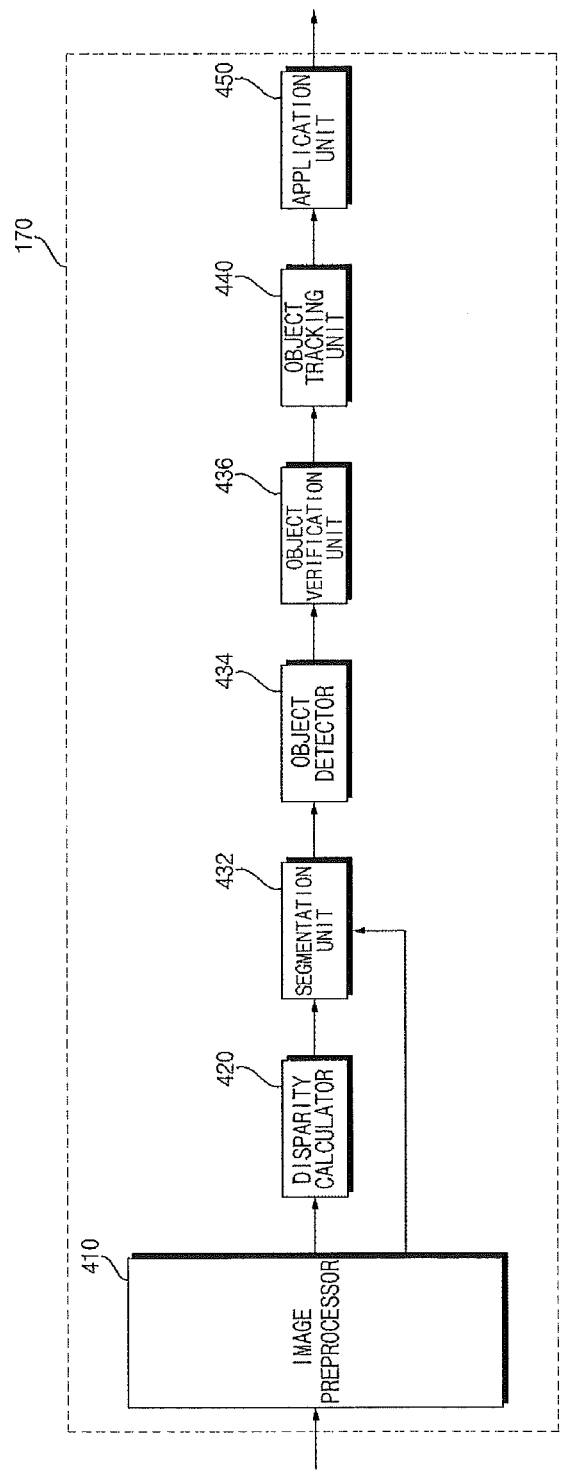
FIGS. 4A and 4B are example internal block diagrams illustrating a processor of FIGS. 3A and 3B.
Figure 4B:
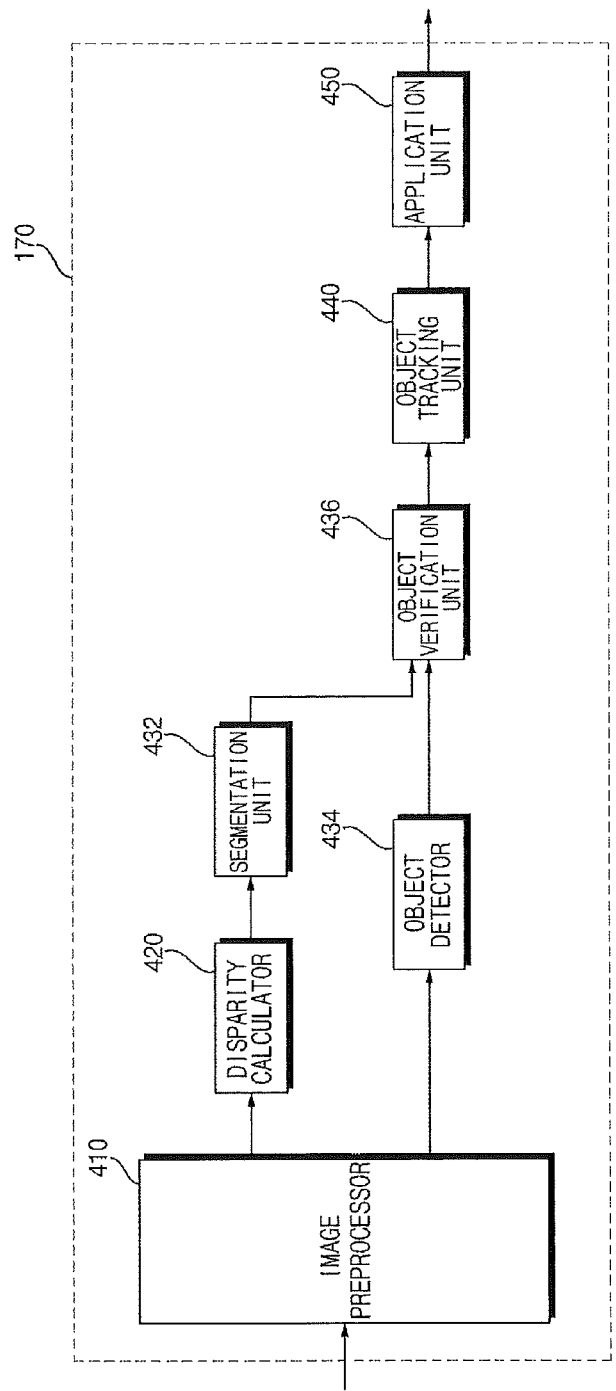

FIGS. 4A and 4B are various example internal block diagrams illustrating the processor of FIGS. 3A and 3B, and FIGS. 5A and 5B illustrate the example operation of the processor of FIGS. 4A and 4B.

First, referring to FIG. 4A illustrating one example of the processor 170 in internal block diagram, the processor 170 included in the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 may receive an image from the camera 195 and preprocess the received image.

Specifically, the image preprocessor 410 may perform, for example, noise reduction, rectification, calibration, color enhancement, Color Space Conversion (CSC), interpolation, and camera gain control for the image. As such, the image preprocessor 410 may acquire an image more vivid than stereo images captured by the camera 195.

The disparity calculator 420 may receive images signal-processed by the image preprocessor 410, perform stereo matching for the received images, and acquire a binocular disparity map based on the stereo matching. That is, the disparity calculator 420 may acquire binocular disparity information related to the stereo images for a view in front of the vehicle.

At this time, the stereo matching may be performed on a per pixel basis or on a per prescribed block basis of the stereo images. Here, the binocular disparity map may refer to a map in which binocular parallax information between stereo images, i.e. left and right images are represented by numerical values.

The segmentation unit 432 may perform segmentation and clustering on at least one of the stereo images based on the binocular disparity information from the disparity calculator 420.

Specifically, the segmentation unit 432 may segment at least one of the stereo images into a background and a foreground based on the binocular disparity information.

For example, the segmentation unit 432 may calculate a region of the disparity map, in which the binocular disparity information is a predetermined value or less, as a background and exclude the corresponding region. In this way, a foreground may be relatively separated.

In another example, the segmentation unit 432 may calculate a region of the disparity map, in which the binocular disparity information is a predetermined value or more, as a foreground and extract the corresponding region. In this way, the foreground may be separated.

As described above, when the image is segmented into the foreground and the background based on the binocular disparity information extracted based on the stereo images, it may be possible to reduce a signal processing speed and a signal processing amount during subsequent object detection.

Subsequently, the object detector 434 may detect an object based on image segment by the segmentation unit 432.

That is, the object detector 434 may detect an object for at least one of the stereo images based on the binocular disparity information.

Specifically, the object detector 434 may detect an object for at least one of the stereo images. For example, the object detector 434 may detect an object from the foreground separated by image segment.

Subsequently, the object verification unit 436 may classify and verify the separated object.

To this end, the object verification unit 436 may use, for example, an identification method using a neural network, a Support Vector Machine (SVM) method, an AdaBoost identification method using a Harr-like feature, or a Histograms of Oriented Gradients (HOG) method.

In some cases, the object verification unit 436 may compare the detected object with objects stored in the memory 140 to verify the detected object.

For example, the object verification unit 436 may verify an adjacent vehicle, a traffic lane marker, a road surface, a traffic sign, a dangerous zone, and a tunnel, which are located around the vehicle.

The object tracking unit 440 may track the verified object. For example, the object tracking unit 440 may verify an object included in sequentially acquired stereo images, calculate the motion or motion vector of the verified object, and track, for example, the movement of the corresponding object based on the calculated motion or motion vector. As such, the object tracking unit 440 may track, for example, an adjacent vehicle, a traffic lane marker, a road surface, a traffic sign, a dangerous zone, and a tunnel, which are located around the vehicle.

Subsequently, the application unit 450 may calculate, for example, the accident risk of the vehicle 1 based on various objects located around the vehicle, for example, other vehicles, traffic lane markers, road surface, and traffic signs. In addition, the application unit 450 may calculate the possibility of front-end collision with a front vehicle and whether or not loss of traction occurs.

In addition, the application unit 450 may output, for example, a message to notify a user of driver assistance information such as, for example, the calculated risk, collision possibility, or traction loss. Alternatively, the application unit 450 may generate a control signal, as vehicle control information, for the attitude control or traveling control of the vehicle 1.

In some cases, the image preprocessor 410, the disparity calculator 420, the segmentation unit 432, the object detector 434, the object verification unit 436, the object tracking unit 440, and the application unit 450 may be internal components of an image processing unit 810 included in the processor 170 that will be described below with reference to FIG. 7 and the following drawings.

In some implementations, the processor 170 may include only some of the image preprocessor 410, the disparity calculator 420, the segmentation unit 432, the object detector 434, the object verification unit 436, the object tracking unit 440, and the application unit 450. For example, when the camera 195 is a monocular camera or around-view cameras, the disparity calculator 420 may be excluded. In addition, in some implementations, the segmentation unit 432 may be excluded.

FIG. 4B is an internal block diagram illustrating another example of the processor.

Referring to FIG. 4B, the processor 170 includes the same internal units as those of the processor 170 of FIG. 4A, but has a signal processing sequence different from that of the processor 170 of FIG. 4A. The following description will focus on this difference.

The object detector 434 may receive stereo images and detect an object for at least one of the stereo images.

Differently from FIG. 4A, the object detector 434 may not detect an object for a segmented image based on the binocular disparity information, but directly detect an object from the stereo images.

Subsequently, the object verification unit 436 classifies and verifies the detected and separated object based on image segment from the segmentation unit 432 and the object detected by the object detector 434.

To this end, the object verification unit 436 may use an identification method using a neural network, a SVM method, an AdaBoost identification method using a Haar-like feature, or a HOG method.

Figure 5A:
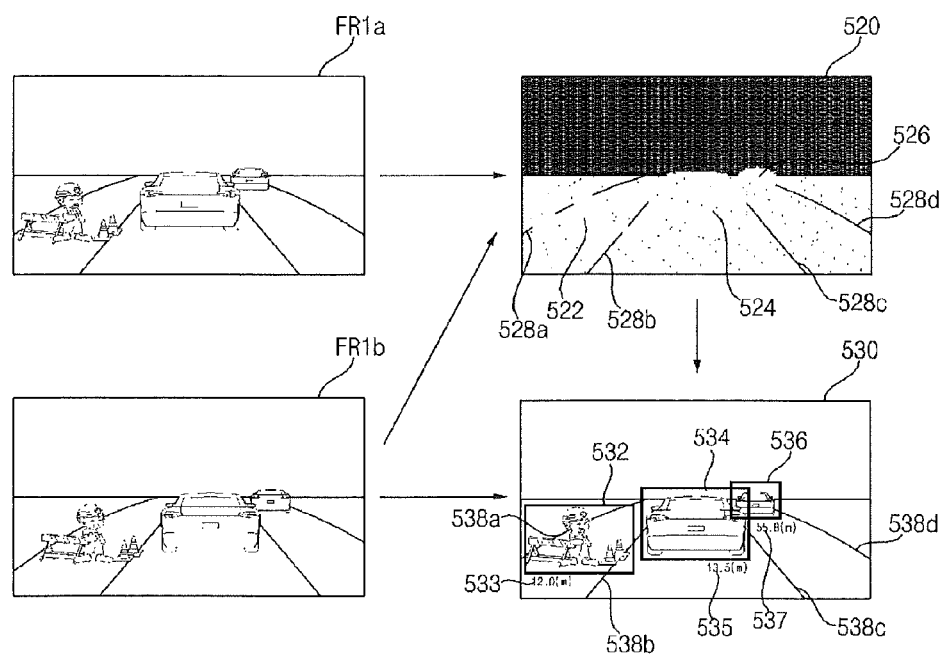
FIGS. 5A and 5B are views illustrating example operations of the processor of FIGS. 4A and 4B.
Figure 5B:
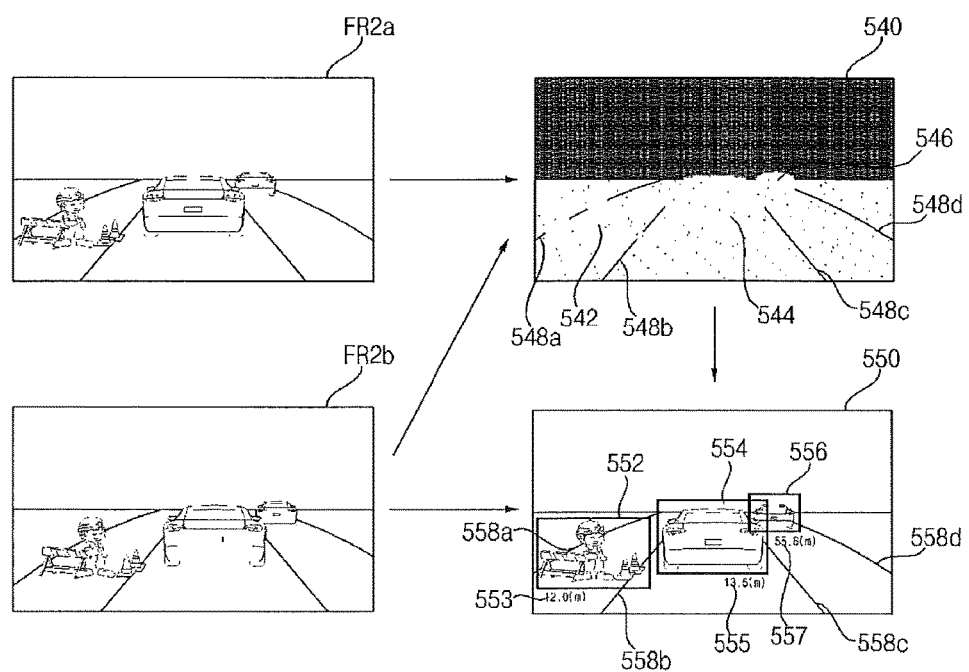

FIGS. 5A and 5B illustrate an example operation method of the processor 170 illustrated in FIG. 4A based on stereo images acquired respectively from first and second frame periods.

Referring first to FIG. 5A, the stereo cameras 195a and 195b may acquire stereo images during a first frame period.

The disparity calculator 420 included in the processor 170 receives stereo images FR1a and FR1b signal-processed by the image preprocessor 410 and performs stereo matching for the received stereo images FR1a and FR1b to acquire a disparity map 520.

The disparity map 520 shows a binocular disparity between the stereo images FR1a and FR1b as levels. As the disparity level is higher, the distance to the vehicle may be calculated as being shorter. As the disparity level is lower, the distance to the vehicle may be calculated as being longer.

In some cases, when the disparity map is displayed, the disparity map may be displayed with higher brightness as the disparity level is higher and displayed with lower brightness as the disparity level is lower.

FIG. 5A shows, by way of example, that, in the disparity map 520, first to fourth traffic lane markers 528a, 528b, 528c, and 528d have their own disparity levels and a roadwork zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the stereo images FR1a and FR1b based on the disparity map 520.

FIG. 5A shows, by way of example, that object detection and object verification for the second stereo image FR1b are performed using the disparity map 520.

That is, object detection and object verification for first to fourth traffic lane markers 538a, 538b, 538c, and 538d, a roadwork zone 532, a first preceding vehicle 534, and a second preceding vehicle 536 in an image 530 may be performed.

Next, referring to FIG. 5B, the stereo cameras 195a and 195b acquire stereo images during a second frame period.

The disparity calculator 420 included in the processor 170 receives stereo images FR2a and FR2b signal-processed by the image preprocessor 410 and performs stereo matching for the received stereo images FR2a and FR2b to acquire a disparity map 540.

FIG. 5B shows, by way of example, that, in the disparity map 540, first to fourth traffic lane markers 548a, 548b, 548c, and 548d have their own disparity levels and a roadwork zone 542, a first preceding vehicle 544, and a second preceding vehicle 546 have their own disparity levels.

The segmentation unit 432, the object detector 434, and the object verification unit 436 respectively perform segmentation, object detection, and object verification for at least one of the stereo images FR2a and FR2b based on the disparity map 540.

FIG. 5B shows, by way of example, that object detection and object verification for the second stereo image FR2b are performed using the disparity map 540.

That is, object detection and object verification for first to fourth traffic lane markers 558a, 558b, 558c, and 558d, a roadwork zone 552, a first preceding vehicle 554, and a second preceding vehicle 556 in an image 550 may be performed.

In some cases, the object tracking unit 440 may track verified objects by comparing FIGS. 5A and 5B with each other.

Specifically, the object tracking unit 440 may track movement of an object based on the motion or motion vectors of respective objects verified from FIGS. 5A and 5B. As such, the object tracking unit 440 may track, for example, traffic lane markers, a roadwork zone, a first preceding vehicle and a second preceding vehicle, which are located around the vehicle.

Figure 6A:
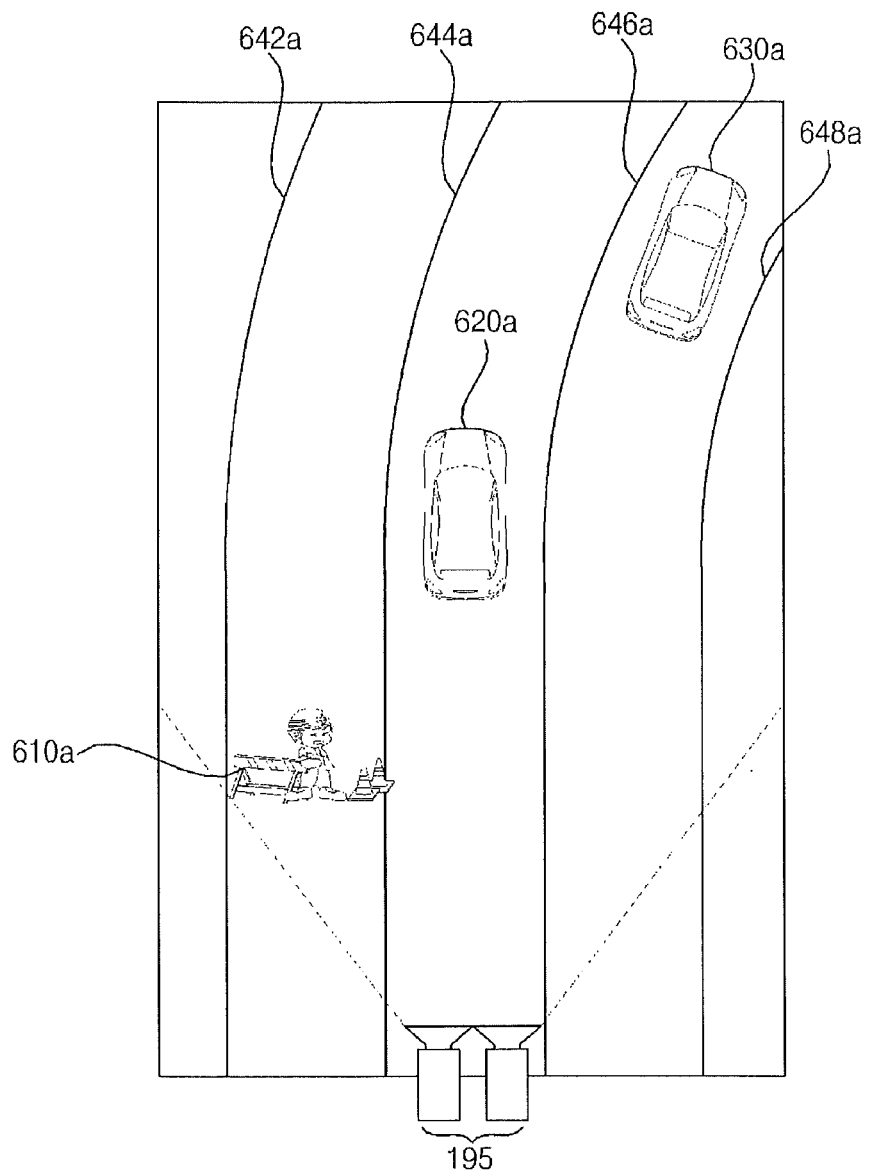
FIGS. 6A and 6B are views illustrating example operations of the driver assistance apparatus of FIGS. 3A to 3C.
Figure 6B:
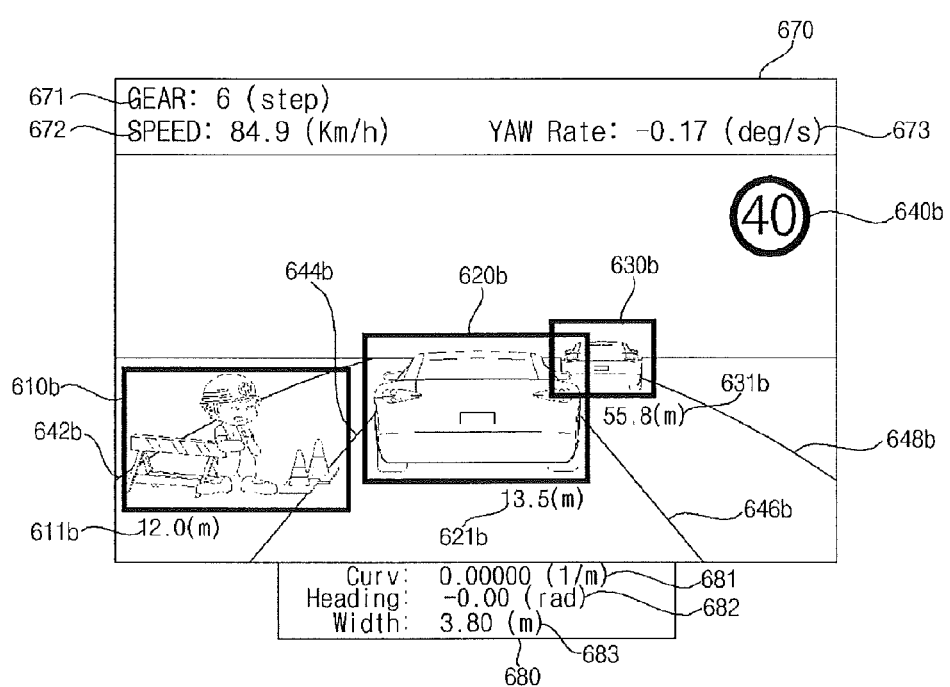

FIGS. 6A and 6B explain example operations of the driver assistance apparatus of FIGS. 3A to 3C.

First, FIG. 6A is illustrates the view in front of the vehicle captured by the stereo cameras 195a and 195b mounted in the vehicle. In particular, FIG. 6A illustrates the view in front of the vehicle in a bird's eye view form.

Referring to FIG. 6A, a first traffic lane marker 642a, a second traffic lane marker 644a, a third traffic lane marker 646a, and a fourth traffic lane marker 648a are arranged from the left to the right, a roadwork zone 610a is located between the first traffic lane marker 642a and the second traffic lane marker 644a, a first preceding vehicle 620a is located between the second traffic lane marker 644a and the third traffic lane marker 646a, and a second preceding vehicle 630a is located between the third traffic lane marker 646a and the fourth traffic lane marker 648a.

Next, FIG. 6B illustrates the view in front of the vehicle recognized by the driver assistance apparatus 100 along with various pieces of information. In particular, an image as illustrated in FIG. 6B may be displayed on the display unit 180 provided in the driver assistance apparatus 100, the AVN apparatus 400, or the display unit 741.

In contrast to FIG. 6A, FIG. 6B illustrates the display of information based on images captured by the stereo cameras 195a and 195b.

Referring to FIG. 6B, a first traffic lane marker 642b, a second traffic lane marker 644b, a third traffic lane marker 646b, and a fourth traffic lane marker 648b are arranged from the left to the right, a roadwork zone 610b is located between the first traffic lane marker 642b and the second traffic lane marker 644b, a first preceding vehicle 620b is located between the second traffic lane marker 644b and the third traffic lane marker 646b, and a second preceding vehicle 630b is located between the third traffic lane marker 646b and the fourth traffic lane marker 648b.

The driver assistance apparatus 100 may verify objects for the roadwork zone 610b, the first preceding vehicle 620b, and the second preceding vehicle 630b by signal processing stereo images captured by the stereo cameras 195a and 195b. In addition, the driver assistance apparatus 100 may verify the first traffic lane marker 642b, the second traffic lane marker 644b, the third traffic lane marker 646b, and the fourth traffic lane marker 648b.

In some cases, in FIG. 6B, in order to represent object verification for the roadwork zone 610b, the first preceding vehicle 620b, and the second preceding vehicle 630b, the roadwork zone 610b, the first preceding vehicle 620b, and the second preceding vehicle 630b may be highlighted in black boxes.

In some cases, the driver assistance apparatus 100 may calculate distance information regarding the roadwork zone 610b, the first preceding vehicle 620b, and the second preceding vehicle 630b based on the stereo images captured by the stereo cameras 195a and 195b.

FIG. 6B illustrates the display of calculated first distance information 611b, second distance information 621b, and third distance information 631b, which correspond respectively to the roadwork zone 610b, the first preceding vehicle 620b, and the second preceding vehicle 630b.

In some cases, the driver assistance apparatus 100 may receive vehicle sensor information from the controller 770 or the sensing unit 760. In particular, the driver assistance apparatus 100 may receive vehicle speed information, gear information, yaw rate information that represents the change rate of a rotation angle (yaw) of the vehicle, and vehicle angle information and display the aforementioned information.

Although FIG. 6B illustrates that vehicle speed information 672, gear information 671, and yaw rate information 673 are displayed in an upper portion 670 of a forward image of the vehicle and vehicle angle information 682 is displayed in a lower portion 680 of the forward image of the vehicle, various other examples are possible. In addition, vehicle width information 683 and road curvature information 681 may be displayed along with the vehicle angle information 682.

In some cases, the driver assistance apparatus 100 may receive speed limit information for a road on which the vehicle 700 is traveling via the communication unit 120 or the interface unit 130. FIG. 6B illustrates display of speed limit information 640b.

Although the driver assistance apparatus 100 may display various pieces of information illustrated in FIG. 6B via, for example, the display unit 180, alternatively, the driver assistance apparatus 100 may store various pieces of information without displaying the same. In addition, the driver assistance apparatus 100 may utilize the information in a variety of applications.

Figure 7:
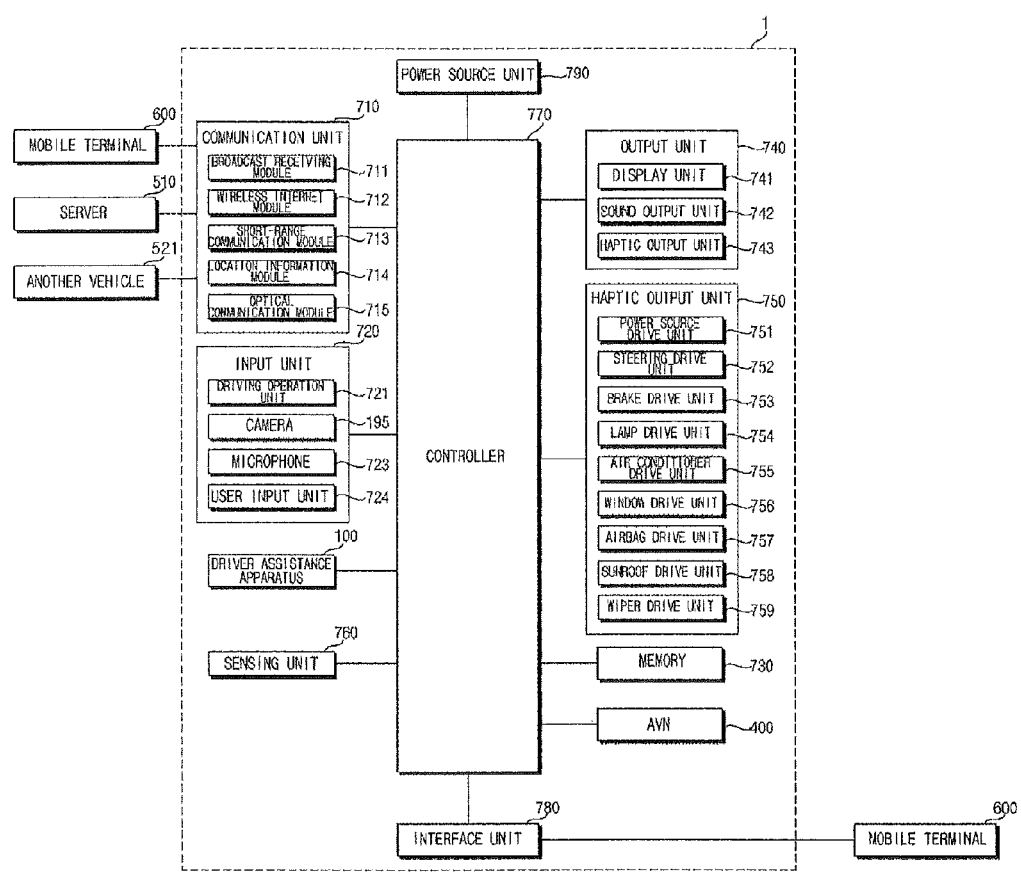
FIG. 7 is an example internal block diagram illustrating one example of the vehicle of FIG. 1.

FIG. 7 is a block diagram illustrating one example of the vehicle 1 of FIG. 1.

The vehicle 1 may include the communication unit 710, the input unit 720, the sensing unit 760, an output unit 740, a vehicle drive unit 750, a memory 730, an interface unit 780, the controller 770, the power source unit 790, the driver assistance apparatus 100, and the AVN apparatus 400.

The communication unit 710 may include one or more modules to enable the wireless communication between the vehicle 1 and the mobile terminal 600, between the vehicle 1 and the external server 510, or between the vehicle 1 and another vehicle. In addition, the communication unit 710 may include one or more modules to connect the vehicle 1 to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 1. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSDPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 510 in a wireless manner. The wireless Internet module 712 may receive weather information and road traffic state information (e.g., Transport Protocol Expert Group (TPEG) information) from the external server 510.

The short-range communication module 713 may assist short-range communication using at least one selected from among Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 1 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user gets into the vehicle 1, the mobile terminal 600 of the user and the vehicle 1 may pair with each other automatically or as the user executes a pairing application.

The location information module 714 is a module to acquire a location of the vehicle 1. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDPs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some implementations, the light emitting unit may include an array of a plurality of light emitting elements. In some implementations, the light emitting unit may be integrated with a lamp provided in the vehicle 1. For example, the light emitting unit may be at least one selected from among a headlight, a taillight, a brake light, a turn signal light, and a sidelight. For example, the optical communication module 715 may exchange data with another vehicle 521 via optical communication.

The input unit 720 may include a driving operation unit 721, the camera 195, a microphone 723, and the user input unit 724.

The driving operation unit 721 is configured to receive user input for the driving of the vehicle 1. The driving operation unit 721 may include the steering input unit 721*a*, a shift input unit 721*b*, an acceleration input unit 721*c*, and a brake input unit 721*d*.

The steering input unit 721*a* is configured to receive user input with regard to the direction of travel of the vehicle 1. The steering input unit 721*a* may take the form of the steering wheel 12 as illustrated in FIG. 1. In some implementations, the steering input unit 721*a* may be configured as a touchscreen, a touch pad, or a button.

The shift input unit 721*b* is configured to receive input for selecting one of Park (P), Drive (D), Neutral (N) and Reverse (R) gears of the vehicle 1 from the user. The shift input unit 721*b* may have a lever form. In some implementations, the shift input unit 721*b* may be configured as a touchscreen, a touch pad, or a button.

The acceleration input unit 721*c* is configured to receive user input for the acceleration of the vehicle 1. The brake input unit 721*d* is configured to receive user input for the speed reduction of the vehicle 1. Each of the acceleration input unit 721*c* and the brake input unit 721*d* may have a pedal form. In some implementations, the acceleration input unit 721*c* or the brake input unit 721*d* may be configured as a touchscreen, a touch pad, or a button.

The camera 195 may include an image sensor and an image processing module. The camera 195 may process a still image or a moving image acquired by the image sensor (e.g., a CMOS or a CCD). The image processing module may extract required information by processing a still image or a moving image acquired via the image sensor and, then, may transmit the extracted information to the controller 770. In some cases, the vehicle 1 may include the camera 195 to capture a forward image or a surround-view image of the vehicle and an internal camera 199 to capture an image of the interior of the vehicle.

The internal camera 199 may capture an image of a passenger. The internal camera 199 may capture an image of biometrics of the passenger.

Although FIG. 7 illustrates the camera 195 as being included in the input unit 720, the camera 195 may be described as being a component of the driver assistance apparatus 100 as described above with reference to FIGS. 2 to 6.

The microphone 723 may process external sound signals into electrical data. The processed data may be utilized in various ways according to a function that the vehicle 1 is performing. The microphone 723 may convert a user voice command into electrical data. The converted electrical data may be transmitted to the controller 770.

In some implementations, the camera 195 or the microphone 723 may be components of the sensing unit 760, other than components of the input unit 720.

The user input unit 724 is configured to receive information from the user. When information is input via the user input unit 724, the controller 770 may control the operation of the vehicle 1 to correspond to the input information. The user input unit 724 may include a touch input unit or a mechanical input unit. In some implementations, the user input unit 724 may be located in a region of the steering wheel. In this case, the driver may operate the user input unit 724 with the fingers while gripping the steering wheel.

The sensing unit 760 is configured to sense signals associated with, for example, the traveling of the vehicle 1. To this end, the sensing unit 760 may include a collision sensor, a steering sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, an infrared sensor, a radar, and lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation angle information. In addition, the driver assistance apparatus 100 that will be described below may generate control signals for acceleration, speed reduction, direction change and the like of the vehicle 1 based on information regarding the environment surrounding the vehicle acquired by at least one of the camera, the ultrasonic sensor, the infrared sensor, the radar, and lidar included in the vehicle 1. Here, the environment information may be information related to various objects located within a prescribed distance range from the vehicle 1 that is traveling. For example, the environment information may include the number of obstacles located within a distance of 100 m from the vehicle 1, the distances to the obstacles, the sizes of the obstacles, the kinds of the obstacles, and the like.

In some cases, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, the internal camera 199 and the microphone 723 may operate as sensors. The biometric information sensing unit may acquire hand geometry information and facial recognition information via the internal camera 199.

The output unit 740 is configured to output information processed in the controller 770. The output unit 740 may include the display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 1 and the user and also function to provide an output interface between the vehicle 1 and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

In some cases, the display unit 741 may include a cluster to allow the driver to check vehicle state information or vehicle traveling information while driving the vehicle. The cluster may be located on a dashboard. In this case, the driver may check information displayed on the cluster while looking forward.

In some implementations, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a wiper drive unit 759.

The power source drive unit 751 may perform electronic control for a power source inside the vehicle 1. The power source drive unit 751 may include an acceleration device to increase the speed of the vehicle 1 and a speed reduction device to reduce the speed of the vehicle 1.

For example, in the case where a fossil fuel based engine is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770.

In another example, when an electric motor is a power source, the power source drive unit 751 may perform control for the motor. As such, the power source drive unit 751 may control, for example, the RPM and torque of the motor.

The steering drive unit 752 may include a steering apparatus. Thus, the steering drive unit 752 may perform electronic control for a steering apparatus inside the vehicle 1. For example, the steering drive unit 752 may include a steering torque sensor, a steering angle sensor, and a steering motor. The steering torque, applied to the steering wheel 12 by the driver, may be sensed by the steering torque sensor. The steering drive unit 752 may control steering force and a steering angle by changing the magnitude and direction of current applied to the steering motor based on, for example, the speed and the steering torque of the vehicle 1. In addition, the steering drive unit 752 may judge whether the direction of travel of the vehicle 1 is correctly being adjusted based on steering angle information acquired by the steering angle sensor. As such, the steering drive unit 752 may change the direction of travel of the vehicle 1. In addition, the steering drive unit 752 may reduce the sense of weight of the steering wheel 12 by increasing the steering force of the steering motor when the vehicle 1 travels at a low speed and may increase the sense of weight of the steering wheel 12 by reducing the steering force of the steering motor when the vehicle 1 travels at a high speed. In addition, when the autonomous driving function of the vehicle 1 is executed, the steering drive unit 752 may control the steering motor to generate appropriate steering force based on, for example, the sensing signals output from the sensing unit 760 or control signals provided by the processor 170 even in the state in which the driver operates the steering wheel 12 (i.e. in the state in which no steering torque is sensed).

The brake drive unit 753 may perform electronic control of a brake apparatus inside the vehicle 1. For example, the brake drive unit 753 may reduce the speed of the vehicle 1 by controlling the operation of brakes located at wheels. In another example, the brake drive unit 753 may adjust the direction of travel of the vehicle 1 leftward or rightward by differentiating the operation of respective brakes located at left and right wheels.

The lamp drive unit 754 may turn at least one lamp arranged inside and outside the vehicle 1 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner inside the vehicle 1. For example, when the interior temperature of the vehicle 1 is high, the air conditioner drive unit 755 may operate the air conditioner to supply cold air to the interior of the vehicle 1.

The window drive unit 756 may perform the electronic control of a window apparatus inside the vehicle 1. For example, the window drive unit 756 may control the opening or closing of left and right windows of the vehicle 1.

The airbag drive unit 757 may perform the electronic control of an airbag apparatus inside the vehicle 1. For example, the airbag drive unit 757 may control an airbag to be deployed in a dangerous situation.

The sunroof drive unit 758 may perform electronic control of a sunroof apparatus inside the vehicle 1. For example, the sunroof drive unit 758 may control the opening or closing of a sunroof.

The wiper drive unit 759 may perform the electronic control of the wipers 14a and 14b included in the vehicle 1. For example, the wiper drive unit 759 may perform electronic control with regard to, for example, the number of operations and the speed of operation of the wipers 14a and 14b in response to user input upon receiving the user input that directs operation of the wipers 14a and 14b through the user input unit 724. In another example, the wiper drive unit 759 may judge the amount or strength of rainwater based on sensing signals of a rain sensor included in the sensing unit 760 so as to automatically operate the wipers 14a and 14b without the user input.

In some cases, the vehicle drive unit 750 may further include a suspension drive unit. The suspension drive unit may perform the electronic control of a suspension apparatus inside the vehicle 1. For example, when the road surface is uneven, the suspension drive unit may control the suspension apparatus to reduce vibration of the vehicle 1.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 1 such as, for example programs for the processing or control of the controller 770.

The interface unit 780 may serve as a passage for various kinds of external devices that are connected to the vehicle 1. For example, the interface unit 780 may have a port that is connectable to the mobile terminal 600 and may be connected to the mobile terminal 600 via the port. In this case, the interface unit 780 may exchange data with the mobile terminal 600.

In some cases, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 1. The controller 770 may be referred to as an Electronic Control Unit (ECU).

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power source unit 790 may supply power required to operate the respective components under the control of the controller 770. In particular, the power source unit 790 may receive power from, for example, a battery inside the vehicle 1.

The driver assistance apparatus 100 may exchange data with the controller 770. A control signal generated in the driver assistance apparatus 100 may be output to the controller 770. The controller 770 may control the direction of travel of the vehicle 1 based on a control signal received by the driver assistance apparatus 100.

The AVN apparatus 400 may exchange data with the controller 770. The controller 770 may receive navigation information from the AVN apparatus 400 or a separate navigation apparatus. Here, the navigation information may include set destination information, destination based routing information, and map information or vehicle location information related to vehicle traveling.

In some cases, some of the components illustrated in FIG. 7 may be not necessary to implement the vehicle 1. Accordingly, the vehicle 1 described in the present specification may include a greater or smaller number of components than those mentioned above.

The driver assistance apparatus 100 may generate various control signals to adjust, for example, the direction of travel of the vehicle 1 based on an image generated by at least one of the cameras 195 to 198 mounted to the vehicle 1. Alternatively, the driver assistance apparatus 100 may generate various control signals to adjust, for example, the direction of travel of the vehicle 1 based on information regarding the environment around the vehicle 1 acquired by at last one sensor mounted to the vehicle 1.

For convenience of description, the following description will be continued under the assumption that the driver assistance apparatus 100 generates various control signals to adjust, for example, the direction of travel of the vehicle 1 based on an image generated by the camera 195 that captures an image of the view in front of the vehicle 1.

Figure 8:
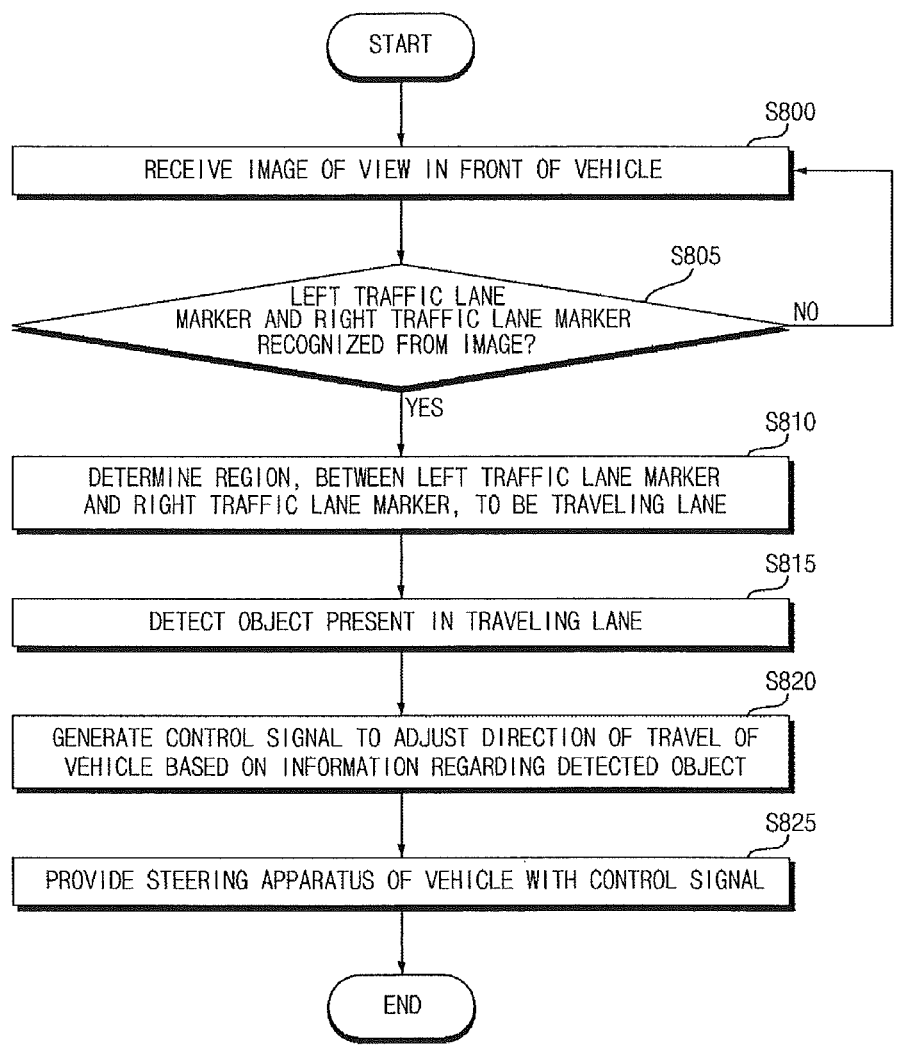
FIG. 8 is a flowchart illustrating an example control method of the driver assistance apparatus.

FIG. 8 is a flowchart illustrating an example control method of the driver assistance apparatus 100 according to one implementation.

Referring to FIG. 8, the processor 170 may receive an image of the view in front of the vehicle 1 (hereinafter referred to as a "traveling image") (S800). The traveling image may be provided from the camera 195 mounted to one side of the front end of the vehicle 1. Here, the camera 195 may be the camera 195 described with reference to FIGS. 2A to 3C. The camera 195 may capture an image of the view in front of the vehicle 1 to generate the traveling image, and provide the processor 170 with the generated traveling image either in real time or periodically upon receiving a user request, or when a predetermined condition is satisfied under the control of the processor 170. At this time, the traveling image, generated by the camera 195, may show at least one object. Examples of objects that may be shown in the traveling image include other vehicles, surrounding facilities, traffic signal lights, traffic signs, pedestrians, and the road surface.

Subsequently, the processor 170 may recognize a left traffic lane marker and a right traffic lane marker from the image received in Step S800 (S805). Specifically, the processor 170 may recognize a left traffic lane marker and a right traffic lane marker among objects shown in the traveling image, in order to recognize the lane in which the vehicle 1 is currently traveling. For example, the processor 170 may perform Lane Detection (LD) for the traveling image, thereby recognizing a left traffic lane marker located at the left side of the vehicle 1 and a right traffic lane marker located at the right side of the vehicle 1. When the processor 170 fails to recognize at least one of the left traffic lane marker and the right traffic lane marker in Step S805, the processor 170 may return to Step S800 and repeat Step S805 until both the left traffic lane marker and the right traffic lane marker are recognized from a traveling image that is additionally provided from the camera 195.

Subsequently, once both the left traffic lane marker and the right traffic lane marker have been recognized in Step S805, the processor 170 may judge that a region between the recognized left and right traffic lane markers is the traveling lane of the vehicle 1 (S810). Specifically, the processor 170 may judge that the region, the left boundary of which is the recognized left traffic lane marker and the right boundary of which is the recognized right traffic lane marker, is the current traveling lane of the vehicle 1.

In some cases, the processor 170 may judge the traveling lane of the vehicle 1 based on location information of the vehicle 1 provided from a GPS module of the vehicle 1. Specifically, in the case where a plurality of lanes is present in the zone in which the vehicle 1 is traveling, the processor 170 may judge the traveling lane of the vehicle 1 by matching the location information of the vehicle 1 provided from the GPS module with electronic map information previously stored in the memory 140. Since the electronic map information may contain information regarding the number and positions of lanes falling within the zone in which the vehicle 1 is traveling, the processor 170 may judge which of the lanes is the current traveling lane of the vehicle 1 by comparing the map information with the location information of the vehicle 1. In this case, Steps S805 and S810 may be omitted.

Subsequently, the processor 170 detects an object present in the traveling lane judged via the above-described process (S815). Specifically, the processor 170 may detect only an object present in the traveling lane among one or more objects shown in the traveling image. For example, the processor 170 may set a region, corresponding to the traveling lane, within the entire traveling image, as a Region Of Interest (ROI), and perform object detection only on the ROI. That is, the processor 170 may not perform object detection on the remainder of the entire traveling image excluding the ROI. In this way, calculation for object detection may be remarkably reduced, which may improve information processing speed.

In addition, once the processor 170 has judged the traveling lane based on the left traffic lane marker and the right traffic lane marker, the processor 170 may detect only the remaining objects, excluding the traffic lane markers, among the objects shown in the traveling image. For example, the processor 170 may detect only an object having a volume among the objects shown in the traveling image in Step S815.

Specifically, the processor 170 may calculate which of the two sides the detected object is located in, based on the center of the traveling lane, and the distance between the detected object and the center of the traveling lane. In addition, the processor 170 may calculate the distance between the detected object and the vehicle 1. In addition, the processor 170 may calculate the length and width of the detected object. In addition, the processor 170 may judge, for example, the shape and color of the detected object and whether the detected object is moving.

In some cases, upon detection of the object present in the traveling lane, the processor 170 may judge the kind of the detected object. For example, the processor 170 may judge whether the detected object is a pothole or an obstacle. Specifically, the processor 170 may judge whether the object is raised from or indented in the traveling lane based on distance information included in the object information detected in Step S815. Upon judging that the object is indented in the traveling lane, the processor 170 may judge that the object is a pothole. On the other hand, upon judging that the object is raised from the traveling lane, the processor 170 may judge that the object is an obstacle.

In addition, upon detection of the object present in the traveling lane, the processor 170 may calculate the position and size of the detected object. At this time, the processor 170 may calculate the position and size of the object only when it is judged that the detected object is either a pothole or an obstacle.

In addition, the processor 170 may calculate the degree of indentation of the pothole from the traveling lane, i.e. the depth of the pothole. For example, the height difference between the deepest point of the pothole indented in the traveling lane and the road surface of the traveling lane may be calculated and taken as the depth of the pothole. In addition, the processor 170 may calculate the extent to which the obstacle is raised from the traveling lane, i.e. the height of the obstacle. For example, the height difference between the highest point of the obstacle raised from the traveling lane and the road surface of the traveling lane may be calculated as the height of the obstacle.

In some cases, when the detected object is the obstacle, the processor 170 may judge whether the obstacle is a falling object. The operation of judging whether the obstacle is a falling object will be described below in detail with reference to FIG. 20.

Subsequently, the processor 170 generates a control signal to adjust the direction of travel of the vehicle 1 in the traveling lane based on the object information detected in Step S815 (S820). That is, the processor 170 may generate a control signal to adjust the direction of travel of the vehicle 1 along a guide route, which allows the vehicle 1 to avoid the object, detected in Step S815, while traveling in the current lane without moving to another lane, or minimizes damage attributable to the obstacle detected in Step S815.

Subsequently, the processor 170 may provide the steering apparatus of the vehicle 1 with the control signal generated in Step S820 (S825). The steering apparatus of the vehicle 1 may adjust the direction of travel of the vehicle 1 based on the control signal provided from the processor 170. In this way, the vehicle 1 may travel along the above-described guide route in the traveling lane.

In some cases, the processor 170 may provide components, rather than the steering apparatus of the vehicle 1, with the control signal generated in Step S820. For example, the processor 170 may transmit the control signal generated in Step S820 to, for example, an accelerator, a speed reducer, and the display unit 741 of the vehicle 1. For example, when the vehicle 1 travels at high speed and simply adjusting the direction of travel of the vehicle 1 has difficulty in allowing the vehicle 1 to travel along the guide route, the speed reducer of the power source drive unit 751 may reduce the speed of the vehicle 1 based on the control signal provided from the processor 170. In another example, the display unit 741 may display the guide route corresponding to the control signal provided from the processor 170 on the screen thereof, so as to assist the driver in visually recognizing the route, along which the vehicle 1 has to travel.

Figure 9A:
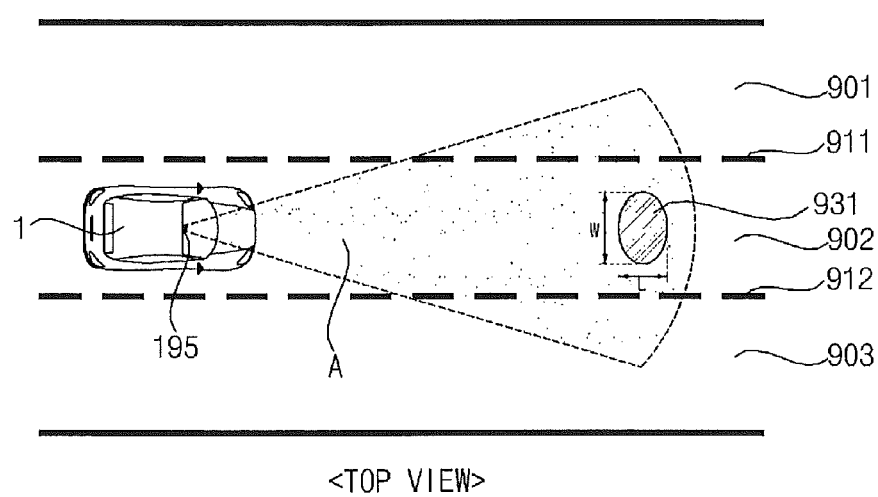
FIGS. 9A to 9C are views illustrating one example of judging the traveling lane and the kind of an object using the driver assistance apparatus.
Figure 9B:
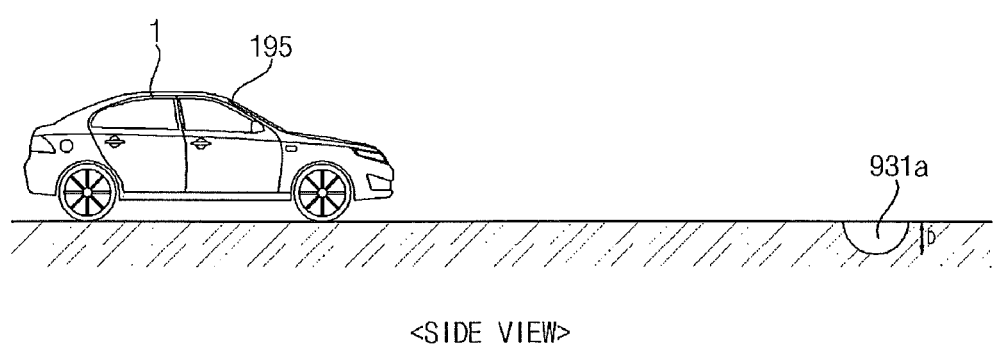
Figure 9C:
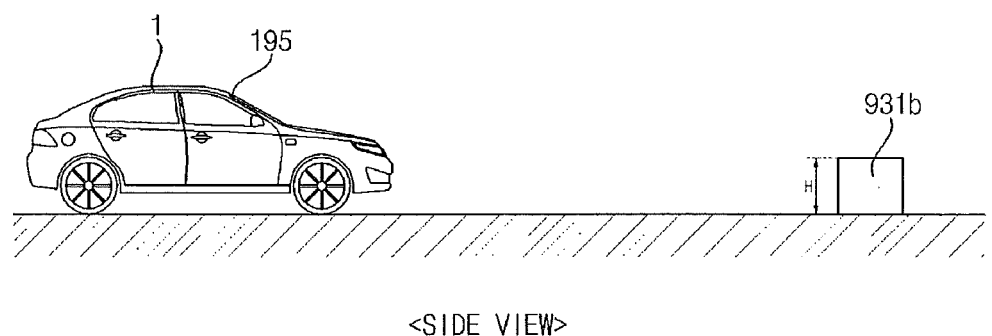

FIGS. 9A to 9C illustrate an example of judging the traveling lane and the kind of an object using the driver assistance apparatus 100.

First, FIG. 9A illustrates the top view of the case where the vehicle 1 is traveling in a section including three lanes. Specifically, the three lanes include a leftmost first lane 901, a center second lane 902, and a rightmost third lane 903. In addition, the first lane 901 and the second lane 902 are separated from each other by a left traffic lane marker 911, and the second lane 902 and the third lane 903 are separated from each other by a right traffic lane marker 912. For convenience of description, as illustrated, the driver assistance apparatus 100 is assumed to be included in the vehicle 1 that is traveling in the second lane 902. That is, the traveling lane of the vehicle 1 is assumed to be the second lane 902.

The camera 195 captures an image of a prescribed range A in front of the vehicle 1 as illustrated to generate a traveling image. The image capture range A of the camera 195 may vary according to, for example, the installation position, installation angle, and view angle of the camera 195.

In some cases, as exemplarily illustrated in FIG. 9A, the second lane 902 is separated from the first lane 901 by the left traffic lane marker 911 and separated from the third lane 903 by the right traffic lane marker 912. Since both the left traffic lane marker 911 and the right traffic lane marker 912 fall within the image capture range A of the camera 195, the processor 170 may recognize the left traffic lane marker 911 and the right traffic lane marker 912 by performing traffic lane marker detection for the traveling image generated by the camera 195. In addition, the processor 170 may judge that the vehicle 1 is currently traveling in the traveling lane, both boundaries of which are the left traffic lane marker 911 and the right traffic lane marker 912, i.e. in the second lane 902.

However, the method of judging the traveling lane of the vehicle 1 by the processor 170 may not be limited to the use of the left traffic lane marker 911 and the right traffic lane marker 912 and that various other methods may be utilized. In one example, the processor 170 may match the location information of the vehicle 1 provided from the GPS module of the vehicle 1 with map information previously stored in the memory 140 and judge which lane among a plurality of lanes included in the map information is the lane in which the vehicle 1 is currently traveling.

In some cases, an object 931 may be present in the second lane 902, which is the traveling lane of the vehicle 1 as illustrated. The object 931 present in the traveling lane may be shown in the traveling image generated by the camera 195 which captures an image of the traveling lane. As such, the processor 170 may detect the object 931 by performing object detection for the traveling image. At this time, the processor 170 may calculate the size of the detected object 931. For example, as illustrated, the processor 170 may calculate the length L and the width W of the object 931. Here, the length L of the object 931 may mean the distance between front and rear ends of the object 931 and the width W of the object 931 may mean the distance between left and right ends of the object 931.

In addition, as illustrated in FIGS. 9B and 9C, upon detection of the object 931 from the traveling image, the processor 170 may judge whether the detected object 931 corresponds to a pothole or an obstacle based on distance information among various pieces of information regarding the object included in the traveling image.

For example, when the traveling image generated by the camera 195 is a stereo image, the processor 170 may generate a depth map by acquiring a disparity map based on the stereo image and changing respective disparity values included in the disparity map with distance values. The depth map may include coordinate values and depth values for each energy pixel included in the region in which the object 931 is shown within the traveling image. The processor 170 may judge whether the object 931 is indented in or raised from the traveling lane based on the depth values included in the depth map.

FIG. 9B illustrates the side view of the case where the object 931 illustrated in FIG. 9A is indented in the traveling lane, i.e. the case where the object 931 is a pothole 931*a*. In the present disclosure, the pothole may refer to a local hole that is formed in the road surface and is concave compared to the remainder of the road surface. The processor 170 may judge that the object 931 in the second lane 902 is the pothole 931*a*. For example, the processor 170 may judge that a region, the depth value of which is a predetermined first value or more, in the depth map region for the traveling image corresponding to the second lane 902 is the pothole 931*a*.

Referring to FIG. 9B, the pothole 931*a* is illustrated as being vertically concavely indented downward compared to the remainder of the road surface. As such, the processor 170 may calculate the depth D of the pothole 931*a* based on the depth map. Here, the depth D of the pothole 931*a* may mean the distance between the deepest point of the indented region corresponding to the pothole 931*a* and the road surface.

FIG. 9C illustrates the side view of the case where the object 931 illustrated in FIG. 9A is raised from the traveling lane, i.e. where the object 931 is an obstacle 931*b*. As used herein, an obstacle may refer to a raised portion that is convex compared to the remainder of the road surface. When the object 931 is raised from the second lane 902, the processor 170 may judge that the object 931 is the obstacle 931*b*. For example, the processor 170 may judge that a region, the depth value of which is a predetermined second reference value or less, in the depth map for the traveling image corresponding to the second lane 902 is the obstacle 931*b*.

Referring to FIG. 9C, the obstacle 931*b* is shown vertically convexly raised upward compared to the remainder of the road surface. Thus, the processor 170 may calculate the height H of the obstacle 931*b* based on the depth map. Here, the height H of the obstacle 931*b* may mean the distance between the highest point of the raised region corresponding to the obstacle 931*b* and the road surface.

The driver assistance apparatus 100 may judge the kind of an object present in the traveling lane and generate a control signal to adjust the direction of travel of the vehicle 1 in the traveling lane. In this way, it is possible to assist the vehicle in easily avoiding an object and to reduce damage to the vehicle 1, compared to the method of the related art in which the direction of travel of the vehicle is adjusted without consideration of, for example, the kind or size of an object.

Figure 10:
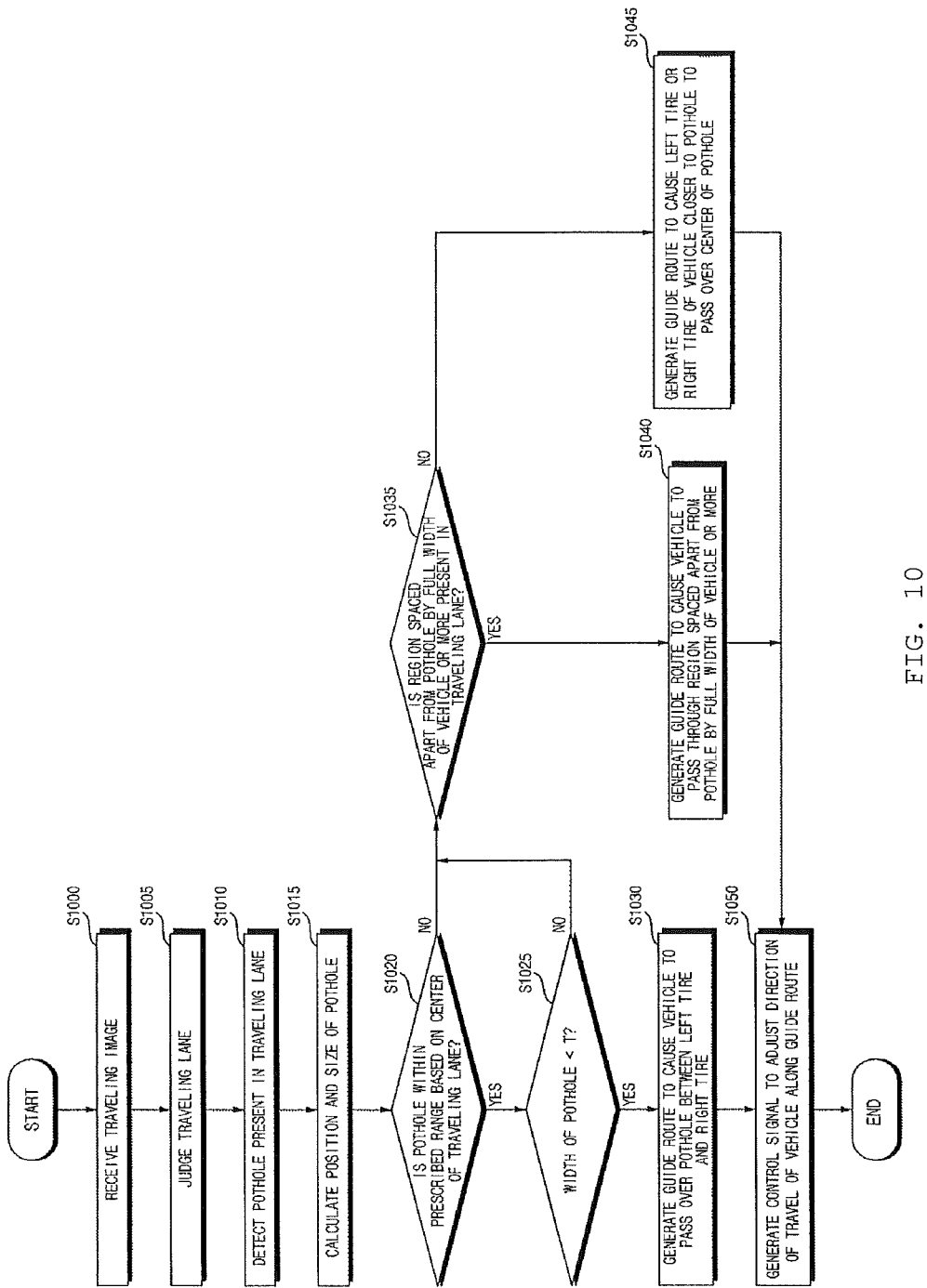
FIG. 10 is a flowchart illustrating one example of generating a guide route with respect to a pothole using the driver assistance apparatus.

FIG. 10 is a flowchart illustrating one example of generating a guide route with respect to a pothole using the driver assistance apparatus 100.

First, the processor 170 receives a traveling image (S1000). The traveling image may be provided from the camera 195 mounted to one side of the front end of the vehicle 1. The camera 195 may capture an image of the view in front of the vehicle 1 to generate a traveling image and transmit the generated traveling image to the processor 170 either in real time or periodically under the control of the processor 170. At this time, the traveling image generated by the camera 195 may show at least one object.

Subsequently, the processor 170 judges the traveling lane (S1005). In one example, the processor 170 may detect the left traffic lane marker 911 and the right traffic lane marker 912 from the traveling image received via Step S1000, and set a region, both boundaries of which are the detected left and right traffic lane markers 911 and 912, to the traveling lane. In another example, the processor 170 may judge and set the traveling lane of the vehicle 1 based on location information of the vehicle 1 provided via a separate process rather than Step S1000. In addition, the processor 170 may change information, which is used to judge the traveling lane, according to the traveling state. For example, when weather information received via the communication unit 710 of the vehicle 1 corresponds to bad weather, the processor 170 may judge the traveling lane of the vehicle 1 by comparing location information of the vehicle 1 with map information because there is high possibility of detection failure of the left traffic lane marker 911 and the right traffic lane marker 912 due to, for example, rain or snow.

Next, the processor 170 detects a pothole present in the traveling lane judged in Step S1005 (S1010). For example, as described above, since a pothole is vertically concavely indented downward compared to the remainder of the traveling lane, the processor 170 may determine a region, having a depth value corresponding to an indented region within the depth map, to be a pothole.

Subsequently, the processor 170 calculates the position and size of the detected pothole (S1015). In one example, the processor 170 may calculate the width of the pothole. In addition, the processor 170 may calculate the position of the pothole relative to the left and right boundaries of the traveling lane (i.e. the left traffic lane marker 911 and the right traffic lane marker 912).

Subsequently, the processor 170 judges whether the position of the pothole is within a prescribed range on the basis of the center of the traveling lane (S1020). For example, the processor 170 may judge whether the distance between the left end of the pothole and the left boundary of the traveling lane is a predetermined distance or more and whether the distance between the right end of the pothole and the right boundary of the traveling lane is a predetermined distance or more. At this time, the prescribed range may vary according to the width of the traveling lane. In some cases, the predetermined distance may be equal to or greater than the tire width of the vehicle 1 and less than half the full width O of the vehicle 1.

Subsequently, upon judging in Step S1020 that the position of the hole is within the prescribed range on the basis of the center of the traveling lane, the processor 170 judges whether the width of the pothole is smaller than the distance T between the left tire 11*a* and the right tire 11*b* of the vehicle 1 (S1025). This is because the width of the pothole must be smaller than the distance T between the left tire 11*a* and the right tire 11*b* in order to ensure that the vehicle 1 passes over the pothole between the left tire 11*a* and the right tire 11*b*. At this time, the distance T between the left tire 11*a* and the right tire 11*b*, as illustrated in FIG. 1, may mean the distance between the inner side of the left tire 11*a* and the inner side of the right tire 11*b*.

Subsequently, upon judging in Step S1025 that the width of the pothole is smaller than the distance T between the left tire 11*a* and the right tire 11*b* of the vehicle 1, the processor 170 generates a guide route that causes the vehicle 1 to pass over the pothole between the left tire 11*a* and the right tire 11*b* (S1030) thereof. For example, the processor 170 may generate a guide route that causes the center axis of the vehicle 1 to pass over the center of the pothole. Since the pothole is located in the traveling lane and the distance between the left tire 11*a* and the right tire 11*b* is greater than the width of the pothole, when the vehicle 1 travels along the guide route, the vehicle 1 may continue to travel in the traveling lane without damage from the pothole.

Upon judging in Step S1020 that the position of the pothole is outside the prescribed range on the basis of the center of the traveling lane or upon judging in Step S1025 that the width of the pothole is equal to or greater than the distance T between the left tire 11*a* and the right tire 11*b* of the vehicle 1, the processor 170 may judge whether a region, which is spaced apart from the pothole by the full width O of the vehicle 1 or more, is present in the traveling lane (S1035). That is, when it is impossible to generate a guide route that causes the vehicle 1 to pass over the pothole between the left tire 11*a* and the right tire 11*b* thereof, the processor 170 may judge whether a region, spaced apart from the pothole by the full width O of the vehicle 1 or more, is present in the traveling lane.

Upon judging in Step S1035 that the region, spaced apart from the pothole by the full width O of the vehicle 1 or more, is present in the traveling lane, the processor 170 may generate a guide route that causes the vehicle 1 to pass through the region spaced apart from the pothole by the full width O of the vehicle 1 or more (S1040). That is, when at least one of the distance between the left end of the pothole and the left boundary of the traveling lane and the distance between the right end of the pothole and the right boundary of the traveling lane is equal to or greater than the full width O of the vehicle 1, the processor 170 may generate a guide route that causes the vehicle 1 to travel in the region having a width equal to or greater than the full width O of the vehicle 1. When the vehicle 1 travels in the region having the width equal to or greater than the full width O of the vehicle 1, the tires 11 of the vehicle 1 do not pass over the pothole and it is possible to prevent damage to the vehicle 1 due to the pothole.

In some cases, upon judging in Step S1035 that the region spaced apart from the pothole by the full width O of the vehicle 1 or more is not present in the traveling lane, the processor 170 may generate a guide route that causes one of the left tire 11*a* and the right tire 11*b* of the vehicle 1, which is closer to the pothole than the other, to pass over the center of the pothole (S1045). For example, when the pothole is to the left of the center of the traveling lane, the processor 170 may generate a guide route that causes the left tire 11*a* of the vehicle 1 to pass over the center of the pothole. In contrast, when the pothole is to the right of the center of the traveling lane, the processor 170 may generate a guide route that causes the right tire 11*b* of the vehicle 1 to pass over the center of the pothole.

Subsequently, the processor 170 may generate a control signal to adjust the direction of travel of the vehicle 1 along the guide route generated in Step S1030, in Step S1040, or in Step 1045 (S1050). In addition, the processor 170 may provide, for example, the steering apparatus of the vehicle 1 with the control signal generated in Step S1050. The steering apparatus may be included in the steering drive unit 752 illustrated in FIG. 7.

According to the above description with reference to FIG. 10, the driver assistance apparatus 100 may generate different guide routes in the traveling lane based on the size of the pothole present in the traveling lane and the position of the pothole relative to both boundaries of the traveling lane. In this way, it is possible to minimize damage to the vehicle 1 due to the pothole while allowing the vehicle 1 to continuously travel in the traveling lane without changing to another lane and to reduce the risk of collision with other vehicles. In addition, maintaining the travel of the vehicle 1 in the traveling lane may reduce confusion of the driver compared to the case of changing the lane in order to avoid the pothole and may contribute to enhance fuel efficiency owing to less frequent lane change.

Figure 11A:
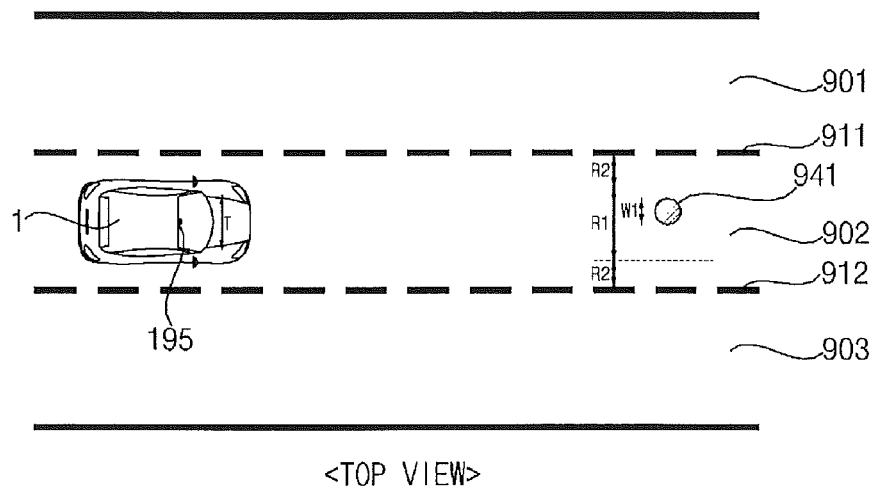
FIGS. 11A to 11C are views illustrating one example of generating a guide route with respect to a pothole using the driver assistance apparatus.
Figure 11B:
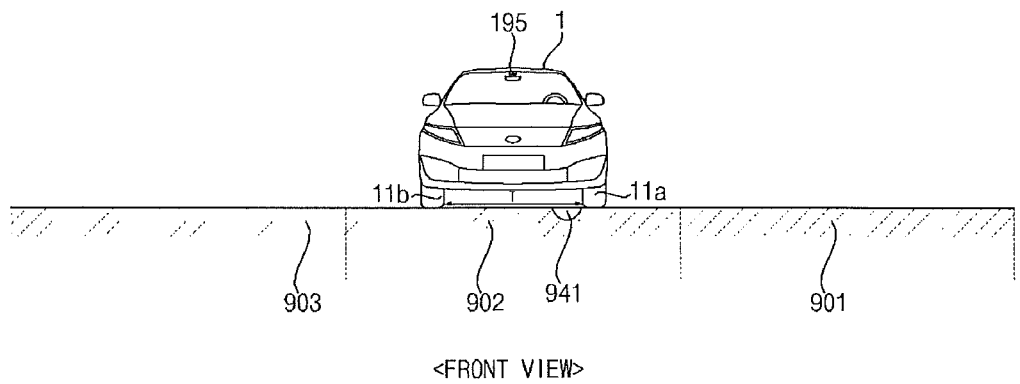
Figure 11C:
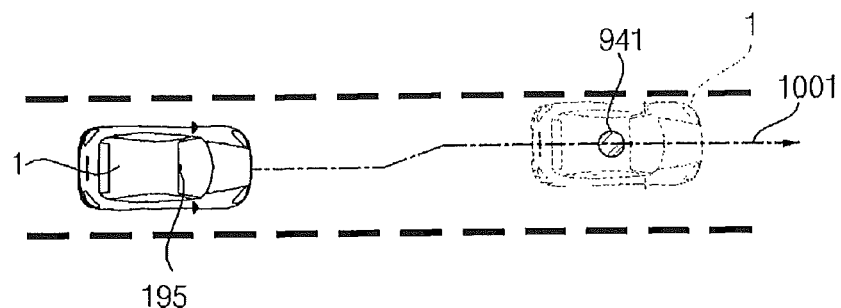

FIGS. 11A to 11C illustrate one example of generating a guide route with respect to a pothole using the driver assistance apparatus 100.

FIG. 11A illustrates the top view of the case where the traveling lane of the vehicle 1 is the second lane 902 which is delimited by the left traffic lane marker 911 and the right traffic lane marker 912 and is located between the first lane 901 and the third lane 903. FIG. 11B illustrates the front view of a section illustrated in FIG. 11A.

Referring to FIGS. 11A and 11B, a pothole 941 is present in front of the vehicle 1 in the second lane 902, and the processor 170 may detect the pothole 941 from the traveling image generated by the camera 195.

At this time, the processor 170 may calculate the position and size of the detected pothole 941. Specifically, the processor 170 may calculate the position of the pothole 941, and judge whether the calculated position of the pothole 941 falls within a prescribed range R1 in the second lane 902. Here, the prescribed range R1 may be part of a region between left and right boundaries of the second lane 902, i.e. a region between the left traffic lane marker 911 and the right traffic lane marker 912, which corresponds to a region between a position parallel to and spaced apart from the left traffic lane marker 911 toward the right traffic lane marker 912 by a predetermined distance R2 and a position spaced apart from the right traffic lane marker 912 to the left traffic lane marker 911 by the predetermined distance R2. At this time, the predetermined distance R2 may have a value that is equal to or greater than the tire width of the vehicle 1. In FIGS. 11A and 11B, the pothole 941 is illustrated as being located within the prescribed range R1 in the second lane 902.

In addition, the processor 170 may calculate the width W1 of the pothole 941 and judge whether the calculated width W1 of the pothole 941 is smaller than the distance T between the left tire 11a and the right tire 11b of the vehicle 1. Here, the distance T between the left tire 11a and the right tire 11b may mean the distance from the inner side of the left tire 11a to the inner side of the right tire 11b. It can be seen from the drawings that the width W1 of the pothole 941 is smaller than the distance T between the left tire 11a and the right tire 11b.

As illustrated, since the pothole 941 is spaced apart from either boundary of the second lane 902 by the predetermined distance R2, the processor 170 may generate a guide route 1001 that causes the vehicle 1 to pass over the pothole 941 therebelow as illustrated in FIG. 11C. That is, the processor 170 may generate the guide route 1001 that causes the vehicle 1 to pass over the pothole 941 between the inner side of the left tire 11a and the inner side of the right tire 11b of the vehicle 1.

Referring to FIG. 11C in more detail, when the pothole 941 is located closer to the left traffic lane marker 911 than the right traffic lane marker 912, the processor 170 may generate the guide route 1001 that causes the center axis of the vehicle 1 to be closer to the left traffic lane marker 911 as the vehicle 1 approaches the pothole 941. In some cases, since the left traffic lane marker 911 and the left end of the pothole 941 are spaced apart from each other by the predetermined distance R2 or more, there is a clearance between the left end of the vehicle 1 and the left traffic lane marker 911 at the point in time at which the vehicle 1 passes over the pothole 941. As such, even if the vehicle 1 travels in close proximity to the left traffic lane marker 911 along the guide route 1001, it is possible to prevent a collision between the vehicle 1 and another vehicle that is traveling in the first lane 901.

In the case where the vehicle 1 travels while maintaining the current direction of travel, the processor 170 may not need to adjust the direction of travel of the vehicle 1 when it is expected that the pothole 941 is located between the inner side of the left tire 11a and the inner side of the right tire 11b of the vehicle 1. Therefore, the processor 170 may omit the process of generating the guide route 1001 with respect to the pothole 941.

Figure 12A:
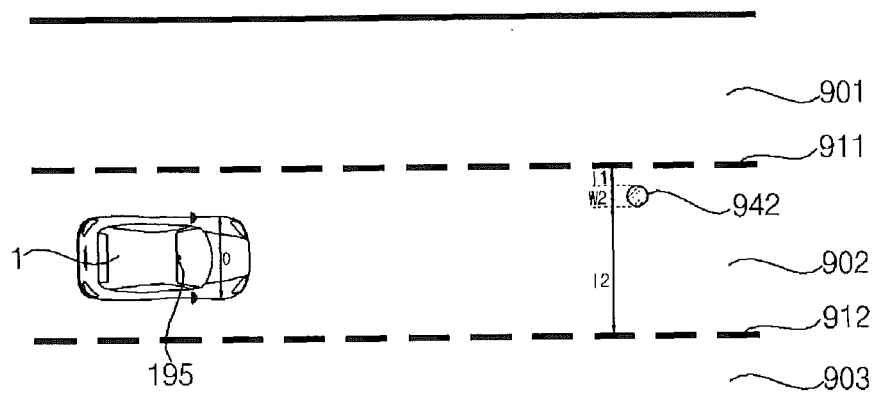
FIGS. 12A to 12C are views illustrating one example of generating a guide route with respect to a pothole using the driver assistance apparatus.
Figure 12B:
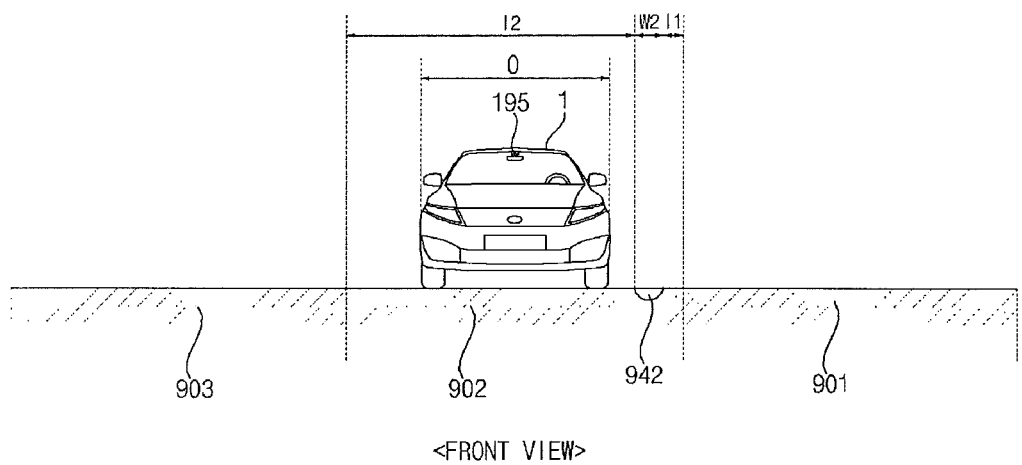
Figure 12C:
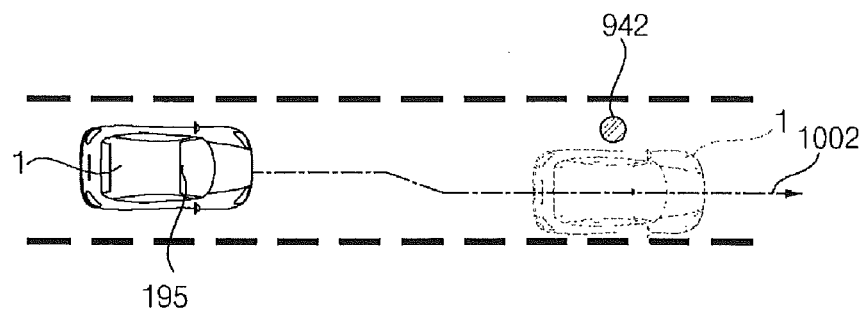

FIGS. 12A to 12C are views illustrating one example of generating a guide route with respect to a pothole using the driver assistance apparatus 100.

Similar to FIG. 11A, FIG. 12A illustrates the top view of the case where the traveling lane of the vehicle 1 is the second lane 902 which is delimited by the left traffic lane marker 911 and the right traffic lane marker 912 and is located between the first lane 901 and the third lane 903. FIG. 12B illustrates the front view of a section illustrated in FIG. 12A.

Referring to FIGS. 12A and 12B, a pothole 942 is present in front of the vehicle 1 in the second lane 902, and the processor 170 may detect the pothole 942 from the traveling image generated by the camera 195.

At this time, the processor 170 may calculate the position and size of the detected pothole 942. For example, the processor 170 may calculate the position and width W2 of the pothole 942 and judge whether the pothole 942 falls within the prescribed range R1 in the second lane 902.

Here, the prescribed range R1 may be part of a region between left and right boundaries of the second lane 902, i.e. a region between the left traffic lane marker 911 and the right traffic lane marker 912, which corresponds to a region between a position parallel to and spaced apart from the left traffic lane marker 911 toward the right traffic lane marker 912 by the predetermined distance R2 and a position spaced apart from the right traffic lane marker 912 toward the left traffic lane marker 911 by the predetermined distance R2. At this time, the predetermined distance R2 may be equal to or greater than the tire width of the vehicle 1 and smaller than half the full width O of the vehicle. In FIGS. 12A and 12B, differently from FIGS. 11A and 11B, the pothole 942 is illustrated as being located outside the prescribed range R1 in the second lane 902. That is, the distance I1 between the left end of the pothole 942 and the left traffic lane marker 911 is smaller than the predetermined distance R2 illustrated in FIGS. 11A and 11B.

In this case, the processor 170 may judge whether a region spaced apart from the pothole 942 by the full width O of the vehicle 1 or more is present in the second lane 902. Here, the full width O of the vehicle 1, as described above with reference to FIG. 1, may mean the maximum width between leftmost and rightmost positions of the body of the vehicle 1.

As illustrated in FIGS. 12A and 12B, the distance I1 from the left end of the pothole 942 to the left traffic lane marker 911 is smaller than the full width O, whereas the distance I2 from the right end of the pothole 942 to the right traffic lane marker 912 is equal to or greater than the full width O.

Specifically, since the region I2 at the right side of the pothole 942 among the two regions I1 and I2 of the second lane 902 divided on the basis of the pothole 942 has a width equal to or greater than the full width O of the vehicle 1, the processor 170, as illustrated in FIG. 12C, may generate a guide route 1002 that causes the body of the vehicle 1 to pass through the region I2 at the right side of the pothole 942. That is, the processor 170 may generate, in the second lane 902, the guide route 1002 that causes the body of the vehicle 1 to avoid the pothole 942 without deviating from the second lane 902.

Considering FIG. 12C in more detail, when the vehicle 1 travels along the center of the second lane 902 and the pothole 942 is spaced apart from the right traffic lane marker 912 by the full width O of the vehicle 1 or more, the processor 170 may generate the guide route 1002 that causes the center axis of the vehicle 1 to be closer to the right traffic lane marker 912 as the vehicle 1 approaches the pothole 942 such that the body of the vehicle 1 is spaced apart from each of the pothole 942 and the right traffic lane marker 912 by the same distance. In this way, even if the vehicle 1 travels in close proximity to the right traffic lane marker 912 along the guide route 1002, it is possible to prevent a collision between the vehicle 1 and another vehicle that is traveling in the third lane 903.

In the case where the vehicle 1 travels while maintaining the current direction of travel, the processor 170 may not need to adjust the direction of travel of the vehicle 1 when it is expected that the pothole 942 is located between the inner side of the left tire 11a and the inner side of the right tire 11b of the vehicle 1. Therefore, the processor 170 may omit the process of generating the guide route 1002 with respect to the pothole 942.

Figure 13A:
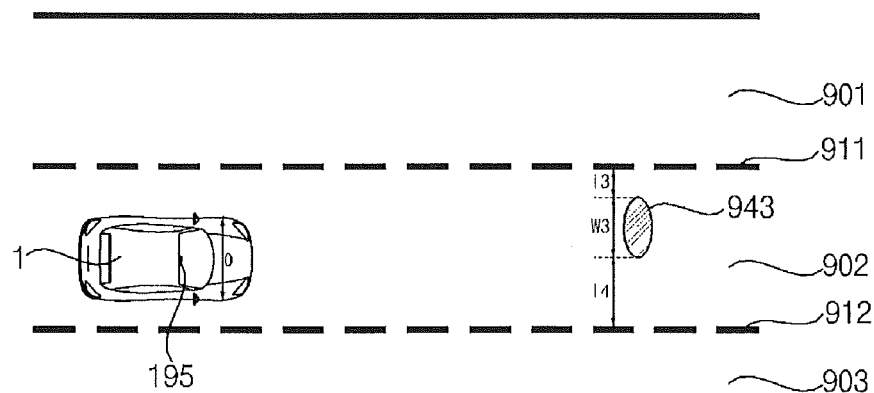
FIGS. 13A to 13C are views illustrating one example of generating a guide route with respect to a pothole using the driver assistance apparatus.
Figure 13B:
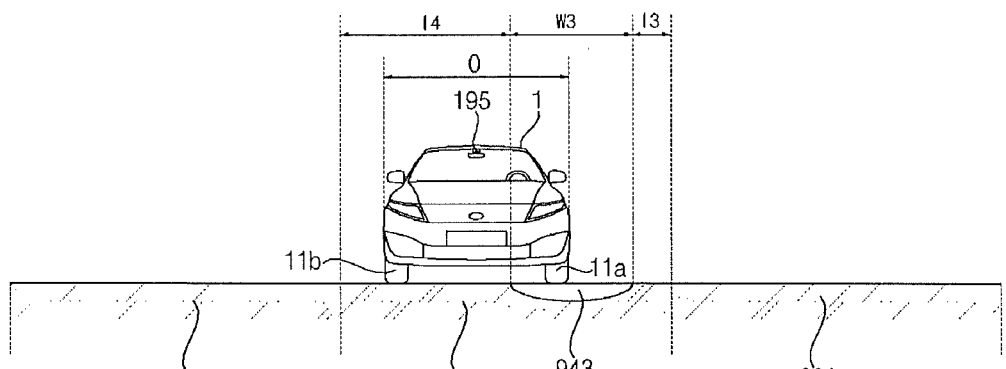
Figure 13C:
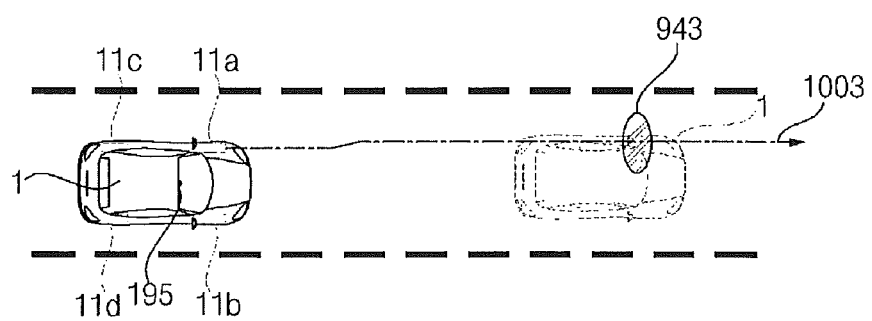

FIGS. 13A to 13C are views illustrating one example of generating a guide route with respect to a pothole using the driver assistance apparatus 100.

Similar to FIG. 11A, FIG. 13A illustrates the top view of the case where the traveling lane of the vehicle 1 is the second lane 902 which is delimited by the left traffic lane marker 911 and the right traffic lane marker 912 and is located between the first lane 901 and the third lane 903. FIG. 13B illustrates the front view of a section illustrated in FIG. 13A.

Referring to FIGS. 13A and 13B, a pothole 943 is present in front of the vehicle 1 in the second lane 902, and the processor 170 may detect the pothole 943 from the traveling image generated by the camera 195.

At this time, the processor 170 may calculate the position and size of the detected pothole 943. For example, the processor 170 may calculate the position and width W3 of the pothole 943 and judge whether the pothole 943 falls within the prescribed range R1 in the second lane 902.

Here, the prescribed range R1 may be part of a region between left and right boundaries of the second lane 902, i.e. a region between the left traffic lane marker 911 and the right traffic lane marker 912, which corresponds to a region between a position parallel to and spaced apart from the left traffic lane marker 911 toward the right traffic lane marker 912 by the predetermined distance R2 and a position spaced apart from the right traffic lane marker 912 toward the left traffic lane marker 911 by the predetermined distance R2. At this time, the predetermined distance R2 may be equal to or greater than the tire width of the vehicle 1 and smaller than half the full width O of the vehicle 1.

In FIGS. 13A and 13B, in contrast to FIGS. 11A and 11B, the pothole 943 is illustrated as being located outside the prescribed range R1 in the second lane 902. That is, the distance I3 between the left end of the pothole 943 and the left traffic lane marker 911 is assumed to be smaller than the predetermined distance R2 illustrated in FIGS. 11A and 11B.

In addition, the processor 170 may judge whether a region spaced apart from the pothole 943 by the full width O of the vehicle 1 is present in the second lane 902. Here, the full width O of the vehicle 1 may mean the width between leftmost and rightmost positions of the body of the vehicle 1.

In FIGS. 13A and 13B, the distance I3 from the left end of the pothole 943 to the left traffic lane marker 911 and the distance I4 from the right end of the pothole 943 to the right traffic lane marker 912 are smaller than the full width O of the vehicle 1. That is, no region spaced apart from the pothole 943 by the full width O of the vehicle 1 or more is present in the second lane 902 that is the traveling lane of the vehicle 1. In this case, it is impossible to generate the guide route 1001 that causes the vehicle 1 to pass over the pothole 941 between the left tire 11a and the right tire 11b of the vehicle 1 as illustrated in FIG. 11C as well as the guide route 1002 that causes the vehicle 1 to pass over the pothole 942 through the region spaced apart from the pothole 942 by the full width O of the vehicle 1 or more as illustrated in FIG. 12C.

Instead, the processor 170 may generate a guide route that causes one of the left tire 11a and the right tire 11b of the vehicle 1, which is closer to the pothole 943 than the other, to pass over the pothole 943. For example, as illustrated, the processor 170 may generate a guide route that causes one of the left tire 11a and the right tire 11b of the vehicle 1, which is closer to the pothole 943 than the other, to pass over the center of the pothole 943.

In this case, the processor 170 may provide the speed reduction apparatus of the vehicle 1 with a control signal to reduce the speed of the vehicle 1 before the vehicle 1 reaches the pothole 943. At this time, the processor 170 may differentially adjust a reduction in the speed of the vehicle 1 according to the depth of the pothole 943. For example, the processor 170 may reduce the speed of the vehicle 1 to a first speed or less when the depth of the pothole 943 is smaller than a first depth, and may reduce the speed of the vehicle 1 to a second speed or less, the second speed being slower than the first speed, when the depth of the pothole 943 is equal to or greater than the first depth and smaller than a second depth. In addition, when the depth of the pothole 943 is equal to or greater than the second depth, the processor 170 may provide the speed reduction apparatus with a control signal to stop the vehicle 1 before the vehicle 1 reaches the pothole 943, or may provide the steering apparatus with a control signal to change the traveling lane from the second lane 902 to another lane.

Figure 14A:
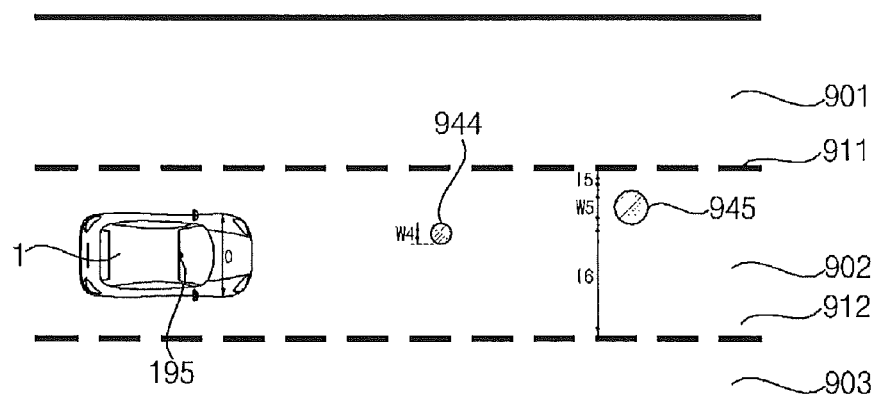
FIGS. 14A and 14B are views illustrating one example of generating a guide route with respect to a plurality of potholes using the driver assistance apparatus.
Figure 14B:
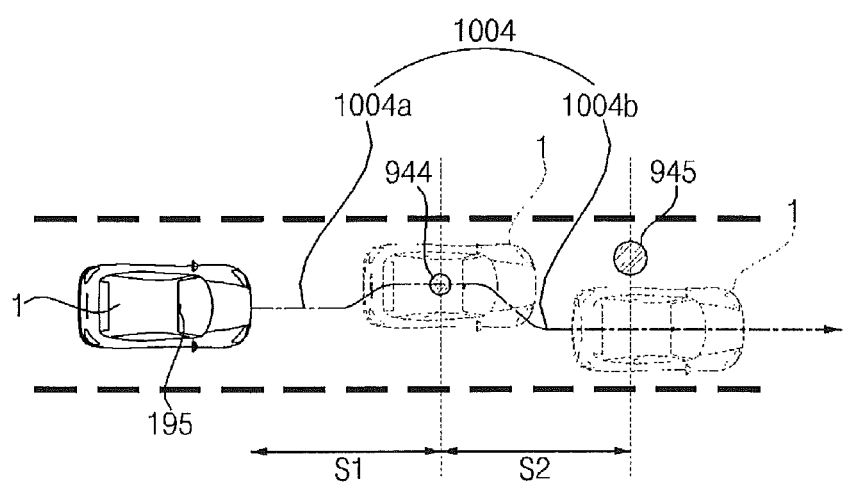

FIGS. 14A and 14B illustrate one example of generating a guide route with respect to a plurality of potholes using the driver assistance apparatus 100.

Similar to FIG. 11A, FIG. 14A illustrates the top view of the case where the traveling lane of the vehicle 1 is the second lane 902 which is delimited by the left traffic lane marker 911 and the right traffic lane marker 912 and is located between the first lane 901 and the third lane 903.

Referring to FIG. 14A, two potholes 944 and 945 are present in front of the vehicle 1 in the second lane 902 and the processor 170 may detect the two potholes 944 and 945 from the traveling image generated by the camera 195. At this time, the pothole 944, which is relatively close to the vehicle 1, is assumed to be located within the prescribed range R1 on the basis of the center of the second lane 902 and the pothole 945, which is relatively distant from the vehicle 1, is assumed to be located outside the prescribed range R1 on the basis of the center of the second lane 902. In addition, the widths W4 and W5 of the two potholes 944 and 945 are assumed to be smaller than the full width O of the vehicle 1.

When two potholes are simultaneously visible in the second lane 902, the processor 170 may generate a guide route in consideration of the positions and sizes of the two respective potholes.

For example, referring to FIG. 14B, the processor 170 may generate a guide route 1004 including a first path 1004a for a first section S1 from the current position of the vehicle 1 to the close pothole 944 and a second path 1004b for a second section S2 from the close pothole 944 to the distant pothole 945.

Specifically, the pothole 944, which is relatively close to the vehicle 1, is located within the prescribed range R1 on the basis of the center of the second lane 902 and has a width W4 smaller than the full width O of the vehicle 1. Thus, the processor 170 may generate the first path 1004a that causes the vehicle 1 to pass over the pothole 944 between the inner side of the tire 11a and the inner side of the right tire 11b of the vehicle 1 with respect to the first section S1.

In addition, the pothole 945, which is relatively distant from the vehicle 1, is located outside the prescribed range R1 on the basis of the center of the second lane 902. For example, as illustrated, a region I5 between the left end of the pothole 945 and the left traffic lane marker 911 may be smaller than the predetermined distance R2.

In some implementations, assuming that a region I6 between the right end of the pothole 945 and the right traffic lane marker 912 is equal to or greater than the predetermined distance R2 and is also equal to or greater than the full width O of the vehicle 1, the vehicle 1 may pass through the region I6 between the right end of the pothole 945 and the right traffic lane marker 912. As such, the processor 170 may generate the second path 1004b with respect to the second section S2, which is connected to the end point of the first path 1004a and extends through the region I6 between the right end of the pothole 945 and the right traffic lane marker 912. That is, the processor 170 may generate the guide route 1004 including the first path 1004a and the second path 1004b, and provide the steering apparatus of the vehicle 1 with a control signal to adjust the direction of travel of the vehicle 1 along the corresponding guide route 1004.

Although FIGS. 14A and 14B illustrate the case where the two potholes 944 and 945 are present in front of the vehicle 1, even when three or more potholes are present, the vehicle 1 may be controlled to successively avoid the potholes 944 and 945 without deviating from the traveling lane of the vehicle 1 by sequentially generating paths in the same manner.

Figure 15:
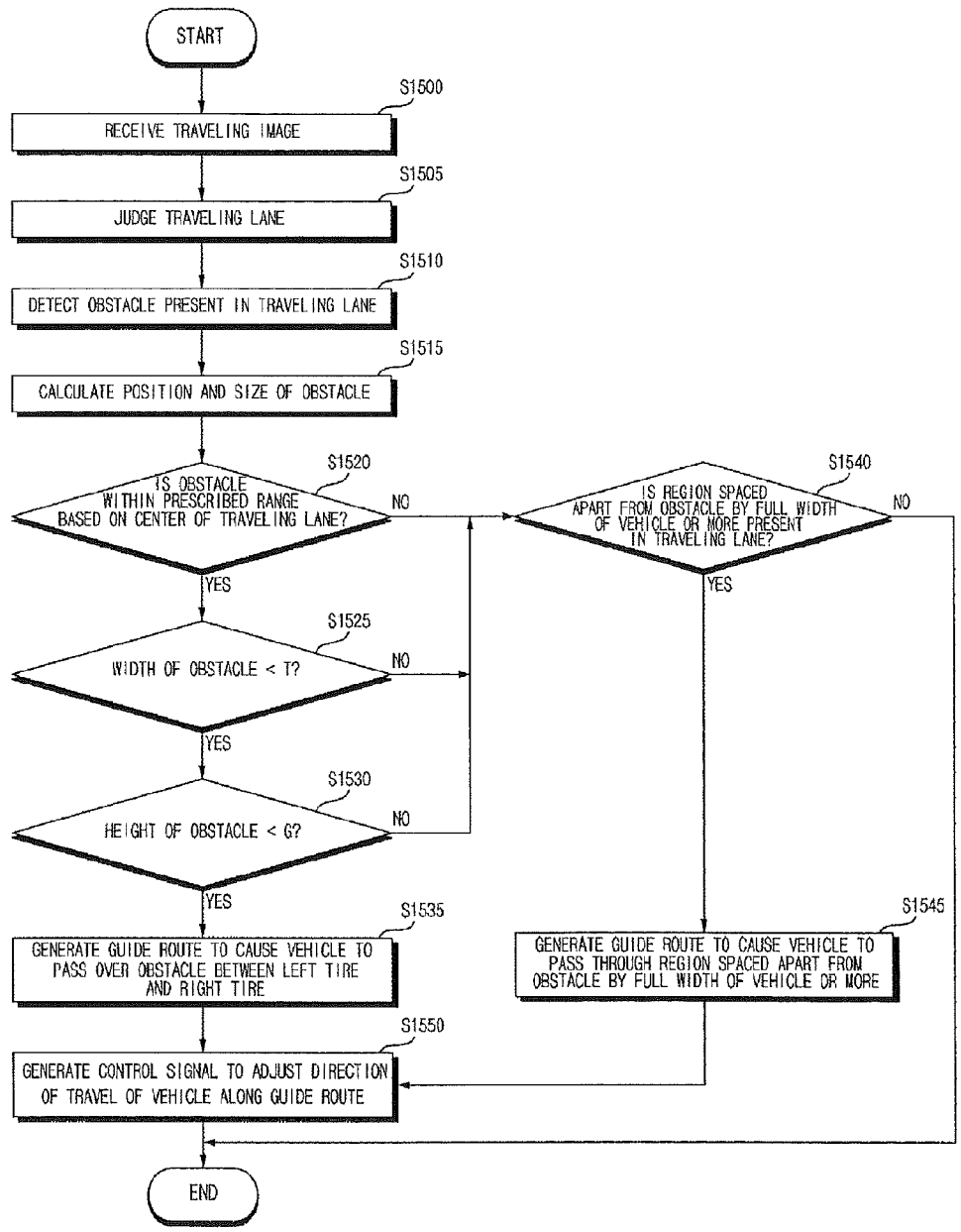
FIG. 15 is a flowchart illustrating one example of generating a guide route with respect to an obstacle using the driver assistance apparatus.

FIG. 15 is a flowchart illustrating one example of generating a guide route with respect to an obstacle using the driver assistance apparatus 100.

First, the processor 170 receives a traveling image (S1500). The traveling image may be provided from the camera 195 mounted to one side of the front end of the vehicle 1. The camera 195 may capture an image of the view in front of the vehicle 1 to generate a traveling image and transmit the generated traveling image to the processor 170 either in real time or periodically under the control of the processor 170. At this time, the traveling image generated by the camera 195 may show at least one object.

Subsequently, the processor 170 judges the traveling lane (S1505). In one example, the processor 170 may detect the left traffic lane marker 911 and the right traffic lane marker 912 from the traveling image received via Step S1500, and set a region, both boundaries of which are the detected left and right traffic lane markers 911 and 912, to the traveling lane. In another example, the processor 170 may judge and set the traveling lane of the vehicle 1 based on location information of the vehicle 1 provided via a separate process other than Step S1500. In addition, the processor 170 may change information that is used to judge the traveling lane according to the traveling state. For example, when weather information received via the communication unit 710 of the vehicle 1 corresponds to bad weather, the processor 170 may judge the current traveling lane of the vehicle 1 by comparing location information of the vehicle 1 with map information because there is high possibility of detection failure of the left traffic lane marker 911 and the right traffic lane marker 912 due to, for example, rain or snow.

Subsequently, the processor 170 detects an obstacle present in the traveling lane judged in Step S1505 (S1510). For example, as described above, since the obstacle is vertically convexly raised upward compared to the remainder of the traveling lane, the processor 170 may detect a region, having a depth value corresponding to the raised region within the depth map, as the obstacle.

Subsequently, the processor 170 calculates the position and size of the detected obstacle (S1515). In one example, the processor 170 may calculate the width and height of the obstacle. In addition, the processor 170 may calculate the position of the obstacle relative to the left and right boundaries of the traveling lane (i.e. the left traffic lane marker 911 and the right traffic lane marker 912).

Subsequently, the processor 170 judges whether the position of the obstacle is within a prescribed range on the basis of the center of the traveling lane (S1520). For example, the processor 170 may judge whether each of the distance between the obstacle and the left boundary of the traveling lane and the distance between the obstacle and the right boundary of the traveling lane is a predetermined distance or more. For example, the processor 170 may judge whether the distance between the left end of the obstacle and the left boundary of the traveling lane is a predetermined distance or more and whether the distance between the right end of the obstacle and the right boundary of the traveling lane is a predetermined distance or more. Here, the predetermined distance may be equal to or greater than the tire width of the vehicle 1.

Subsequently, upon judging in Step S1520 that the position of the obstacle is within the prescribed range on the basis of the center of the traveling lane, the processor 170 judges whether the width of the obstacle is smaller than the distance between the left tire 11a and the right tire 11b of the vehicle 1 (S1525). This is because the width of the obstacle must be smaller than the distance between the left tire 11a and the right tire 11b in order to ensure that the vehicle 1 passes over the obstacle between the left tire 11a and the right tire 11b. At this time, the distance between the left tire 11a and the right tire 11b may mean the distance between the inner side of the left tire 11a and the inner side of the right tire 11b.

Subsequently, upon judging in Step S1525 that the width of the obstacle is smaller than the distance between the left tire 11a and the right tire 11b of the vehicle 1, the processor 170 judges whether the height of the obstacle is smaller than the minimum ground clearance G of the vehicle 1 (S1530). This is because the minimum ground clearance G of the vehicle 1 must be greater than the height of the obstacle in order to allow the vehicle 1 to pass over the obstacle between the left tire 11a and the right tire 11b thereof.

Subsequently, upon judging in Step S1530 that the height of the obstacle is smaller than the minimum ground clearance G of the vehicle 1, the processor 170 generates a guide route that causes the vehicle 1 to pass over the obstacle between the left tire 11a and the right tire 11b thereof (S1535). For example, the processor 170 may generate a guide route that causes the center axis of the vehicle 1 to pass over the center of the obstacle. Only when the obstacle is located in the traveling lane, and the distance between the left tire 11a and the right tire 11b is greater than the width of the obstacle, and the minimum ground clearance G of the vehicle 1 is greater than the height of the obstacle, it is possible to prevent damage to the vehicle 1 by the obstacle while the vehicle 1 is traveling along the guide route and to ensure that the vehicle 1 continues to travel in the traveling lane.

Upon judging in Step S1520 that the position of the obstacle is outside the prescribed range on the basis of the center of the traveling lane, upon judging in Step S1525 that the width of the obstacle is greater than the distance between the left tire 11a and the right tire 11b of the vehicle 1, and/or upon judging in Step S1530 that the height of the obstacle is equal to or greater than the minimum ground clearance G of the vehicle 1, the processor 170 may judge whether a region spaced apart from the obstacle by the full width O of the vehicle 1 or more is present in the traveling lane (S1540). That is, when it is impossible to generate a guide route that causes the vehicle 1 to pass over the obstacle between the left tire 11a and the right tire 11b thereof, the processor 170 may judge whether the region spaced apart from the obstacle by the full width O of the vehicle 1 or more is present in the traveling lane.

Upon judging in Step S1540 that the region spaced apart from the obstacle by the full width O of the vehicle 1 or more is present in the traveling lane, the processor 170 may generate a guide route that causes the vehicle 1 to pass through the region spaced apart from the obstacle by the full width O of the vehicle 1 or more (S1545). That is, when at least one of the distance between the left end of the obstacle and the left boundary of the traveling lane and the distance between the right end of the obstacle and the right boundary of the traveling lane is equal to or greater than the full width O of the vehicle 1, the processor 170 may generate a guide route that causes the vehicle 1 to travel in the region having a width equal to or greater than the full width O of the vehicle 1.

Subsequently, the processor 170 may generate a control signal to adjust the direction of travel of the vehicle 1 along the guide route generated in Step S1545 (S1550). In addition, the processor 170 may provide, for example, the steering apparatus of the vehicle 1 with the control signal generated in Step S1550. When the vehicle 1 travels in the region spaced apart from the obstacle by the distance equal to or greater than the full width O of the vehicle 1 along the guide route, the tires of the vehicle 1 do not pass over the obstacle, which may prevent damage to the vehicle 1 due to a collision with the obstacle.

According to the above description with reference to FIG. 15, the driver assistance apparatus may generate different guide routes in the traveling lane based on the size of the obstacle present in the traveling lane and the position of the obstacle relative to both boundaries of the traveling lane. In this way, it may be possible to minimize damage to the vehicle 1 due to the obstacle while allowing the vehicle 1 to continuously travel in the traveling lane without changing to another lane and to reduce the risk of collision with other vehicles caused upon the change of the lane. In addition, maintaining the travel of the vehicle 1 in the traveling lane may reduce confusion of the driver compared to the case of changing the lane in order to avoid the obstacle and may contribute to enhance fuel efficiency owing to less frequent change of the traveling lane.

Figure 16A:
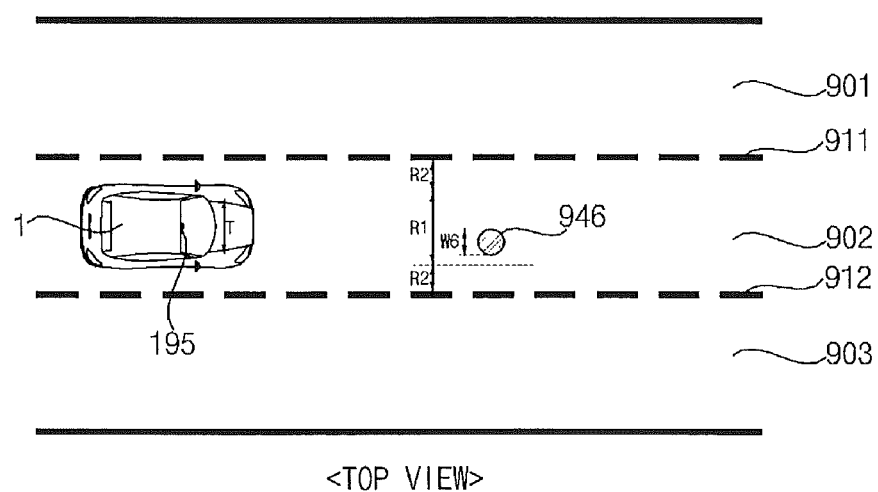
FIGS. 16A to 16C are views illustrating one example of generating a guide route with respect to an obstacle using the driver assistance apparatus.
Figure 16B:
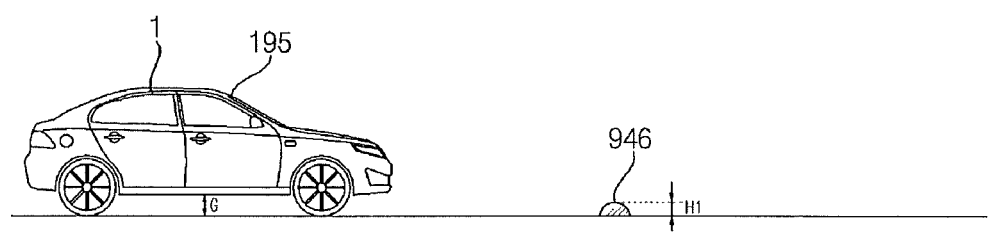
Figure 16C:
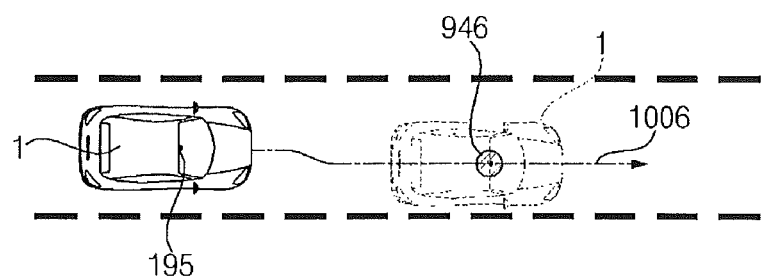

FIGS. 16A to 16C illustrate one example of generating a guide route with respect to an obstacle using the driver assistance apparatus 100.

FIG. 16A illustrates the top view of the case where the traveling lane of the vehicle 1 is the second lane 902 which is delimited by the left traffic lane marker 911 and the right traffic lane marker 912 and is located between the first lane 901 and the third lane 903. FIG. 16B illustrates the side view of a section illustrated in FIG. 16A.

Referring to FIGS. 16A and 16B, an obstacle 946 is present in front of the vehicle 1 in the second lane 902, and the processor 170 may detect the obstacle 946 from the traveling image generated by the camera 195.

At this time, the processor 170 may calculate the position and size of the detected obstacle 946. For example, the processor 170 may calculate the position and width W6 of the obstacle 946, and judge whether the obstacle 946 falls within the prescribed range R1 in the second lane 902. Here, the prescribed range R1 may be part of a region between left and right boundaries of the second lane 902, i.e. a region between the left traffic lane marker 911 and the right traffic lane marker 912, which corresponds to a region between a position parallel to and spaced apart from the left traffic lane marker 911 toward the right traffic lane marker 912 by the predetermined distance R2 and a position spaced apart from the right traffic lane marker 912 toward the left traffic lane marker 911 by the predetermined distance R2. At this time, the predetermined distance R2 may have a value that is equal to or greater than the tire width of the vehicle 1. In FIGS. 16A and 16B, the obstacle 946 is illustrated as being located within the prescribed range R1 in the second lane 902.

In addition, the processor 170 may calculate the width W6 of the obstacle 946 and judge whether the calculated width W6 of the obstacle 946 is smaller than the distance between the left tire 11a and the right tire 11b of the vehicle 1. Here, the distance between the left tire 11a and the right tire 11b may mean the distance from the inner side of the left tire 11a to the inner side of the right tire 11b. It can be seen from FIG. 16A that the width W6 of the obstacle 946 is smaller than the distance T between the left tire 11a and the right tire 11b.

In addition, the processor 170 may calculate the height H1 of the obstacle 946 and judge whether the calculated height H1 of the obstacle 946 is smaller than the minimum ground clearance G of the vehicle 1. FIG. 16B illustrates the height H1 of the obstacle 946 as being smaller than the minimum ground clearance G of the vehicle 1.

As illustrated, since the obstacle 946 is spaced apart from both boundaries of the second lane 902 by the predetermined distance R2 and the height H1 of the obstacle 946 is smaller than the minimum ground clearance G of the vehicle 1, the processor 170 may generate a guide route 1006 that causes the vehicle 1 to pass over the obstacle 946 below the vehicle 1 as illustrated in FIG. 16C. That is, the processor 170 may generate the guide route 1006 that causes the vehicle 1 to pass over the obstacle 946 between the inner side of the left tire 11a and the inner side of the right tire 11b of the vehicle 1. Referring to FIG. 16C in more detail, when the obstacle 946 is located closer to the right traffic lane marker 912 than the left traffic lane marker 911, the processor 170 may generate the guide route 1006 that causes the center axis of the vehicle 1 to be closer to the right traffic lane marker 912 as the vehicle 1 approaches the obstacle 946.

In some implementations, since the right traffic lane marker 912 and the right end of the obstacle 946 are spaced apart from each other by the predetermined distance R2 or more, there is a clearance between the right end of the vehicle 1 and the right traffic lane marker 912 at the point in time at which the vehicle 1 passes over the obstacle 946. As such, even if the vehicle 1 travels in close proximity to the right traffic lane marker 912 along the guide route 1006, it is possible to prevent a collision between the vehicle 1 and another vehicle that is traveling in the third lane 903.

In the case where the vehicle 1 is traveling while maintaining the current direction of travel, the processor 170 may not need to adjust the direction of travel of the vehicle 1 when it is expected that the obstacle 946 is located between the inner side of the left tire 11a and the inner side of the right tire 11b of the vehicle 1. Therefore, the processor 170 may omit the process of generating the guide route 1006 with respect to the obstacle 946.

Figure 17A:
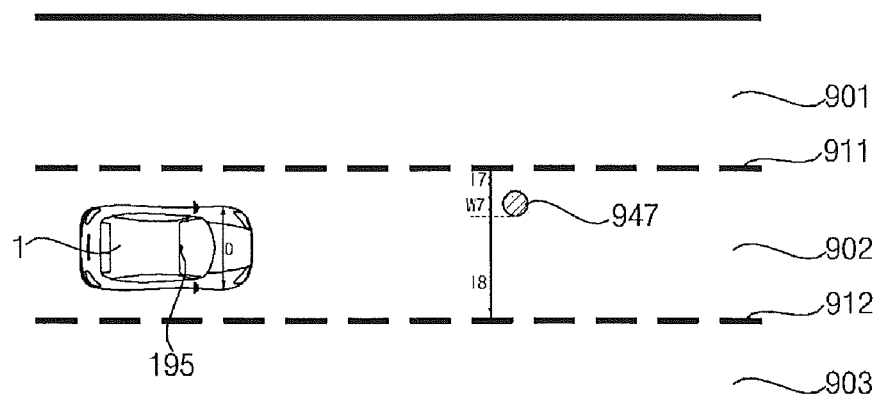
FIGS. 17A to 17C are views illustrating one example of generating a guide route with respect to an obstacle using the driver assistance apparatus.
Figure 17B:
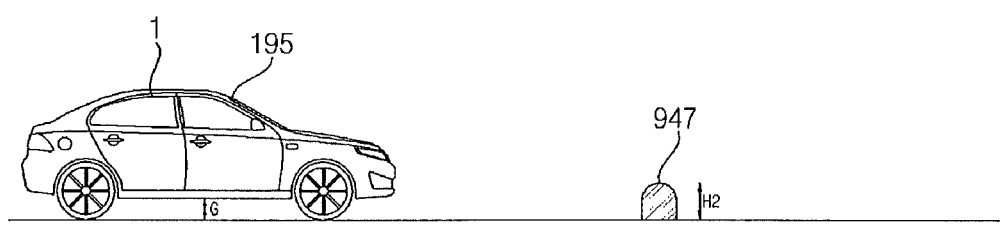
Figure 17C:
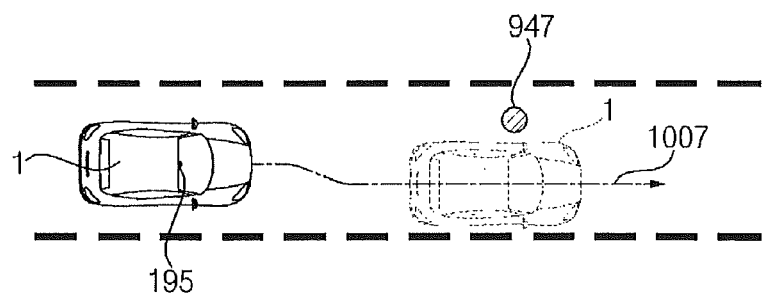

FIGS. 17A to 17C illustrate one example of generating a guide route with respect to an obstacle using the driver assistance apparatus 100.

Similar to FIG. 16A, FIG. 17A illustrates the top view of the case where the traveling lane of the vehicle 1 is the second lane 902 which is delimited by the left traffic lane marker 911 and the right traffic lane marker 912 and is located between the first lane 901 and the third lane 903. FIG. 17B illustrates the side view of a section illustrated in FIG. 17A.

Referring to FIGS. 17A and 17B, an obstacle 947 is present in front of the vehicle 1 in the second lane 902, and the processor 170 may detect the obstacle 947 from the traveling image generated by the camera 195.

At this time, the processor 170 may calculate the position and size of the detected obstacle 947. For example, the processor 170 may calculate the position and width of the obstacle 947, and judge whether the obstacle 947 falls within the prescribed range R1 in the second lane 902. Here, the prescribed range R1 may be part of a region between left and right boundaries of the second lane 902, i.e. a region between the left traffic lane marker 911 and the right traffic lane marker 912, which corresponds to a region between a position parallel to and spaced apart from the left traffic lane marker 911 toward the right traffic lane marker 912 by the predetermined distance R2 and a position spaced apart from the right traffic lane marker 912 toward the left traffic lane marker 911 by the predetermined distance R2. At this time, the predetermined distance R2 may have a value that is equal to or greater than the tire width of the vehicle 1.

In FIGS. 17A and 17B, differently from FIGS. 16A and 16B, the obstacle 947 is assumed to be located outside the prescribed range R1 in the second lane 902. That is, the distance I7 between the left end of the obstacle 947 and the left traffic lane marker 911 is assumed to be smaller than the predetermined distance R2 illustrated in FIGS. 16A and 16B.

In some cases, the processor 170 may judge whether a region spaced apart from the obstacle 947 by the full width O of the vehicle 1 is present in the second lane 902. Here, the full width O of the vehicle 1 may mean the width between leftmost and rightmost positions of the vehicle 1. As illustrated in FIGS. 17A and 17B, it is assumed that the distance I7 from the left end of the obstacle 947 to the left traffic lane marker 911 is smaller than the full width O and the distance I8 from the right end of the obstacle 947 to the right traffic lane marker 912 is equal to or greater than the full width O.

In addition, the processor 170 may compare the height H2 of the obstacle 947 with the minimum ground clearance G of the vehicle 1. That is, the processor 170 may judge whether the height H2 of the obstacle 947 is smaller than the minimum ground clearance G of the vehicle 1. Referring to FIG. 17B, the height H2 of the obstacle 947 is greater than the minimum ground clearance G of the vehicle 1, the processor 170 may not generate a guide route 1007 that causes the vehicle 1 to pass over the obstacle 947 between the inner side of the left tire and the inner side of the right tire of the vehicle 1. Instead, the processor 170 may generate a guide route 1007 that causes the vehicle 1 to pass through the region I8 spaced apart from the obstacle 947 by the full width O of the vehicle 1 or more in the second lane 902.

That is, since the region I8 at the right side of the obstacle 947, among the two regions I7 and I8 of the second lane 902 divided by the obstacle 947, is equal to or greater than the full width O of the vehicle 1, the processor 170, as illustrated in FIG. 17C, may generate the guide route 1007 that causes the vehicle 1 to pass through the region I8 at the right side of the obstacle 947. That is, the processor 170 may generate, in the second lane 902, the guide route 1007 that causes the vehicle 1 to avoid the obstacle 947 without deviating from the second lane 902.

Considering FIG. 17C in more detail, when the distance between the obstacle 947 and the right lane 912 is greater than the full width O of the vehicle 1 which is traveling along the center of the second lane 902, the processor 170 may generate the guide route 1007 that causes the center axis of the vehicle 1 to be closer to the right traffic lane marker 912 as the vehicle 1 approaches the obstacle 947, thereby causing the body of the vehicle 1 to be spaced apart from each of the obstacle 947 and the right traffic lane marker 912 by the same distance. As such, even if the vehicle 1 travels in close proximity to the right traffic lane marker 912 along the guide route 1007, it is possible to prevent a collision between the vehicle 1 and another vehicle that is traveling in the third lane 903.

In the case where the vehicle 1 is traveling while maintaining the current direction of travel, the processor 170 may not need to adjust the direction of travel of the vehicle 1 when it is expected that the obstacle 947 is located between the inner side of the left tire 11a and the inner side of the right tire 11b of the vehicle 1. Therefore, the processor 170 may omit the process of generating the guide route 1007 with respect to the obstacle 947.

Figure 18A:
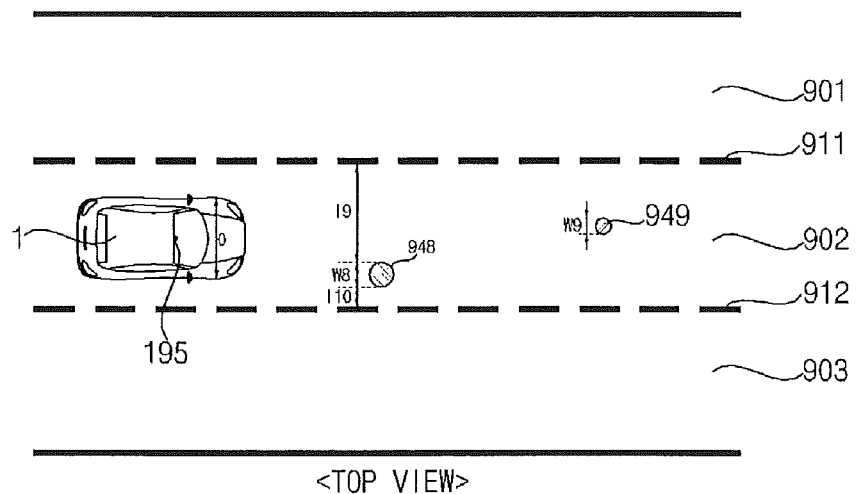
FIGS. 18A to 18C are views illustrating one example of generating a guide route with respect to a plurality of obstacles using the driver assistance apparatus.
Figure 18B:
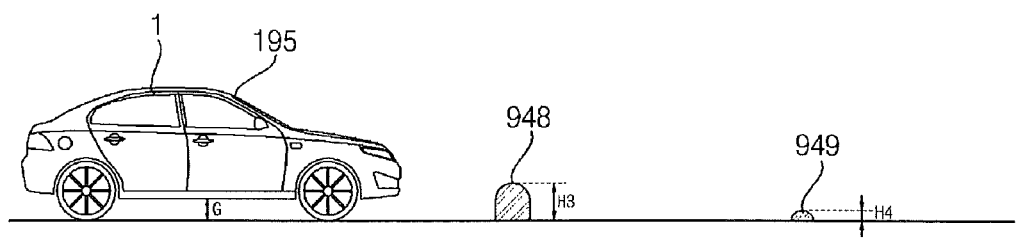
Figure 18C:
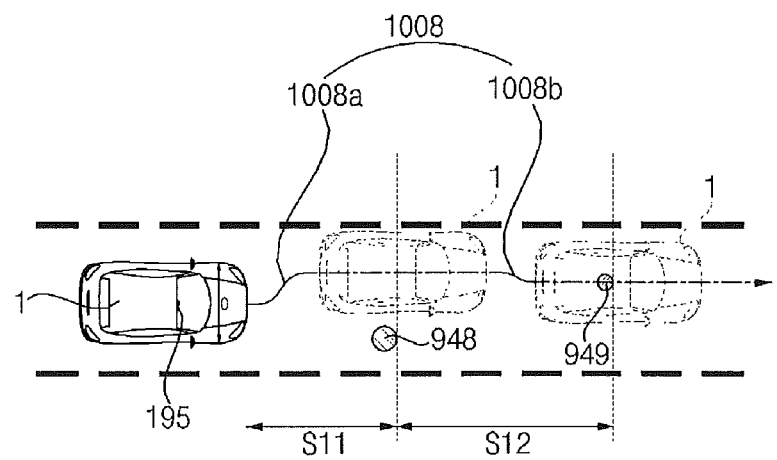

FIGS. 18A to 18C illustrate one example of generating a guide route with respect to a plurality of obstacles using the driver assistance apparatus 100.

Similar to FIG. 16A, FIG. 18A illustrates the case where the traveling lane of the vehicle 1 is the second lane 902 which is delimited by the left traffic lane marker 911 and the right traffic lane marker 912 and is located between the first lane 901 and the third lane 903. In addition, FIG. 18B illustrates the side view of a section illustrated in FIG. 18A.

Referring to FIGS. 18A and 18B, obstacles 948 and 949 are present in front of the vehicle 1 in the second lane 902, and the processor 170 may detect the two obstacles 948 and 949 from the traveling image generated by the camera 195. At this time, the obstacle 948, which is relatively close to the vehicle 1, is assumed to be located outside the prescribed range R1 (see "R1" in FIG. 16A) on the basis of the center of the second lane 902 and the obstacle 949, which is relatively distant from the vehicle 1, is assumed to be located within the prescribed range R1 on the basis of the center of the second lane 902. In addition, the widths W8 and W9 of the two obstacles 948 and 949 are assumed to be smaller than the full width O of the vehicle 1. In addition, the height H3 of the obstacle 948 which is relatively close to the vehicle 1 is assumed to be equal to or greater than the minimum ground clearance G of the vehicle 1 and the height H4 of the obstacle 949 which is relatively distant from the vehicle 1 is assumed to be smaller than the minimum ground clearance G of the vehicle 1.

When two or more obstacles 948 and 494 are simultaneously visible in the second lane 902, the processor 170 may generate a guide route in consideration of the positions and sizes of the two respective obstacles 948 and 949.

For example, referring to FIG. 18C, the processor 170 may generate a guide route 1008 including a first path 1008a for a first section S1l from the current position of the vehicle 1 to the close obstacle 948 and a second path 1008b for a second section S12 from the close obstacle 948 to the distant obstacle 949.

Specifically, the obstacle 948, which is relatively close to the vehicle 1, is located outside the prescribed range R1 on the basis of the center of the second lane 902 and has the width W8 smaller than the full width O of the vehicle 1 and the height H3 equal to or greater than the minimum ground clearance G of the vehicle 1. Thus, the processor 170 may generate the first path 1008a that causes the vehicle 1 to pass through a region I9 corresponding to the distance between the left end of the obstacle 948 and the left traffic lane marker 911 with respect to the first section S11.

In addition, the obstacle 949, which is relatively distant from the vehicle 1, is located within the prescribed range R1 on the basis of the center of the second lane 902 and has the width W9 smaller than the full width O of the vehicle 1 and the height H4 smaller than the minimum ground clearance G of the vehicle 1. As such, the processor 170 may generate the second path 1008b with respect to the second section S2, which is connected to the end point of the first path 1008a and extends through the obstacle 949 between the inner side of the left tire 11a and the inner side of the right tire 11b of the vehicle 1.

That is, the processor 170 may generate the guide route 1008 including the first path 1008a and the second path 1008b and provide the steering apparatus of the vehicle 1 with a control signal to adjust the direction of travel of the vehicle 1 along the corresponding guide route 1008.

Although FIGS. 18A and 18B illustrate the case where the two obstacles 948 and 949 are present in front of the vehicle 1, even when three or more obstacles are present, the vehicle 1 may be controlled to successively avoid the obstacles 948 and 949 without deviating from the traveling lane of the vehicle 1 by sequentially generating paths in the same manner.

Figure 19A:
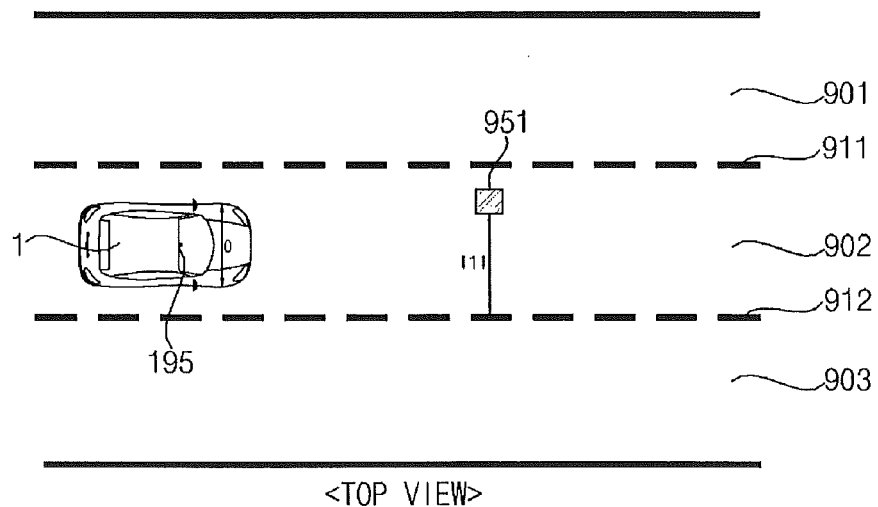
FIGS. 19A and 19B are views illustrating an example operation of providing a driver with information regarding an object using the driver assistance apparatus.
Figure 19B:
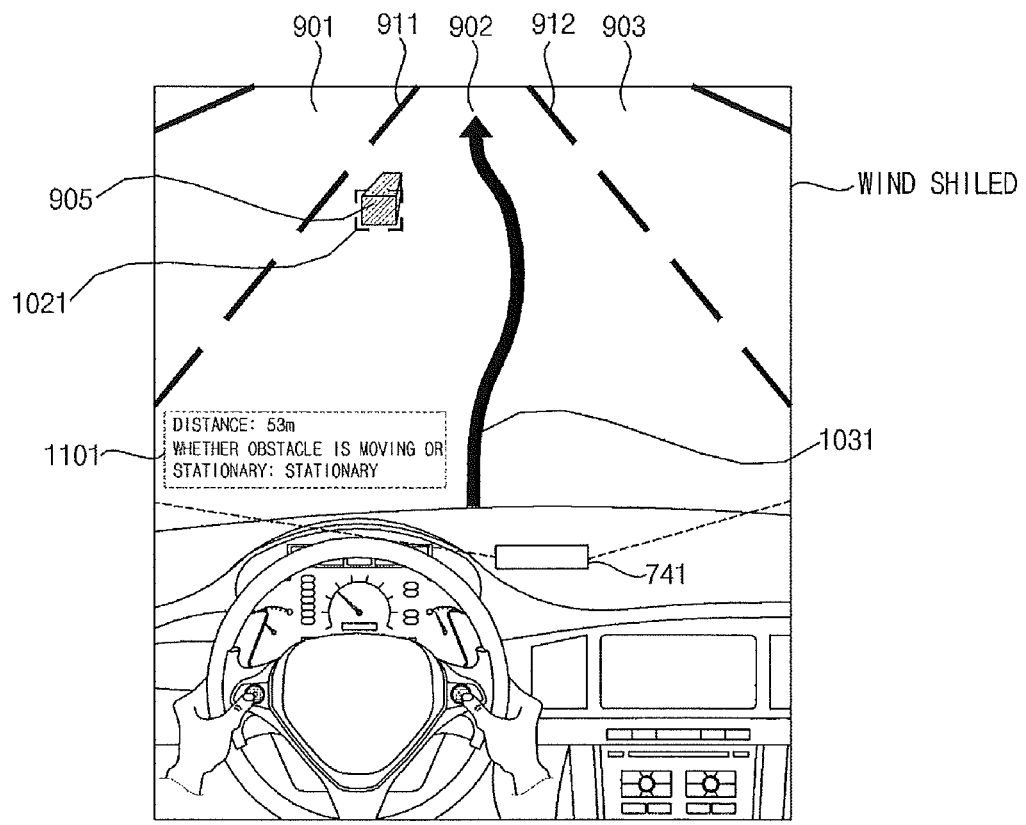

FIGS. 19A and 19B illustrate an example operation of providing a driver with information regarding an object using the driver assistance apparatus 100.

Similar to FIG. 16A, FIG. 19A illustrates the case where the traveling lane of the vehicle 1 is the second lane 902 which is delimited by the left traffic lane marker 911 and the right traffic lane marker 912 and is located between the first lane 901 and the third lane 903. In addition, FIG. 19B illustrates the view in front of the vehicle 1 shown through the windshield of the vehicle 1 in the traveling state illustrated in FIG. 19A. For convenience of description, an object 951 present in the second lane 902 is assumed to be an obstacle.

The processor 170 may track the obstacle 951 present in the second lane 902. Specifically, upon detection of the obstacle 951 in a region corresponding to the second lane 902 within the traveling image, the processor 170 may track the detected object 951 either in real time or periodically. As such, the processor 170 may generate tracking information regarding the obstacle 951. Although FIG. 19A illustrates that only one obstacle 951 is present in the second lane 902, the present disclosure is not limited thereto. In one example, when two or more obstacles are present in the second lane 902, the processor 170 may track the respective obstacles individually.

The processor 170 may control the display unit 741 to display information regarding the detected obstacle 951. At this time, for example, the display unit 741 may be a Head Up Display (HUD) provided at, for example, the dashboard of the vehicle 1 as illustrated in FIG. 19B. The HUD may project an image corresponding to various pieces of information to the projection plane (e.g., the windshield of the vehicle 1) under the control of the processor 170 to allow the user, i.e. the driver occupying the vehicle 1 to recognize the image formed on the projection plane. Alternatively, the display unit 741 may include a transparent display configured to overlay a region of the vehicle 1 (e.g., the windshield of the vehicle 1). In some cases, the transparent display may have transmittance of a given level in a specific operating state (e.g., when turned off) to allow the user to recognize objects on the other side of the transparent display.

In some implementations, information displayed on the display unit 741 is not particularly limited so long as it is related to objects including, for example, the obstacle 951. Specifically, referring to FIG. 19B, the display unit 741 may display an image 1101 in the form of text that guides information regarding the obstacle 951 (e.g., the distance from the vehicle 1 to the obstacle 951 and whether the obstacle 951 is moving) in a region of the screen. For example, as illustrated, when the display unit 741 is an HUD that utilizes the windshield of the vehicle 1 as the projection plane, the user may intuitively recognize from the image 1101 formed on the windshield of the vehicle 1 that the distance between the vehicle 1 and the obstacle 951 is 53 m and the obstacle 951 is currently stationary.

In addition, the processor 170 may provide the display unit 741 of the vehicle 1 with a control signal to display tracking information regarding the obstacle 951. For example, as illustrated, the display unit 741 may display an image 1021 indicating that the obstacle 951 is being tracked based on a control signal provided from the processor 170.

At this time, the processor 170 may change the properties of the image 1021 based on the distance to the tracked obstacle 951. For example, the processor 170 may control the display unit 741 to display the image 1021 in blue when the distance to the obstacle 951 is a first distance or more and to display the image 1021 in red when the distance 951 to the obstacle 951 becomes less than the first distance. In another example, the processor 170 may control the display unit 741 to flash the image 1021 at a first speed when the distance to the obstacle 951 is a second distance or more and to flash the image 1021 at a second speed which is faster than the first speed when the distance to the obstacle 951 becomes less than the second distance.

In addition, the processor 170 may control the display unit 741 to display an image 1031 corresponding to a guide route that is generated with respect to the obstacle 951. For example, as illustrated in FIG. 19A, when a distance I11 between the right end of the obstacle 951 and the right traffic lane marker 912 is greater than the full width O of the vehicle 1, the processor 170 may generate a guide route that causes the vehicle 1 to travel in the distance I11 between the right end of the obstacle 951 and the right traffic lane marker 912 and may control the display unit 741 to display the image 1031 indicating the generated guide route.

In FIGS. 19A and 19B, the processor 170 may visually output, via the display unit 741, information that guides a tracking object and information that guides a guide route, along with basic information regarding an object such as, for example, the obstacle 951, thereby assisting the user in intuitively recognizing the state around the vehicle 1.

Figure 20:
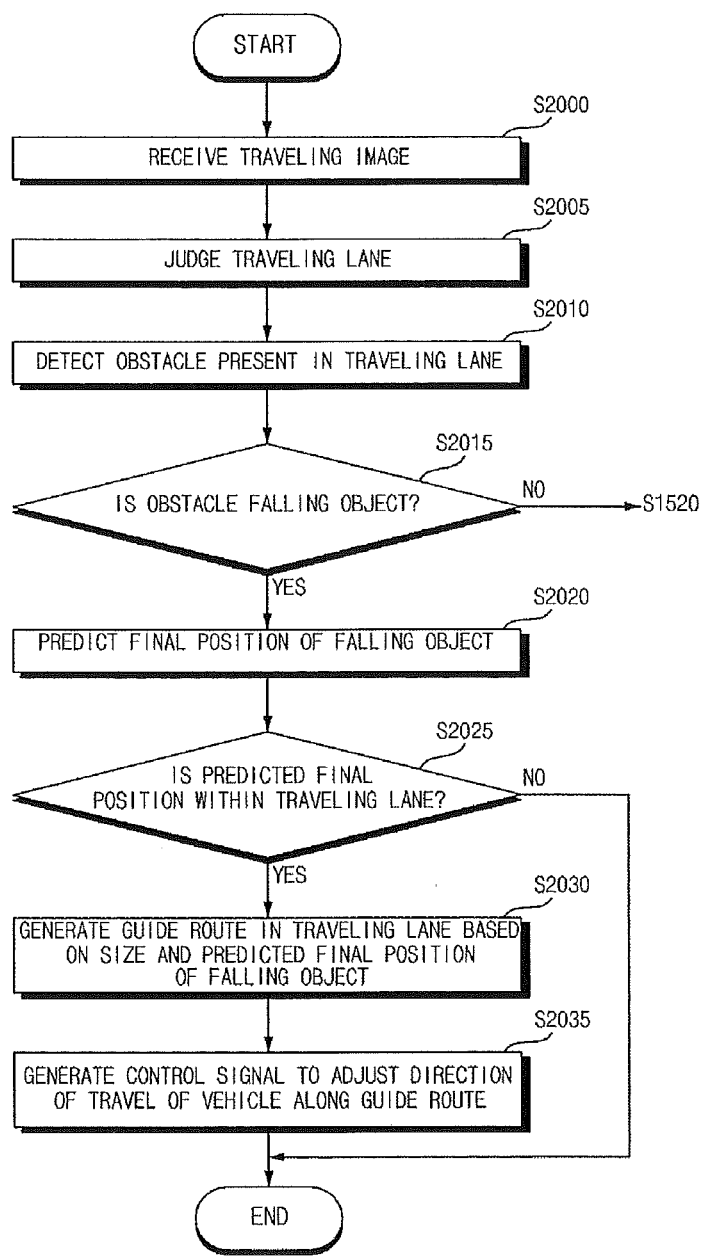
FIG. 20 is a flowchart illustrating one example of generating a guide route with respect to a falling object using the driver assistance apparatus.

FIG. 20 is a flowchart illustrating one example of generating a guide route with respect to a falling object using the driver assistance apparatus 100.

First, the processor 170 receives a traveling image (S2000). The traveling image may be provided from the camera 195 mounted to one side of the front end of the vehicle 1. The camera 195 may capture an image of the view in front of the vehicle 1 to generate a traveling image under the control of the processor 170, and transmit the generated traveling image to the processor 170 either in real time or periodically. At this time, the traveling image generated by the camera 195 may show at least one object.

Subsequently, the processor 170 judges the traveling lane (S2005). In one example, the processor 170 may detect the left traffic lane marker 911 and the right traffic lane marker 912 from the traveling image received via Step S2000, and set a region, both boundaries of which are the detected left and right traffic lane markers 911 and 912, to the traveling lane. In another example, the processor 170 may judge and set the traveling lane of the vehicle 1 based on location information of the vehicle 1 provided via a separate process other than Step S2000. In addition, the processor 170 may change information that is used to judge the traveling lane according to the traveling state. For example, when weather information received via the communication unit 710 of the vehicle 1 corresponds to bad weather, the processor 170 may judge the traveling lane of the vehicle 1 by comparing location information of the vehicle 1 with map information because there is high possibility of detection failure of the left traffic lane marker 911 and the right traffic lane marker 912 due to, for example, rain or snow.

Subsequently, the processor 170 detects an obstacle present in the traveling lane judged in Step S2005 (S2010). For example, as described above, since the obstacle is vertically convexly raised upward compared to the remainder of the traveling lane, the processor 170 may detect a region, having a depth value corresponding to the raised region within the depth map, as the obstacle. In addition, the processor 170 may track the object detected in Step S2010.

Subsequently, the processor 170 judges whether the obstacle detected in Step S2010 is a falling object (S2015). Specifically, the processor 170 may judge whether the obstacle is moving with the lapse of time based on tracking information regarding the object detected in Step S2010. For example, when at least one of the vertical position and the horizontal position of the object relative to the traveling lane varies with the lapse of time, the processor 170 may judge that the obstacle is a falling object.

Subsequently, upon judging in Step S2015 that the obstacle is a falling object, the processor 170 may predict the final position of the falling object (S2020). To this end, the processor 170 may calculate, for example, the initial movement speed, current movement speed (e.g., falling speed), and past movement path (e.g., falling path) of the falling object. In addition, the processor 170 may further calculate the size of the falling object. In addition, the processor 170 may predict the final position of the falling object based on, for example, the past movement speed, current movement speed, and past movement path of the falling object.

Specifically, the processor 170 may calculate the speed variation and past movement path of the falling object by comparing the speed and position of the falling object, calculated when the falling object is initially detected, with the speed and position of the falling object, calculated at present. Thereby, the processor 170 may predict the direction in which the falling object will move and the movement speed of the falling object based on the speed variation and past movement path of the falling object. For example, when the falling object rectilinearly moves in a first direction for a first time duration from the initially detected time to the current time and is reduced in speed from "10" to "7", the processor 170 may predict that the falling object will rectilinearly move in the first direction for the first time duration from the current time and will be reduced in speed from "7" to "4". Since both the movement path and the speed variation of the falling object are predictable, the processor 170 may predict the final position at which the falling object will stop.

When the obstacle is stationary without movement at the initial position thereof detected in Step S2015, the processor 170 may judge that the obstacle is not a falling object. In this case, the processor 170 may perform Step S1520 illustrated in FIG. 15.

Subsequently, the processor 170 judges whether the final position of the falling object predicted in Step S2025 is within the traveling lane judged in Step S2005 (S2025). Upon predicting that the moving object will stop outside the traveling lane, the processor 170 does not need to change the direction of travel of the vehicle 1 and the processor 170 may omit Step S2030 and Step S2035 which will be described below.

Subsequently, upon predicting in Step S2025 that the falling object will stop within the traveling lane, the processor 170 may generate a guide route in the traveling lane based on the size of the falling object and the predicted final position (S2030). For example, when the predicted final position of the falling object is within the prescribed range (see "R1" of FIG. 16A) on the basis of the center of the traveling lane, the width of the falling object is smaller than the distance T between the left tire and the right tire of the vehicle 1, and the height of the falling object is below the minimum ground clearance G of the vehicle 1, the processor 170 may generate a guide route that causes the vehicle 1 to pass over the predicted final position of the falling object between the left tire and the right tire. In another example, when the predicted final position of the falling object is outside the prescribed range R1 on the basis of the center of the traveling lane and a region spaced apart from the predicted final position of the falling object by the full width O of the vehicle 1 is present in the traveling lane, the processor 170 may generate a guide route that causes the vehicle 1 to pass through the region spaced apart from the predicted final position by the full width O or more in the traveling lane.

Subsequently, the processor 170 may generate a control signal to adjust the direction of travel of the vehicle 1 along the guide route generated in Step S2030 (S2035). In addition, the processor 170 may provide, for example, the steering apparatus with the control signal generated in Step S2035.

Figure 21A:
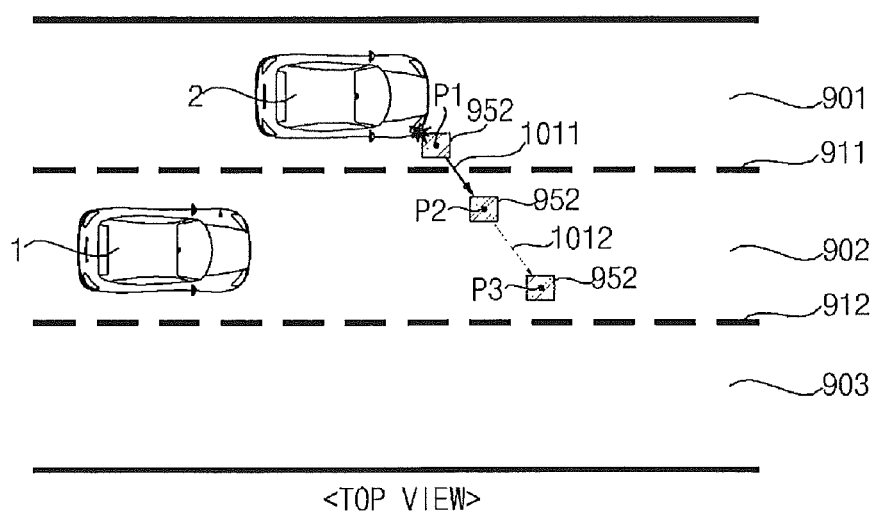
FIGS. 21A to 21C are views illustrating one example of generating a guide route with respect to a falling object using the driver assistance apparatus.
Figure 21B:
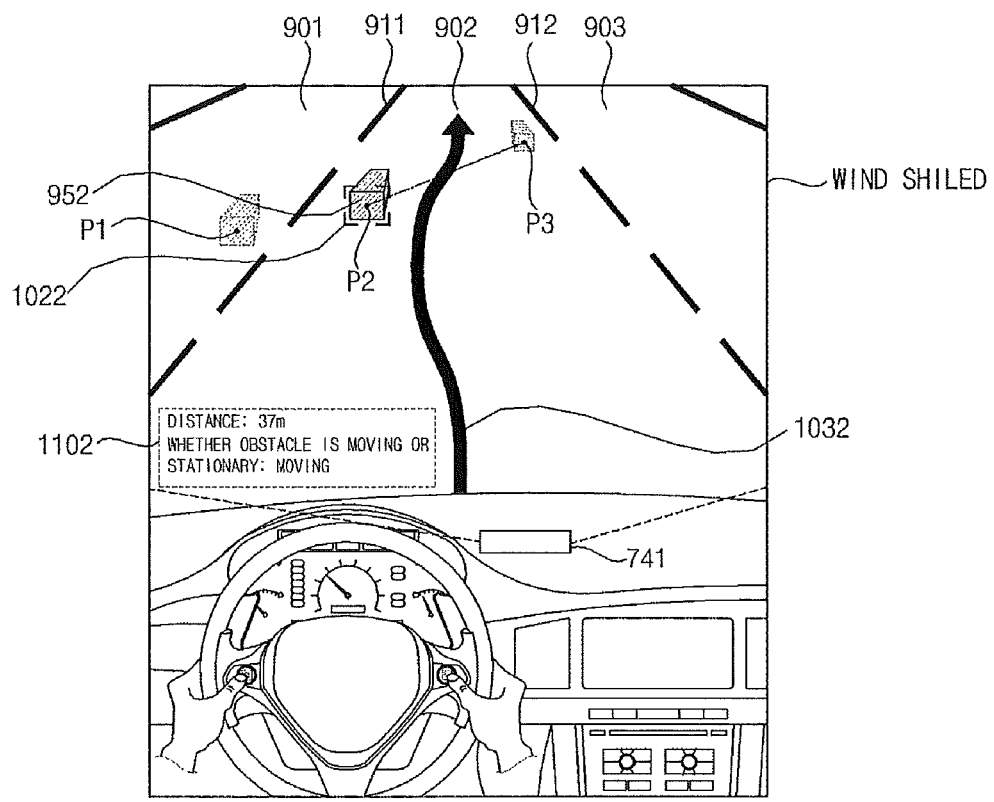
Figure 21C:
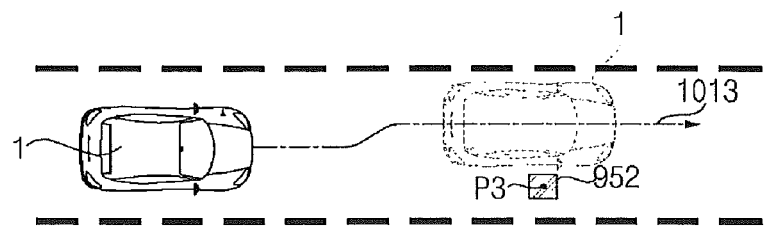

FIGS. 21A to 21C are views illustrating one example of generating a guide route with respect to a falling object using the driver assistance apparatus 100. For convenience of description, a falling object 952 is assumed as being an obstacle which is moving in contact with the road surface.

Similar to FIG. 16A, FIG. 21A illustrates the top view of the case where the traveling lane of the vehicle 1 is the second lane 902 which is delimited by the left traffic lane marker 911 and the right traffic lane marker 912 and is located between the first lane 901 and the third lane 903. In addition, FIG. 21B illustrates the view in front of the vehicle 1 that is reflected in the windshield of the vehicle 1 in the traveling state illustrated in FIG. 21A. In addition, FIG. 21C illustrates one exemplary guide route 1013 generated based on the predicted final position P3 of the falling object 952.

FIGS. 21A and 21B illustrate the case where the falling object 952 located in front of the vehicle 1 is initially detected at a first position P1 in the first lane 901 and is currently located at a second position P2 in the second lane 902 after colliding with another vehicle 2 that is traveling in the first lane 901. That is, the processor 170 may acquire tracking information from the first position P1 to the second position P2 by tracking the falling object 952. Here, the tracking information may include, for example, the initially detected position of the falling object 952, the movement speed at the initial position, the speed at the current position, the change in movement speed from the initially detected position to the current position, a movement path 1011 from the initially detected position to the current position, and the current movement speed.

The processor 170 may predict a future movement path 1012 of the falling object 952 based on tracking information or simulation information, and predict the final position P3 of the falling object 952 based on the predicted future movement path 1012. For example, as illustrated in FIG. 21A, the processor 170 may predict that the falling object 952 will stop at the third position P3.

In some cases, in contrast to the above description with reference to FIGS. 19A to 19C, the processor 170 may generate the guide route 1013 using the predicted final position P3, rather than the current position P2 of the falling object 952.

In addition, the processor 170 may generate simulation information by combining the tracking information with the predicted final position P3 of the falling object 952. For example, the simulation information may include a moving image that virtually shows the moving state of the falling object 952 along the past movement path 1011 and the future movement path 1012.

In addition, the processor 170 may control the display unit 741 to display the tracking information, simulation information, and information regarding the falling object 952 such as, for example, the guide route 1013. At this time, for example, the display unit 741 may be a Head Up Display (HUD) provided at, for example, the dashboard of the vehicle 1 as illustrated in FIG. 21B. The HUD may project an image corresponding to various pieces of information to the projection plane (e.g., the windshield of the vehicle 1) under the control of the processor 170 to allow the user, i.e. the driver occupying the vehicle 1 to recognize the image formed on the projection plane. Alternatively, the display unit 741 may include a transparent display configured to overlay a region of the vehicle 1 (e.g., the windshield of the vehicle 1). In some cases, the transparent display may have transmittance of a given level in a specific operating state (e.g., when turned off) to allow the user to recognize objects on the other side of the display.

Specifically, referring to FIG. 21B, the display unit 741 may display an image 1102 in the form of text that guides information regarding the falling object 952 (e.g., the distance from the vehicle 1 to the falling object 952 and whether the falling object 952 is moving) in a region of the screen. When the display unit 741 is an HUD that utilizes the windshield of the vehicle 1 as the projection plane, the user may intuitively recognize from the image 1102 formed on the windshield of the vehicle 1 that the distance between the vehicle 1 and the falling object 952 is 37 m and the falling object 952 is currently moving.

In addition, the processor 170 may control the display unit 741 to display tracking information or simulation information regarding the falling object 952. For example, as illustrated, the processor 170 may control the display unit 741 to display an image 1022, which guides that the falling object 952 is being tracked, included in the simulation information. In addition, the processor 170 may change the display position of the image 1022 with the lapse of time based on the future movement path 1012.

At this time, the processor 170 may change the properties of the image 1022 based on the tracked distance of the falling object 952. For example, the processor 170 may control the display unit 741 to display the image 1022 in blue when the distance to the obstacle 952 is a first distance or more and to display the image 1022 in red when the distance 951 to the falling object 952 becomes less than the first distance. In another example, the processor 170 may control the display unit 741 to flash the image 1022 at a first speed when the distance to the falling object 952 is a second distance or more and to flash the image 1022 at a second speed which is faster than the first speed when the distance to the falling object 952 becomes less than the second distance.

In addition, the processor 170 may control the display unit 741 to display an image 1032 corresponding to the guide route 1013 generated with respect to the falling object 952. For example, when the predicted final position P3 is outside the prescribed range (see "R1" of FIG. 16A) and the distance between the left end of the falling object 952 and the left traffic lane marker 911 is greater than the full width O of the vehicle 1 at the predicted final position P3 as illustrated in FIG. 21A, the processor 170 may generate the guide route 1013 that causes the vehicle 1 to travel in the distance between the left end of the falling object 952 and the left traffic lane marker 911 and control the display unit 741 to display the image 1032 corresponding to the generated guide route 1013 as illustrated in FIG. 21C.

In FIGS. 21A and 21B, the processor 170 may visually output, via the display unit 741, information P1, P2 and P3 that guides variation in the position of the falling object 952 being tracked and information 1032 that guides the guide route 1013, along with basic information 1102 regarding the falling object 952, thereby assisting the user in intuitively recognizing the state around the vehicle 1. In addition, referring to FIG. 21C, the processor 170 may generate the guide route 1013 with respect to the third position P3, rather than the second position P2 through which the falling object 952 temporarily passes while moving.

Figure 22A:
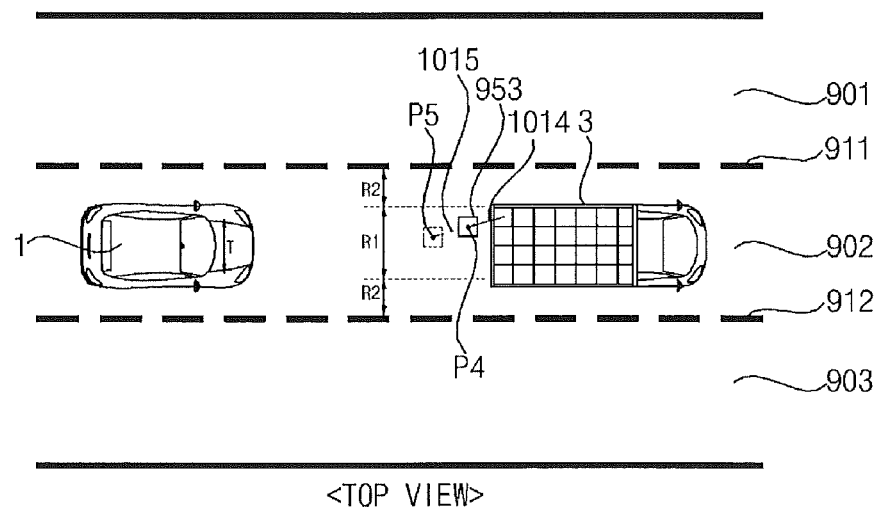
FIGS. 22A to 22C are views illustrating another example of generating a guide route with respect to a falling object using the driver assistance apparatus.
Figure 22B:
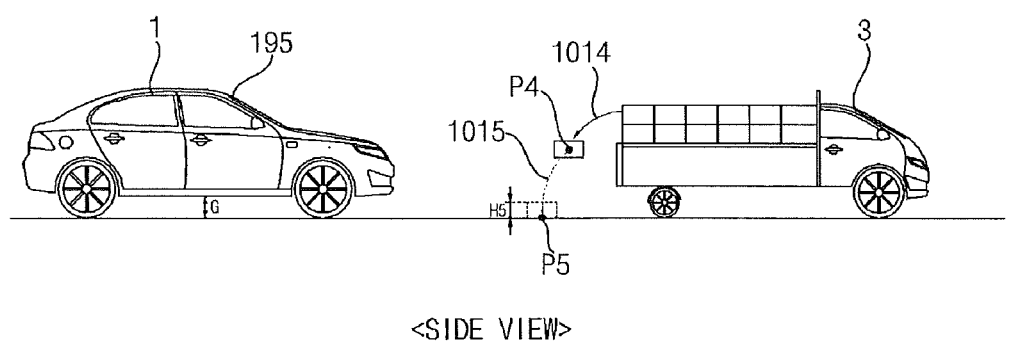
Figure 22C:
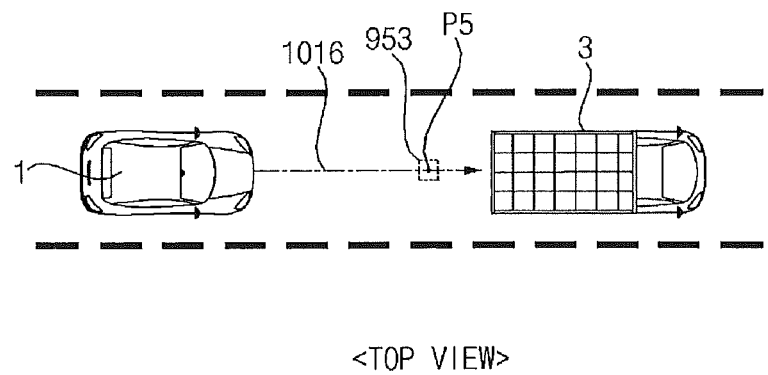

FIGS. 22A to 22C are views illustrating another example of generating a guide route with respect to a falling object using the driver assistance apparatus 100. For convenience of description, a falling object 953 is assumed to fall toward the road surface from the air.

Similar to FIG. 16A, FIG. 22A illustrates the top view of the case where the traveling lane of the vehicle 1 is the second lane 902 which is delimited by the left traffic lane marker 911 and the right traffic lane marker 912 and is located between the first lane 901 and the third lane 903. In addition, FIG. 22B is the side view of a section illustrated in FIG. 22A. In addition, FIG. 22C illustrates one exemplary guide route 1016 generated based on the predicted final position of the falling object 953.

Referring to FIGS. 22A and 22B, when luggage loaded on another vehicle 3 that is traveling ahead of the vehicle 1 becomes separated therefrom, the processor 170 may detect the luggage as an obstacle based on the traveling image. In addition, since the luggage falls toward the second lane 902 from the air, the processor 170 may judge the luggage to be the falling object 953.

The processor 170 may acquire tracking information from the initially detected position (i.e. a position at which falling begins) to the current fourth position P4. Here, the tracking information may include, for example, the past movement speed variation, a movement path 1014 to the current time, and current movement speed of the falling object 953.

The processor 170 may predict a future movement path 1015 of the falling object 953 based on tracking information and predict the final position of the falling object 953 based on the predicted future movement path 1015. For example, as illustrated in FIGS. 22A and 22B, the processor 170 may predict that the falling object 953 will stop at a fifth position P5.

The processor 170 may judge whether the fifth position P5, which is the predicted final position of the falling object 953, falls within the prescribed range R1 on the basis of the center of the second lane 902. Here, the prescribed range R1 may be part of a region between left and right boundaries of the second lane 902, i.e. a region between the left traffic lane marker 911 and the right traffic lane marker 912, which corresponds to a region between a position parallel to and spaced apart from the left traffic lane marker 911 toward the right traffic lane marker 912 by the predetermined distance R2 and a position spaced apart from the right traffic lane marker 912 toward the left traffic lane marker 911 by the predetermined distance R2. At this time, the predetermined distance R2 may have a value that is equal to or greater than the tire width of the vehicle 1. It can be seen from FIG. 22A that the falling object 953 is located within the prescribed range R1 in the second lane 902.

In addition, the processor 170 may calculate the width of the falling object 953 and judge whether the calculated width of the falling object 953 is smaller than the distance T between the left tire 11a and the right tire 11b of the vehicle 1.

In addition, the processor 170 may calculate the height H5 of the falling object 953 and judge whether the calculated height H5 of the falling object 953 is smaller than the minimum ground clearance G of the vehicle 1.

In FIG. 22B, assuming that the width of the falling object 953 is smaller than the distance T between the left tire 11a and the right tire 11b of the vehicle 1 and the height H5 of the falling object 953 is smaller than the minimum ground clearance G of the vehicle 1, the processor 170 may generate a guide route 1016 that causes the vehicle 1 to pass over the fallen object 953 therebelow as illustrated in FIG. 22C. That is, the processor 170 may adjust the direction of travel of the vehicle 1 to avoid the fallen object 953 between the left tire 11a and the right tire 11b of the vehicle 1.

Figure 23:
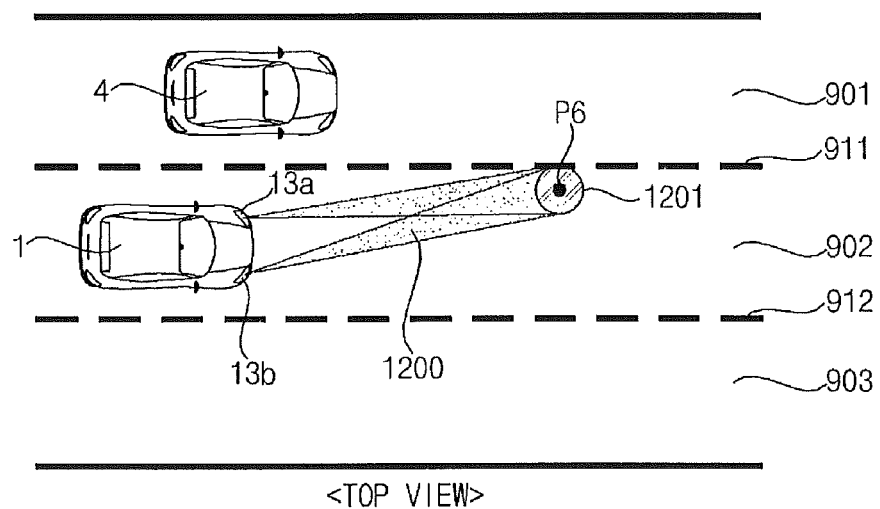
FIG. 23 is a view illustrating one example of controlling a lamp drive unit of a vehicle using the driver assistance apparatus.

FIG. 23 illustrates one example of controlling the lamp drive unit 754 of the vehicle 1 using the driver assistance apparatus 100.

Similar to FIG. 16A, FIG. 23 illustrates the top view of the case where the traveling lane of the vehicle 1 is the second lane 902 which is delimited by the left traffic lane marker 911 and the right traffic lane marker 912 and is located between the first lane 901 and the third lane 903.

When an obstacle is detected in the second lane 902 that is the traveling lane of the vehicle 1, the processor 170 may generate a control signal to emit a beam 1200 to an area including the current position of the detected obstacle. Alternatively, the processor 170 may generate a control signal to emit the beam 1200 to a region including the predicted final position of a falling object when the obstacle is the falling object. That is, the sixth position P6 illustrated in FIG. 23 may be the current position of the stationary obstacle, or may be the predicted final position of the falling object that is moving.

In addition, the processor 170 may provide the lamp drive unit 754 of the vehicle 1 with a control signal to emit the beam 1200. For example, the lamp drive unit 754 of the vehicle 1 may control the headlamps 13a and 13b provided at the front end of the vehicle 1 to emit the beam 1200, which has a prescribed color and magnitude, toward the obstacle based on the control signal provided from the processor 170. At this time, the beam 1200 emitted from the headlamps 13a and 13b under the control of the lamp drive unit 754 may be a laser beam 1200.

In addition, the processor 170 may control the lamp drive unit 754 to change the properties (e.g., color, magnitude, intensity, and flickering period) of the emitted beam 1200 based on the size of the detected obstacle or the distance to the detected obstacle.

For example, the processor 170 may control the lamp drive unit 754 to emit the beam 1200 having a smaller magnitude as the distance to the detected obstacle is reduced. In another example, the processor 170 may control the lamp drive unit 754 to emit the beam 1200 having a first intensity when the distance to the detected obstacle is a first distance or more and to emit the beam 1200 having a second intensity which is smaller than the first intensity when the distance to the detected obstacle is below the first distance.

As exemplarily illustrated in FIG. 23, the driver of another vehicle 4 which is traveling in a lane rather than the second lane 902 can rapidly recognize the presence of an obstacle in the second lane 902 by watching a region 1201 of the road surface to which the beam 1200 is emitted, thus receiving help for safe driving.

Figure 24A:
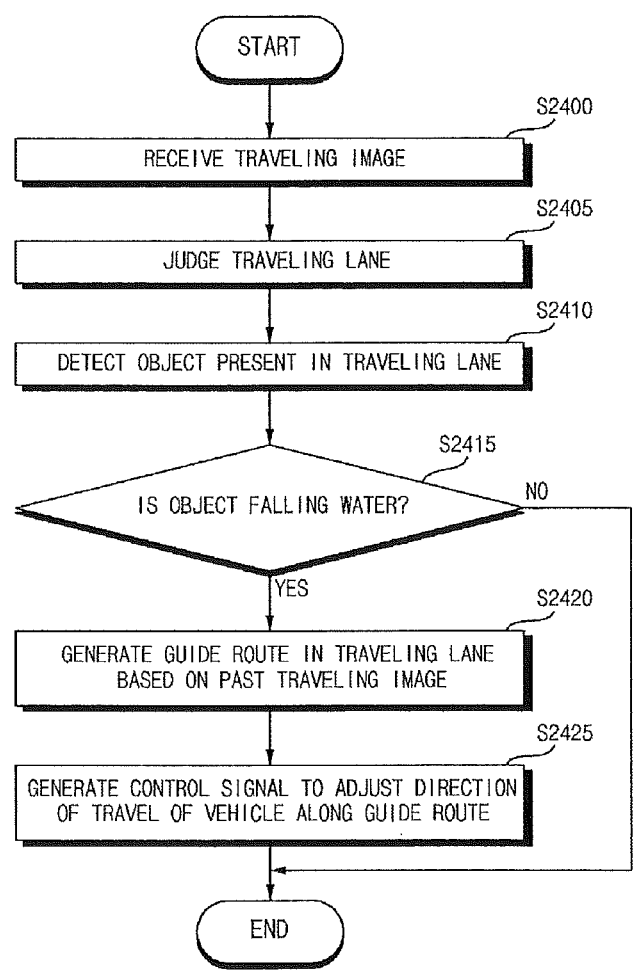
FIGS. 24A and 24B are flowcharts illustrating one example of generating a guide route in the traveling lane using the driver assistance apparatus when a vehicle is doused with water.
Figure 24B:
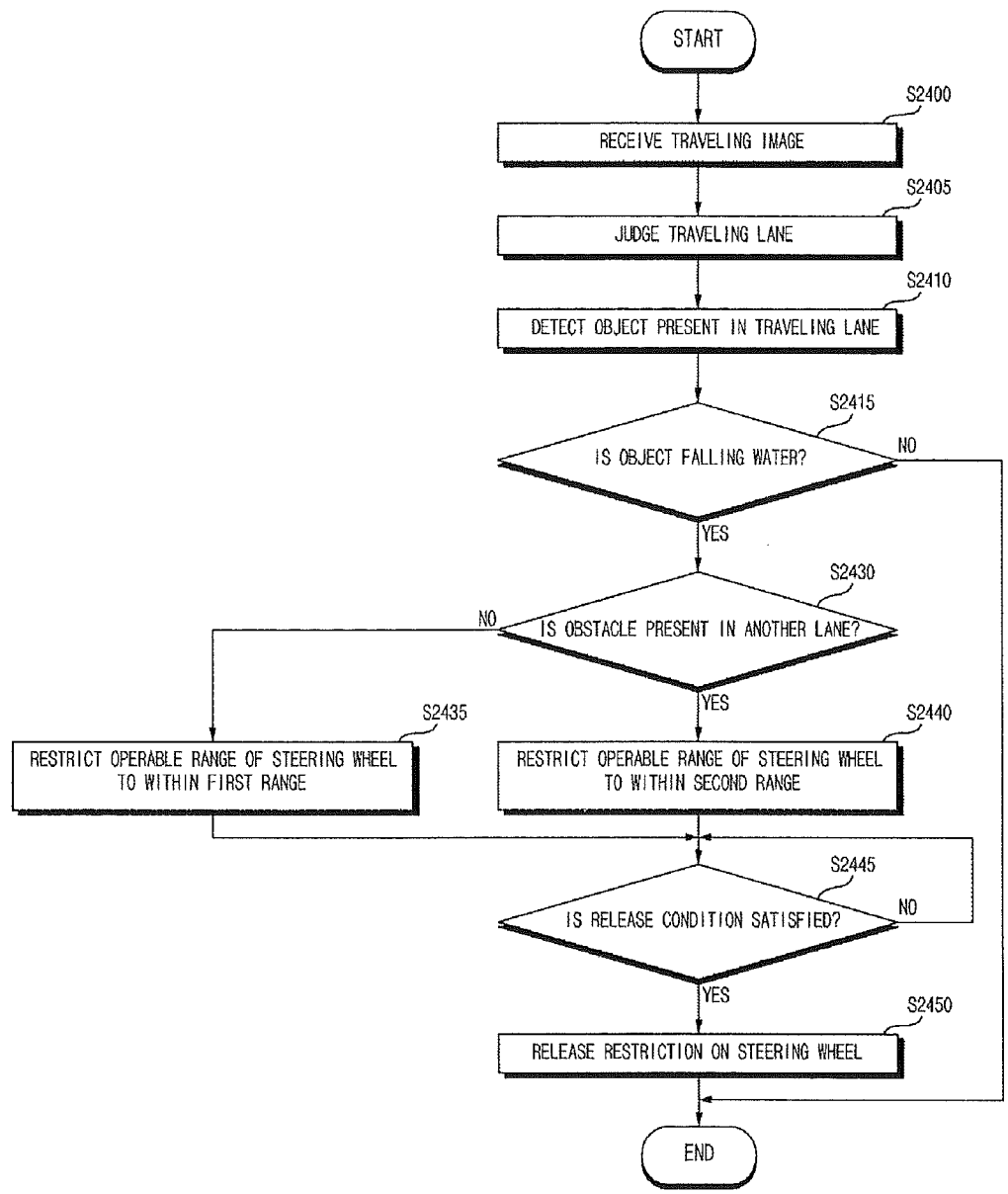

FIGS. 24A and 24B are flowcharts illustrating one example of generating a guide route in a traveling lane using the driver assistance apparatus 100.

First, referring to FIG. 24A, the processor 170 receives a traveling image (S2400). The traveling image may be provided from the camera 195 mounted to one side of the front end of the vehicle 1. The camera 195 may capture an image of the view in front of the vehicle 1 to generate a traveling image under the control of the processor 170, and transmit the generated traveling image to the processor 170 either in real time or periodically. At this time, the traveling image generated by the camera 195 may show at least one object.

Subsequently, the processor 170 judges the traveling lane (S2405). In one example, the processor 170 may detect the left traffic lane marker 911 and the right traffic lane marker 912 from the traveling image received via Step S2400, and set a region, both boundaries of which are the detected left and right traffic lane markers 911 and 912, to the traveling lane. In another example, the processor 170 may judge and set the traveling lane of the vehicle 1 based on location information of the vehicle 1 provided via a separate process rather than Step S2400. In addition, the processor 170 may change information that will be used to judge the traveling lane according to the traveling state. For example, when weather information received via the communication unit 710 of the vehicle 1 corresponds to bad weather, the processor 170 may judge the traveling lane of the vehicle 1 by comparing location information of the vehicle 1 with map information because there is high possibility of detection failure of the left traffic lane marker 911 and the right traffic lane marker 912 due to, for example, rain or snow.

Next, the processor 170 detects an object present in the traveling lane judged in Step S2405 (S2410) and judges whether the object detected in Step S2410 is splashing water (S2415). In one example, the processor 170 may judge that the object is splashing water based on whether the windshield of the vehicle 1 covered by the object detected in Step S2410 has a predetermined area or more. Alternatively, the processor 170 may judge that the object detected in Step S2410 is splashing water when a region of a predetermined percentage or more of the traveling image generated by the camera 195 is covered by the splashing water.

At this time, the processor 170 may judge whether the object is splashing water in consideration of information provided from a rain sensor of the vehicle 1. That is, when the view in front of the vehicle 1 is blocked by a predetermined area or more and a predetermined amount of rain or more is sensed by the rain sensor, the object detected in Step S2410 may be judged as splashing water. At this time, at least one rain sensor may be disposed near the windshield of the vehicle 1.

Subsequently, upon judging that the object is splashing water, the processor 170 may generate a guide route in the traveling lane based on a past traveling image (S2420). The past traveling image may mean a traveling image received before reception of the traveling image showing the object judged as splashing water. To this end, the processor 170 may store all or some of previously received traveling images. In Step S2420, the processor 170 may generate a guide route in the traveling lane based on lane recognition results of the past traveling image. For example, upon recognizing a linear lane from the past traveling image, the processor 170 may generate a guide route that guides the straight movement of the vehicle 1. In another example, upon recognizing a lane having a prescribed curvature from the traveling image, the processor 170 may generate a guide route having the recognized curvature.

Subsequently, the processor 170 may generate a control signal to adjust the direction of travel of the vehicle 1 along the guide route generated in Step S2420 (S2425). In addition, the processor 170 may provide, for example, the steering apparatus of the vehicle 1 with the control signal generated in Step S2425.

FIG. 24B is a flowchart illustrating one example in which the driver assistance apparatus 100 restricts the operable range of the steering wheel 12 of the vehicle 1 when the vehicle 1 is doused with water. Steps S2400, S2405, S2410 and S2415 are the same as FIG. 24A and a description thereto will be omitted.

Referring to FIG. 24B, upon judging in Step S2415 that an object is splashing water, the processor 170 may judge whether an obstacle is present in another lane (S2430). Here, another lane may mean a lane adjacent to the traveling lane of the vehicle 1. In addition, the processor 170 may judge whether an obstacle is present in the other lane based on a sensing signal output from at least one sensor included in the sensing unit 760, which may sense an object present around the vehicle 1 such as, for example, a radar, lidar, and ultrasonic sensor. Of course, the processor 170 may judge that an obstacle is present in the other lane by analyzing an image generated by at least one of the cameras 195 to 198.

Upon judging in Step S2430 that no obstacle is present in the other lane, the processor 170 may restrict the operable range of the steering wheel 12 of the vehicle 1 to within a first range (S2435). On the other hand, upon judging in Step S2430 that the obstacle is present in the other lane, the processor 170 may restrict the operable range of the steering wheel 12 of the vehicle 1 to within a second range (S2440). Here, the first range and the second range may be predetermined, and the second range may be smaller than the first range. For example, the second range may fall within the first range.

That is, the processor 170 may reduce the operable range of the steering wheel 12 when an obstacle is present in the other lane, compared to the case where no obstacle is present in the other lane. For example, when the steering apparatus of the vehicle 1 includes a motor-driven power steering, the processor 170 may control drive power of a steering motor included in the motor-driven power steering to allow the steering wheel 12 to be rotated only within a prescribed range. The motor-driven power steering may be called an Electronic Power Steering (EPS). In another example, the processor 170 may couple a locking plate into an insertion recess formed in a steering column when the steering wheel 12 is operated to reach the boundary value of a limited range. In a further example, the processor 170 may increase friction with respect to the steering column using a friction member of the steering apparatus as the operating degree of the steering wheel 12 increases, thereby controlling the steering wheel 12 to prevent the driver from operating the steering wheel 12 beyond a limited range. In this way, it is possible to reduce the likelihood of a collision with another vehicle caused when the driver rapidly operates the steering wheel 12.

Subsequently, the processor 170 may judge whether a predetermined condition (hereinafter referred to as "release condition") is satisfied in order to release a restriction applied to the steering wheel 12 (S2445). For example, the processor 170 may judge that the release condition is satisfied when a predetermined time has passed after judging that the object was splashing water. In another example, when an area of the windshield of the vehicle 1 blocked by splashing water is reduced below a predetermined area, it may be judged that the release condition is satisfied. The release condition is not limited to the above-described examples and various other conditions may be set based on, for example, user input.

Upon judging in Step S2445 that the release condition is satisfied, the processor 170 may release the restriction on the steering wheel 12 (S2450). Specifically, the processor 170 may provide the steering apparatus of the vehicle 1 with a control signal to release the restriction on the steering wheel 12.

Figure 25A:
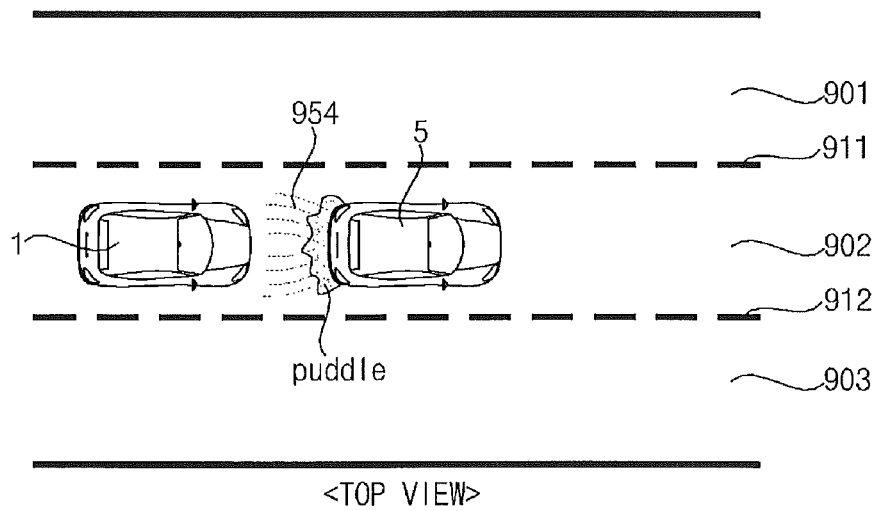
FIGS. 25A to 25C are views illustrating one example of the operation of the driver assistance apparatus when a vehicle is doused with water.
Figure 25B:
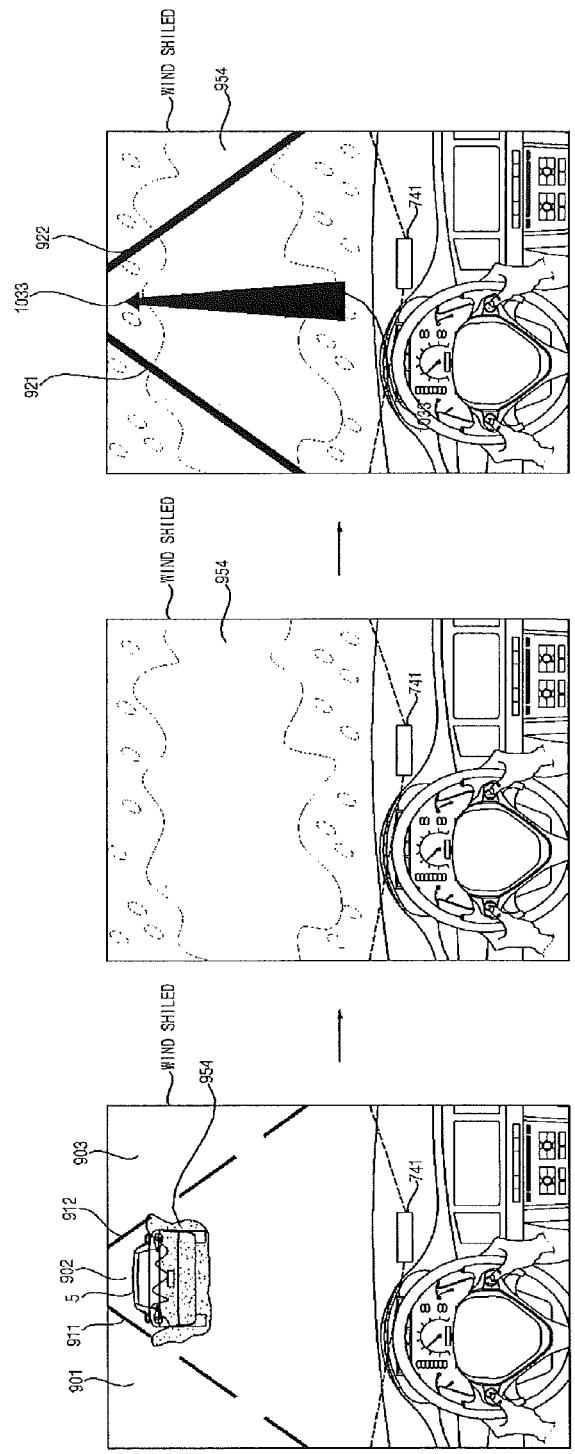
Figure 25C:
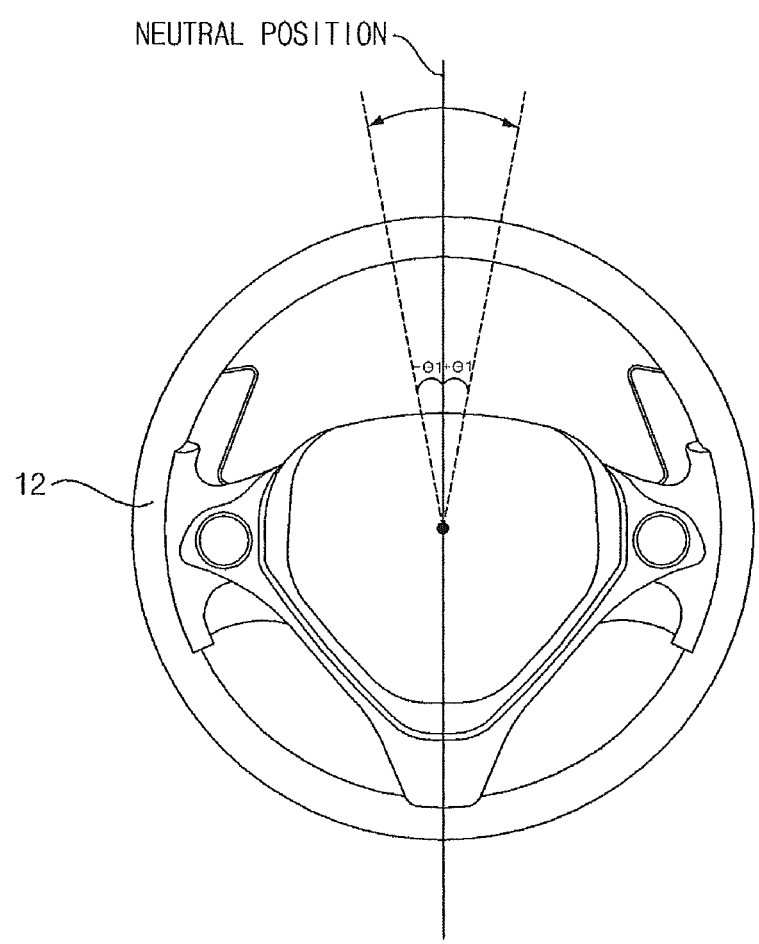

FIGS. 25A to 25C illustrate one example of the operation of the driver assistance apparatus 100 when the vehicle 1 is doused with water.

Similar to FIG. 16A, FIG. 25A illustrates the top view of the case where the traveling lane of the vehicle 1 is the second lane 902 which is delimited by the left traffic lane marker 911 and the right traffic lane marker 912 and is located between the first lane 901 and the third lane 903. As illustrated, the vehicle 1 may receive splashing water 954 when another vehicle 5 that is traveling ahead of the vehicle 1 passes over a puddle present in the second lane 902.

FIG. 25B illustrates the state of the windshield of the vehicle 1 before and after the occurrence of splashing water 954 as illustrated in FIG. 25A. For convenience of description, FIG. 25B illustrates the case where the display unit 741 is an HUD that utilizes the windshield as the projection plane. Referring to the leftmost image of FIG. 25B, the splashing water 954 may occur as another vehicle 5 passes over a puddle. In addition, referring to the center image of FIG. 25B, as the vehicle 1 travels toward the splashing water 954, the splashing water 954 may cover the windshield of the vehicle 1 to block the driver's view in front of the vehicle 1. In this case, the processor 170 may judge whether a predetermined region of the windshield of the vehicle 1 or more is covered by the splashing water 954 based on the traveling image. Differently from the leftmost image of FIG. 25B, the center image of FIG. 25B illustrates the state in which the driver of the other vehicle 5 cannot check the view ahead thereof because the left traffic lane marker 911 and the right traffic lane marker 912 are covered by the splashing water 954.

Upon judging that the predetermined area of the windshield of the vehicle 1 or more is covered by the splashing water 954, the processor 170 may control the display unit 741 to display, on the windshield, a virtual traffic lane marker 921 corresponding to the left traffic lane marker 911 and a virtual traffic lane marker 922 corresponding to the right traffic lane marker 912 as illustrated in the rightmost image of FIG. 25B. In addition, the processor 170 may generate a guide route based on the past traveling image and control the display unit 741 to display, on the windshield, an image 1033 corresponding to the generated guide route. At this time, the traveling image, which is used to generate the virtual traffic lane markers 921 and 922 and the image 1033 corresponding to the guide route may be the past traveling image that is the leftmost image of FIG. 25B.

As illustrated in the rightmost image of FIG. 25B, as the virtual traffic lane markers 921 and 922 and the image 1033 corresponding to the guide route are displayed on the windshield, the driver may continue safe driving even in the state in which the splashing water 954 blocks the driver's view.

In some implementations, the processor 170 may restrict the operable range of the steering wheel 12, simultaneously with or separately from the operation of displaying the virtual traffic lane markers 921 and 922 and the image 1033 corresponding to the guide route. Here, the operable range of the steering wheel 12 may mean the angular range over which the driver can manually rotate the steering wheel 12. When the splashing water 954 suddenly occurs, the driver whose view is blocked and who may have lost his/her judgment may excessively operate the steering wheel 12 and the risk of accidents caused by deviation from the lane increases. Therefore, the processor 170 may control the steering wheel 12 so that it can be operated only within a restricted range.

Referring to FIG. 25C, in the case where the windshield is covered by the splashing water 954 as illustrated in the center image of FIG. 25B while the vehicle 1 is moving straight along the second lane 902, thus making it difficult for the driver secure a clear view, the processor 170 may control the steering wheel 12 to be rotated only within a first range from $-\theta 1$ to $+\theta 1$ that is a prescribed angular range on the basis of the neutral position of the steering wheel 12. Here, the neutral position may mean the steering position for the straight movement of the vehicle 1. In addition, the sign "−" may mean counterclockwise rotation from the neutral position and the sign "+" may mean clockwise rotation from the neutral position. That is, the wheels of the vehicle 1 may be aligned parallel to the center axis of the vehicle 1 in the state in which the steering wheel 12 is at the neutral position. The processor 170 may provide the steering apparatus with a control signal to restrict the rotation amount of the steering wheel 12 so as to prevent the driver from operating the steering wheel 12 beyond the first range from $-\theta 1$ to $+\theta 1$. For example, the steering apparatus may include a steering sensor which senses, for example, the rotation direction, rotation speed, rotation amount, and steering torque of the steering wheel 12. The processor 170 may judge whether the rotation amount of the steering wheel 12 reaches the boundary value of the first range from $-\theta 1$ to $+\theta 1$ based on the sensing signal from the steering sensor.

Upon judging that the rotation amount of the steering wheel 12 reaches the boundary value of the first range from $-\theta 1$ to $+\theta 1$, the processor 170 may provide the steering drive unit 752 with a control signal to reduce the drive power of the steering motor provided in the motor-driven power steering or to increase the friction or resistance of the steering column. In this way, the steering drive unit 752 may control the steering apparatus based on the control signal provided by the processor 170 to prevent the steering wheel 12 from being operated beyond the first range from $-\theta 1$ to $+\theta 1$ even if the driver applies excessive force to the steering wheel 12.

Although FIG. 25A illustrates the splashing water 954 as being generated by the preceding vehicle 5, there may be other causes as well. For example, the splashing water 954 may be generated by heavy rain, and the processor 170 may judge the occurrence of the splashing water 954 of the vehicle 1 when a sensing signal output from the rain sensor corresponds to heavy rain.

In addition, although FIG. 25C illustrates that the steering wheel 12 is operable within the first range from $-\theta 1$ to $+\theta 1$, other implementations may be possible. For example, upon judging that the driver's view in front of the vehicle 1 is blocked by the splashing water 954 while the vehicle 1 is moving straight along the second lane 902, the processor 170 may fix the steering wheel 12. That is, the processor 170 may set the operable range of the steering wheel 12 to "zero" to control the steering wheel 12 so as not to be rotated clockwise or counterclockwise. In this way, the vehicle 1 may maintain straight movement along the second lane 902.

Figure 26A:
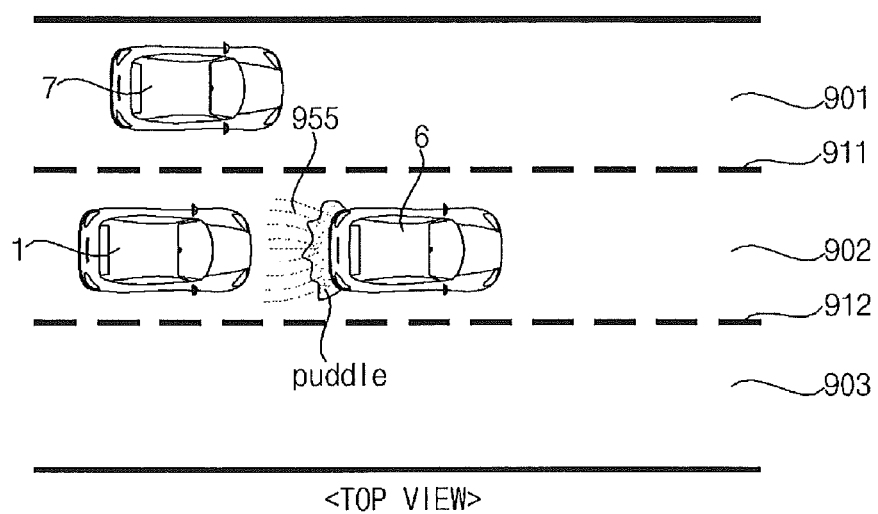
FIGS. 26A and 26B are views illustrating another example of the operation of the driver assistance apparatus when a vehicle is doused with water.
Figure 26B:
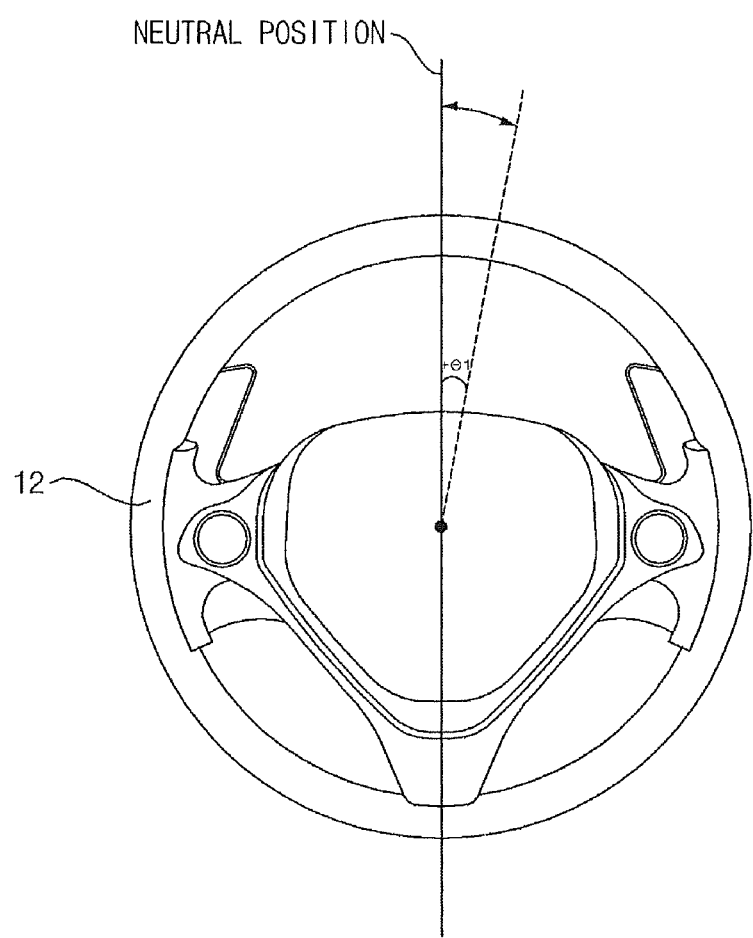

FIGS. 26A and 26B illustrate another example of the operation of the driver assistance apparatus 100 when the vehicle 1 is doused with water.

Similar to FIG. 25A, FIG. 26A illustrates the top view of the case where the traveling lane of the vehicle 1 is the second lane 902 which is delimited by the left traffic lane marker 911 and the right traffic lane marker 912 and is located between the first lane 901 and the third lane 903, and the vehicle 1 may receive splashing water 955 when another vehicle 6 that is traveling ahead of the vehicle 1 passes over a puddle present in the second lane 902. Compared to FIG. 25A, FIG. 26A has a difference in that still another vehicle 7 is traveling in the first lane 901.

The processor 170 may judge whether an obstacle is present in a lane excluding the traveling lane of the vehicle 1. Upon judging that an obstacle such as, for example, the other vehicle 7 is present in another lane, the processor 170 may reduce the operable range of the steering wheel 12 compared to the case where no obstacle is present in another lane.

For example, in the state illustrated in FIG. 25A in which no vehicle close to the vehicle 1 is present in the first lane 901 and in the second lane 902, the operable range of the steering wheel 12 may be limited to the first range from $-\theta 1$ to $+\theta 1$. On the other hand, in the state of FIG. 26A in which another vehicle close to the vehicle 1 is present in the first lane 901, the operable range of the steering wheel 12 may be changed so that the steering wheel 12 is operable only in a range that is smaller than the first range from $-\theta 1$ to $+\theta 1$.

At this time, the processor 170 may change the magnitude of the operable range of the steering wheel 12 based on the characteristics of the obstacle. For example, as the distance between the vehicle 1 and the other vehicle 7 illustrated in FIG. 26A is reduced, the processor 170 may gradually reduce the operable range of the steering wheel 12.

In some cases, the processor 170 may set the operable range of the steering wheel 12 in consideration of the position of the obstacle relative to the vehicle 1. Referring to FIG. 26B, when the driver of the vehicle 1 rotates the steering wheel 12 counterclockwise in the state in which the other vehicle 7 is traveling at the left side of the vehicle 1, the possibility of collision between the vehicle 1 and the other vehicle 7 is high. In this case, the processor 170 may limit the operable range of the steering wheel 12 such that the steering wheel 12 can be rotated only clockwise on the basis of the neutral position, i.e. within the second range from 0 to +θ1. That is, the steering wheel 12 is controlled by the processor 170 so as not to be rotated counterclockwise, which may reduce the risk of collision between the vehicle 1 and the other vehicle 7.

Figure 27A:
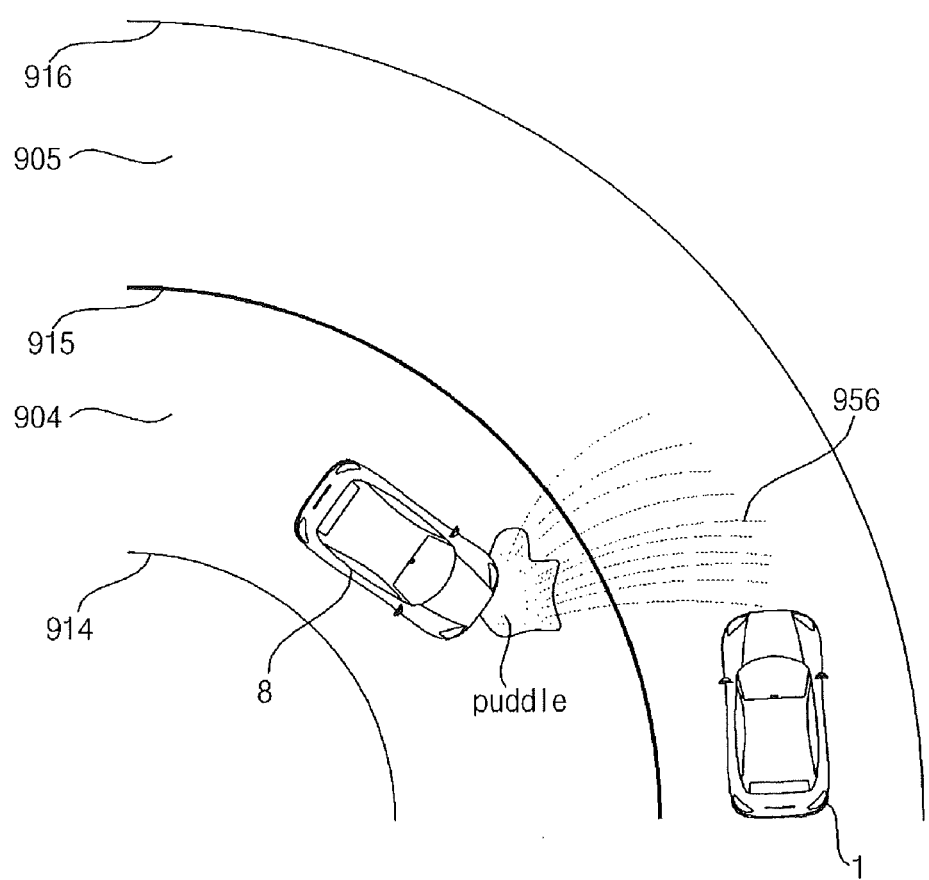
FIGS. 27A to 27C are views illustrating a still another example of the operation of the driver assistance apparatus when a vehicle is doused with water.
Figure 27B:
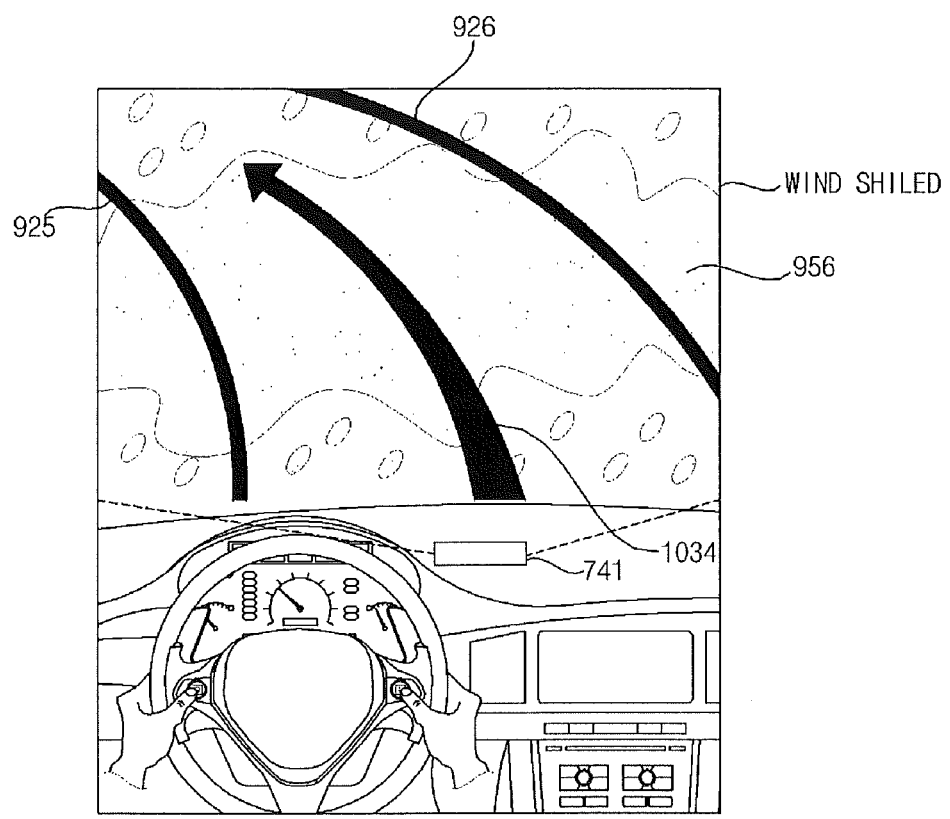
Figure 27C:
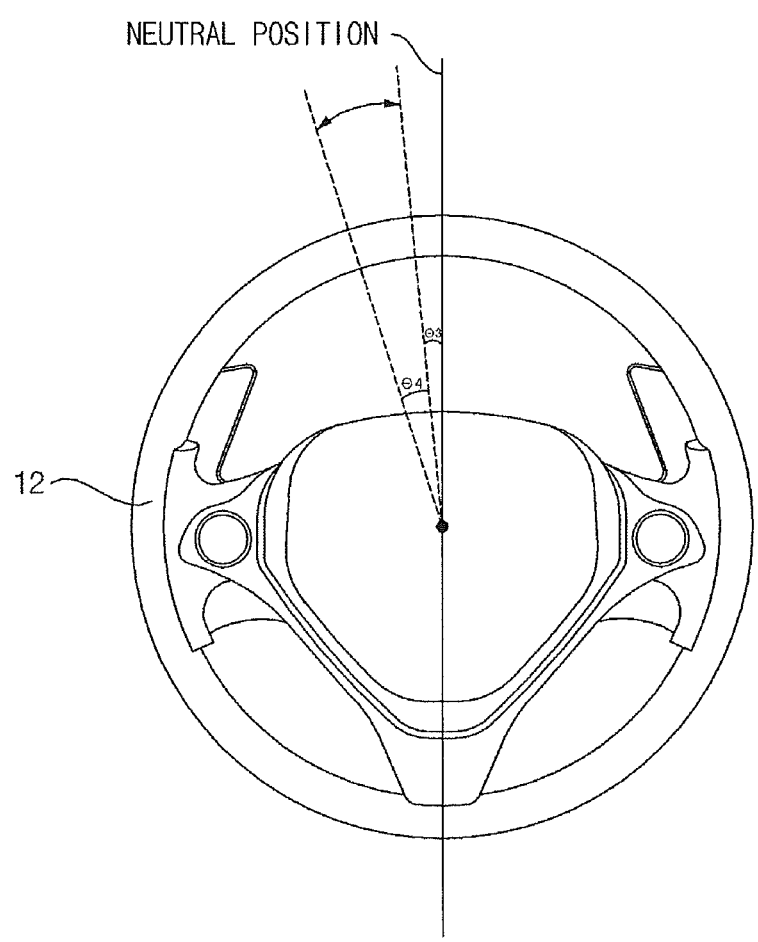

FIGS. 27A to 27C are views illustrating a still another example of the operation of the driver assistance apparatus 100 when the vehicle 1 is doused with water. For convenience of explanation, the display unit 741 is assumed as being an HUD mounted to, for example, a dashboard.

FIG. 27A illustrates the state in which the vehicle 1 is traveling in a right lane 905 of a two-lane road having a prescribed curvature and another vehicle 8 is traveling in a left lane 904 in the direction opposite to that of the vehicle 1. The left lane 904 is assumed to be delimited by a left traffic lane marker 914 and a center traffic lane marker 915 and the right lane 905 is assumed to be delimited by the center traffic lane marker 915 and a right traffic lane marker 916. In addition, for convenience of description, it is assumed that splashing water 956 generated as still another vehicle 8 passes over a puddle present in the left lane 904 strikes the windshield of the vehicle 1, thereby blocking the driver's view.

The processor 170 may generate a control signal to adjust the direction of travel of the vehicle 1 based on a past traveling image, i.e. a traveling image received from the camera 195 before the splashing water 956 blocks the driver's view.

Referring to FIG. 27B, the two-lane road illustrated in FIG. 27A is curved leftward, and the processor 170 may recognize the two traffic lane markers 915 and 916 on respective sides of the right lane 905 from the past traveling image and calculate curve information of the right lane 905 based on the recognized traffic lane markers. For example, the processor 170 may calculate the direction and curvature of the right lane 905 based on the curvature of the recognized traffic lane markers.

Upon completion of the calculation of the curve information regarding the traveling lane, the processor 170 may generate a guide route in the right lane 905 that is the traveling lane of the vehicle 1 based on the calculated curve information. In addition, the processor 170 may control the display unit 741 to display the calculated curve information. For example, as illustrated in FIG. 27B, the processor 170 may control the HUD 741 to project a virtual traffic lane marker 925 corresponding to the center traffic lane marker 915 and a virtual traffic lane marker 926 corresponding to the right traffic lane marker 916, which are hidden by the splashing water 956, to the windshield. In addition, the processor 170 may generate a guide route in the right lane 905 based on the curvature of the right lane 905 and control the HUD 741 to project an image 1034 corresponding to the generated guide route to the windshield.

Upon the occurrence of the splashing water 956, the processor 170 may restrict the operable range of the steering wheel 12 based on the curvature of the traveling lane. Referring to FIG. 27C, the processor 170 may set the operable range of the steering wheel 12 based on the direction and curvature (or the radius of curvature) of the right lane 905. Specifically, since the right lane 905 is curved leftward, the processor 170 may prevent the steering wheel 12 from being rotated clockwise. In addition, the processor 170 may control the steering wheel 12 to be rotated counterclockwise within a third range from −θ4 to −θ3 from the neutral position based on the curvature of the right lane 905.

Here, the sign "−" may mean counterclockwise rotation from the neutral position. For example, the third range may be set to a range from −20 degrees to −15 degrees when the curvature of the right lane 905 has a first value, and may be set to a range from −30 degrees to −25 degrees when the curvature of the right lane 905 has a second value which is greater than the first value.

Figure 28:
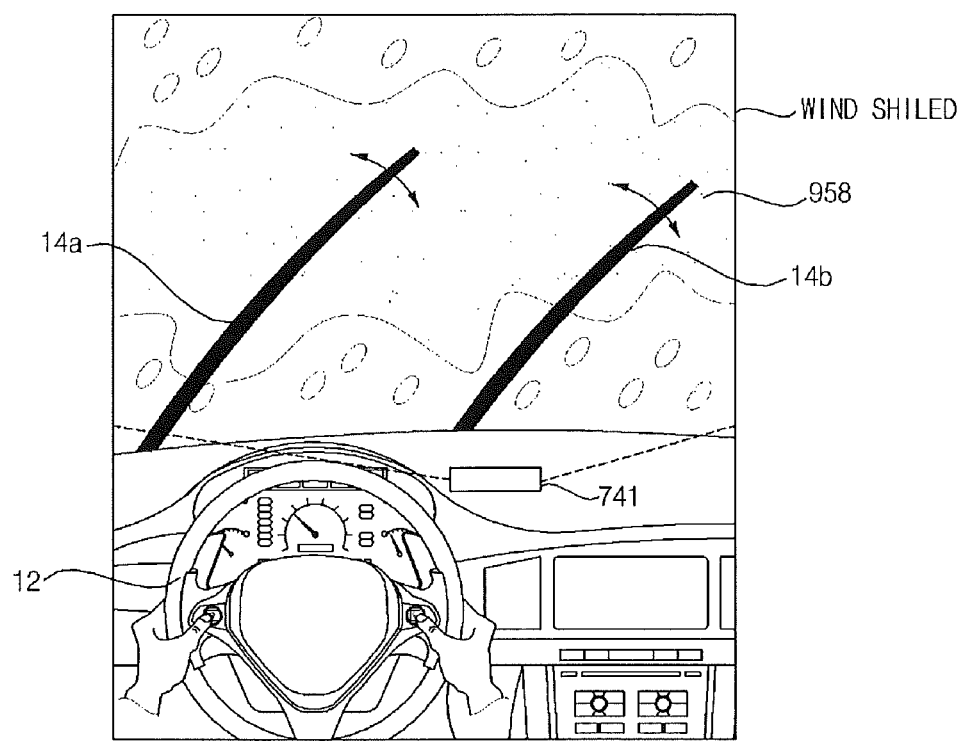
FIG. 28 is a view illustrating a further example of the operation of the driver assistance apparatus when a vehicle is doused with water.

FIG. 28 is a view illustrating a further example of the operation of the driver assistance apparatus 100 when the vehicle is doused with water. For convenience of explanation, the wipers 14a and 14b are assumed to be arranged at positions close to the windshield of the vehicle 1.

Referring to FIG. 28, the processor 170 may provide the wiper drive unit 759 of the vehicle 1 with a control signal to operate the wipers 14a and 14b at least once when the windshield of the vehicle 1 is covered by splashing water 958. That is, as the wipers 14a and 14b are automatically turned on under the control of the processor 170 in the state in which the driver has difficulty in securing a clear view due to the splashing water 958, the splashing water 958 that blocks the windshield may be rapidly removed.

In some cases, the processor 170 may differentially control, for example, the driving number and the driving speed of the wipers 14a and 14b based on the extent to which the view in front of the vehicle 1 is blocked by the splashing water 958. To this end, the processor 170 may calculate the area or percentage of the windshield that is covered by the splashing water 958 based on the traveling image.

For example, when 70% or more of the windshield is covered by the splashing water 958, the processor 170 may output a control signal that commands the wiper drive unit 759 to operate the wipers 14a and 14b five times at high speed.

In another example, when a range from more than 40% to less than 70% of the windshield is covered by the splashing water 958, the processor 170 may output a control signal that commands the wiper drive unit 759 to operate the wipers 14a and 14b three times at middle speed.

In a further example, when a range from more than 20% to less than 40% of the windshield is covered by the splashing water 958, the processor 170 may output a control signal that commands the wiper drive unit 759 to operate the wipers 14a and 14b once at low speed. When an extremely small area (e.g., less than 20%) of the windshield is covered by the splashing water 958, the driver may not be able to visually check the front view through the remaining 80% or more of the windshield and, therefore, the processor 170 may not generate a control signal for driving the wipers 14a and 14b.

Although the examples above have been described based on the operation of the driver assistance apparatus 100 of adjusting the direction of travel of the vehicle 1 in the traveling lane of the vehicle 1, other implementations may be used. For example, the processor 170 may generate a control signal to move the vehicle 1 to another lane, rather than a region in the current traveling lane, when it is impossible to generate the guide route illustrated in FIG. 11C in the traveling lane. Specifically, the processor 170 may generate a route which connects the current traveling lane to the other traveling lane and, thereafter, provide the steering apparatus of the vehicle 1 with a control signal to adjust the direction of travel of the vehicle 1 along the route between the current traveling lane and the other traveling lane.

In this case, the processor 170 may judge whether an object (e.g., an obstacle) is present in the other lane located at the left side or the right side of the current traveling lane based on at least one of the traveling image received from the camera 195 and the sensing signal received from the sensing unit 760, and generate the route that connects the current traveling lane to the other lane when no object is present in the other lane.

Although the driver assistance apparatus 100 may have been described in the above examples as displaying various pieces of object information using the display unit 741 of the vehicle 1, this is merely given for convenience of description and is not intended to limit the scope of the present disclosure. That is, the processor 170 may control the display unit 180 in the same control manner as the display unit 741. For example, the processor 170 should be understood as being capable of displaying various pieces of object information using the display unit 180 included in the driver assistance apparatus 100, other than the display unit 741 of the vehicle 1.

As is apparent from the above description, the effects of a driver assistance apparatus and a control method for the same according to the present disclosure can include the following.

For example, a vehicle may be controlled to avoid a pothole present in the traveling lane based on the position and size of the pothole.

Alternatively or additionally, the vehicle may be controlled to avoid an obstacle present in the traveling lane based on the position and size of the obstacle.

Alternatively or additionally, the vehicle may be controlled to avoid a falling object in the traveling lane by predicting the final position of the falling object that is moving in the traveling lane.

Alternatively or additionally, it may be possible to allow the driver of the vehicle concerned and the driver of another vehicle to intuitively recognize the accurate position of an obstacle via emission of a light beam toward an area at which the obstacle is located in the traveling lane of the vehicle.

Alternatively or additionally, in the case where the view in front of the vehicle is not secured due to falling water, virtual traffic lane marks and a guide route may be generated and displayed based on a traveling image before the vehicle is doused with water, which may contribute to safe driving.

Alternatively or additionally, in the case where the view in front of the vehicle is not secured due to falling water, the operable range of a steering wheel may be limited based on a traveling image before the vehicle is doused with water, which may reduce the risk caused when the driver suddenly operates the steering wheel.

Alternatively or additionally, in the case where the windshield of the vehicle is covered by falling water, wipers may be automatically driven, which may assist the driver in rapidly recognizing the state in front of the vehicle.

The present disclosure as described above are not limited to be implemented only via the apparatus and the method and may be implemented via a program that realizes a function corresponding to the configuration of each implementation of the present disclosure or a recording medium in which the program is recorded.

In addition, it should be readily understood that the disclosure is not limited to the examples described above and the accompanying drawings. Rather, the disclosure can be modified to incorporate any number of variations, alterations, substitutions, or equivalent arrangements not heretofore described, but which are commensurate with the spirit and scope of the disclosure. Accordingly, the disclosure is not to be seen as limited by the foregoing description and the accompanying drawings, and some or all of the examples and implementations may be selectively combined with one another to achieve various alterations.

What is claimed is:

1. A driver assistance apparatus comprising:
    at least one camera configured to generate images of a view in front of a vehicle; and a processor configured to:
    detect an object present in a traveling lane of the vehicle based on the generated images,
    judge whether the object is a pothole or an obstacle based on the information regarding the object;
    calculate a position and size of the object based on judging that the object is any one of the pothole or the obstacle;
    based on judging that the object is the pothole, that a position of the pothole is within a prescribed range of a center of the traveling lane, and that a width of the pothole is smaller than a distance between a left tire and a right tire of the vehicle:
    generate a guide route that causes the vehicle to pass over the pothole between the left tire and the right tire of the vehicle; and
    provide a steering apparatus of the vehicle with a control signal to adjust a direction of travel of the vehicle within the traveling lane based on information regarding the object and steering of the vehicle along the guide route.

2. The driver assistance apparatus according to claim 1, wherein the processor is configured to:
    recognize a left traffic lane marker and a right traffic lane marker based on the generated images; and
    determine the traveling lane by judging a region between the left traffic lane marker and the right traffic lane marker.

3. A vehicle comprising:
    a driver assistance apparatus comprising:
    at least one camera configured to generate images of a view in front of a vehicle; and a processor configured to:
    detect an object present in a traveling lane of the vehicle based on the generated images,
    judge whether the object is a pothole or an obstacle based on the information regarding the object;
    calculate a position and size of the object based on judging that the object is any one of the pothole or the obstacle;
    based on judging that the object is the pothole, that a position of the pothole is within a prescribed range of a center of the traveling lane, and that a width of the pothole is smaller than a distance between a left tire and a right tire of the vehicle:
    generate a guide route that causes the vehicle to pass over the pothole between the left tire and the right tire of the vehicle; and
    provide a steering apparatus of the vehicle with a control signal to adjust a direction of travel of the vehicle within the traveling lane based on information regarding the object and steering of the vehicle along the guide route.

* * * * *